(12) United States Patent
Lim et al.

(10) Patent No.: US 12,363,609 B2
(45) Date of Patent: Jul. 15, 2025

(54) ELECTRONIC DEVICE FOR PROVIDING LOCATION-BASED SERVICE AND OPERATING METHOD THEREOF

(71) Applicant: Samsung Electronics Co., Ltd., Suwon-si (KR)

(72) Inventors: Chaigil Lim, Suwon-si (KR); Gajin Song, Suwon-si (KR); Seokhyun Kim, Suwon-si (KR); Hanjun Ryu, Suwon-si (KR); Sunkey Lee, Suwon-si (KR); Jinhong Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 398 days.

(21) Appl. No.: 17/970,062

(22) Filed: Oct. 20, 2022

(65) Prior Publication Data

US 2023/0132299 A1    Apr. 27, 2023

Related U.S. Application Data

(63) Continuation of application No. PCT/KR2022/015287, filed on Oct. 11, 2022.

(30) Foreign Application Priority Data

Oct. 27, 2021  (KR) .................. 10-2021-0144604
Dec. 2, 2021   (KR) .................. 10-2021-0170768

(51) Int. Cl.
*H04W 40/00*  (2009.01)
*G01S 13/02*  (2006.01)
(Continued)

(52) U.S. Cl.
CPC ......... *H04W 40/22* (2013.01); *G01S 13/0209* (2013.01); *H04W 4/029* (2018.02); *H04W 88/04* (2013.01)

(58) Field of Classification Search
CPC .... H04W 40/22; H04W 4/029; G01S 13/0209
See application file for complete search history.

(56) References Cited

U.S. PATENT DOCUMENTS

2006/0293806 A1* 12/2006 Basilico ................ G01C 21/00
                                                              701/21
2010/0151789 A1    6/2010 Suzuki et al.
(Continued)

FOREIGN PATENT DOCUMENTS

CN          101682900 B    5/2013
JP            6032031 B2   11/2016
(Continued)

OTHER PUBLICATIONS

International Search Report dated Jan. 13, 2023, issued in International Application No. PCT/KR2022/015287.

*Primary Examiner* — Erika A Washington
(74) *Attorney, Agent, or Firm* — Jefferson IP Law, LLP

(57) ABSTRACT

An electronic device includes a display, a communication circuit, and at least one processor, and the at least one processor may be configured to establish a connection with a second external electronic device upon identifying that a packet is not received from a first external electronic device during set time while providing a location-based service for the first external electronic device, transmit, to the second external electronic device, a packet for requesting to operate as a relay device for obtaining a location of the first external electronic device, receive, from the second external electronic device, a packet including a distance and a direction between the second external electronic device and the first external electronic device, predict a location of the first external electronic device, and display, information indicating the predicted location of the first external electronic device.

16 Claims, 25 Drawing Sheets

(51) Int. Cl.
    *H04W 4/029*     (2018.01)
    *H04W 40/22*     (2009.01)
    *H04W 88/04*     (2009.01)

(56) References Cited

U.S. PATENT DOCUMENTS

| | | |
|---|---|---|
| 2013/0154836 A1 | 6/2013 | Derrico et al. |
| 2014/0169373 A1 | 6/2014 | Tanimoto |
| 2016/0080921 A1 | 3/2016 | Yadav et al. |
| 2017/0123039 A1 | 5/2017 | Shin et al. |
| 2017/0195834 A1 | 7/2017 | Na et al. |
| 2018/0128894 A1 | 5/2018 | Kaio |
| 2021/0264620 A1* | 8/2021 | Ramasamy ............. G06T 7/246 |

FOREIGN PATENT DOCUMENTS

| | | |
|---|---|---|
| KR | 10-1472502 B1 | 12/2014 |
| KR | 10-2016-0112233 A | 9/2016 |
| KR | 10-2017-0082016 A | 7/2017 |
| KR | 10-1780317 B1 | 9/2017 |
| KR | 10-1875389 B1 | 7/2018 |
| KR | 10-2118420 B1 | 6/2020 |
| KR | 10-2287266 B1 | 8/2021 |
| WO | 2013/008358 A1 | 1/2013 |

\* cited by examiner

ELECTRONIC DEVICE FOR PROVIDING LOCATION-BASED SERVICE AND OPERATING METHOD THEREOF

CROSS-REFERENCE TO RELATED APPLICATION(S)

This application is a continuation application, claiming priority under § 365(c), of an International application No. PCT/KR2022/015287, filed on Oct. 11, 2022, which is based on and claims the benefit of a Korean patent application number 10-2021-0144604, filed on Oct. 27, 2021, in the Korean Intellectual Property Office, and of a Korean patent application number 10-2021-0170768, filed on Dec. 2, 2021, in the Korean Intellectual Property Office, the disclosure of each of which is incorporated by reference herein in its entirety.

TECHNICAL FIELD

The disclosure relates to an electronic device for providing a location-based service and an operating method thereof.

BACKGROUND ART

The Internet, which is a human centered connectivity network where humans generate and consume information, is now evolving to the Internet of things (IoT) network where distributed entities exchange and process information. The Internet of everything (IoE) technology may be an example in which a big data processing technology through connection with a cloud server is combined with the IoT technology.

As technology elements, such as a sensing technology, a wired/wireless communication and network infrastructure, a service interface technology, and a security technology have been demanded for implementing the IoT technology, and various technologies for a connection between things such as a sensor network, a machine-to-machine (M2M) communication, machine type communication (MTC), and so forth have been recently researched.

Such an IoT environment may provide intelligent Internet technology (IT) services that create a new value to human life by collecting and analyzing data generated among connected things. The IoT technology may be applied to various services such as a smart home service, a smart building service, a smart city service, a smart car service or connected car service, a smart grid service, a health care service, a smart appliance service, or and an advanced medical service through convergence and combination between an existing IT technology and various industrial applications.

Among various services to which the IoT technology is applied, in a case of the smart home service, various IoT-based services may be provided using various IoT devices.

An electronic device (e.g., a smart phone) interworks with a first external electronic device and second external electronic devices (e.g., IoT devices) existing in various spaces within a wireless communication network to provide a location-based service (e.g., an automation service and/or a find service). For example, the first external electronic device may include a smart tag (e.g., a Samsung Galaxy smart tag), a smart button, and/or a wearable electronic device (e.g., a smart watch or earbuds).

In the finding service, a target electronic device which the electronic device intends to find may be the first external electronic device. If the finding service is executed, the electronic device may establish a connection (e.g., an ultra wide band (UWB) connection) with the first external electronic device based on a short-range wireless communication scheme (e.g., a UWB scheme). The electronic device may obtain a distance and an angle between the electronic device and the first external electronic device through the UWB connection established between the electronic device and the first external electronic device, and may obtain a location of the first external electronic device based on the obtained distance and angle between the electronic device and the first external electronic device. The electronic device may display the obtained location of the first external electronic device through a user interface (UI).

If the UWB scheme is used, the electronic device and the first external electronic device operate as an initiator and a responder, respectively, and the electronic device may obtain a distance and a direction between the electronic device and the first external electronic device through a 1:1 communication between the electronic device and the first external electronic device. However, because a UWB antenna generally has a directional radiation pattern, if a direction of the electronic device does not match a direction of the first external electronic device, if there is an obstacle between the electronic device and the first external electronic device, and/or if the distance between the electronic device and the first external electronic device is longer than a threshold distance, the electronic device may not receive a UWB signal (e.g., a UWB packet) from the first external electronic device. As the electronic device may not receive the UWB signal from the first external electronic device, a stable UWB communication between the electronic device and the first external electronic device may not be guaranteed. For example, if the first external electronic device is attached to a pet such as a dog or a cat, the location of the first external electronic device may also change very frequently due to the nature of the pet, which moves a lot. These very frequent changes in location may make it difficult to guarantee the stable UWB communication between the electronic device and the first external electronic device.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Solution

Aspects of the disclosure are to address at least the above-mentioned problems and/or disadvantages and to provide at least the advantages described below. Accordingly, an aspect of the disclosure is to provide an electronic device for providing a location-based service and an operating method thereof.

Another aspect of the disclosure is to provide an electronic device for providing location information of a first external electronic device through cooperation of a second external electronic device and an operating method thereof.

Another aspect of the disclosure is to provide an electronic device for controlling an operation of the electronic device based on a distance and a direction between the electronic device and the first external electronic device and an operating method thereof.

Additional aspects will be set forth in part in the description which follows and, in part, will be apparent from the description, or may be learned by practice of the presented embodiments.

According to an embodiment, an electronic device may comprise a display, a communication circuit, and at least one processor operatively connected with the display and the communication circuit.

According to an embodiment, the at least one processor may be configured to establish, via the communication circuit, a connection with a second external electronic device upon identifying that a packet is not received from a first external electronic device during set time while providing a location-based service for the first external electronic device.

According to an embodiment, the at least one processor may be further configured to transmit, to the second external electronic device via the communication circuit, a packet for requesting to operate as a relay device for obtaining a location of the first external electronic device.

According to an embodiment, the at least one processor may be further configured to receive, from the second external electronic device via the communication circuit, a packet including a distance and a direction between the second external electronic device and the first external electronic device.

According to an embodiment, the at least one processor may be further configured to predict a location of the first external electronic device based on a distance and a direction between the electronic device and the second external electronic device, and the distance and the direction between the second external electronic device and the first external electronic device.

According to an embodiment, the at least one processor may be further configured to display, through the display, information indicating the predicted location of the first external electronic device.

According to an embodiment, a second external electronic device may comprise a communication circuit and at least one processor operatively connected with the communication circuit.

According to an embodiment, the at least one processor may be configured to establish, via the communication circuit, a connection with an electronic device.

According to an embodiment, the at least one processor may be further configured to receive, from the electronic device via the communication circuit, a packet for requesting to operate as a relay device for obtaining a location of a first external electronic device for a location-based service for the first external electronic device.

According to an embodiment, the at least one processor may be further configured to establish, via the communication circuit, a connection with the first external electronic device.

According to an embodiment, the at least one processor may be further configured to transmit, to the electronic device via the communication circuit, a packet including a distance and a direction between the second external electronic device and the first external electronic device.

According to an embodiment, an electronic device may comprise a display, a communication circuit, and at least one processor operatively connected with the display and the communication circuit.

According to an embodiment, the at least one processor may be configured to transmit, to a third external electronic device via the communication circuit, a packet for requesting to perform a location-based service for a first external electronic device upon identifying that the location-based service for the first external electronic device is executed.

According to an embodiment, the at least one processor may be further configured to receive, from the third external electronic device via the communication circuit, a packet indicating a location of the first external electronic device is obtained by a second external electronic device which operates a relay device for obtaining the location of the first external electronic device.

According to an embodiment, the at least one processor may be further configured to display, via the display, information indicating that the location of the first external electronic device is obtained by the second external electronic device.

According to an embodiment, a third external electronic device may comprise a communication circuit and at least one processor operatively connected with the communication circuit.

According to an embodiment, the at least one processor may be configured to receive, from an electronic device via the communication circuit, a packet for requesting to perform a location-based service for a first external electronic device.

According to an embodiment, the at least one processor may be further configured to transmit, to a second external electronic device which operates as a relay device for obtaining a location of the first external electronic device via the communication circuit, a packet for requesting to perform the location-based service for the first external electronic device.

According to an embodiment, the at least one processor may be further configured to receive, from the second external electronic device via the communication circuit, a packet indicating that the location of the first external electronic device is obtained.

According to an embodiment, the at least one processor may be further configured to transmit, to the electronic device via the communication circuit, a packet indicating that the location of the first external electronic device is obtained by the second external electronic device.

According to an embodiment, an operating method of an electronic device may comprise establishing a connection with a second external electronic device upon identifying that a packet is not received from a first external electronic device during set time while providing a location-based service for the first external electronic device.

According to an embodiment, the operating method may further comprise transmitting, to the second external electronic device, a packet for requesting to operate as a relay device for obtaining a location of the first external electronic device.

According to an embodiment, the operating method may further comprise receiving, from the second external electronic device, a packet including a distance and a direction between the second external electronic device and the first external electronic device.

According to an embodiment, the operating method may further comprise predicting a location of the first external electronic device based on a distance and a direction between the electronic device and the second external electronic device, and the distance and the direction between the second external electronic device and the first external electronic device.

According to an embodiment, the operating method may further comprise displaying information indicating the predicted location of the first external electronic device.

According to an embodiment, the operating method of a second external electronic device may comprise establishing a connection with an electronic device.

According to an embodiment, the operating method may further comprise receiving, from the electronic device, a packet for requesting to operate as a relay device for obtaining a location of a first external electronic device for a location-based service for the first external electronic device.

According to an embodiment, the operating method may further comprise establishing a connection with the first external electronic device.

According to an embodiment, the operating method may further comprise transmitting, to the electronic device, a packet including a distance and a direction between the second external electronic device and the first external electronic device.

According to an embodiment, an operating method of an electronic device may comprise transmitting, to a third external electronic device, a packet for requesting to perform a location-based service for a first external electronic device upon identifying that the location-based service for the first external electronic device is executed.

According to an embodiment, the operating method of an electronic device may further comprise receiving, from the third external electronic device, a packet indicating a location of the first external electronic device is obtained by a second external electronic device which operates a relay device for obtaining the location of the first external electronic device.

According to an embodiment, the operating method of an electronic device may further comprise displaying information indicating that the location of the first external electronic device is obtained by the second external electronic device.

According to an embodiment, an operating method of a third external electronic device may comprise receiving, from an electronic device, a packet for requesting to perform a location-based service for a first external electronic device.

According to an embodiment, the operating method may further comprise transmitting, to a second external electronic device which operates as a relay device for obtaining a location of the first external electronic device, a packet for requesting to perform the location-based service for the first external electronic device.

According to an embodiment, the operating method may further comprise receiving, from the second external electronic device, a packet indicating that the location of the first external electronic device is obtained.

According to an embodiment, the operating method may further comprise transmitting, to the electronic device, a packet indicating that the location of the first external electronic device is obtained by the second external electronic device.

A non-transitory computer readable storage medium storing one or more programs, the one or more programs comprising instructions configured to, when executed by at least one processor of an electronic device, cause the electronic device to establish a connection with a second external electronic device upon identifying that a packet is not received from a first external electronic device during set time while providing a location-based service for the first external electronic device.

According to an embodiment, the instructions may be configured to cause the electronic device to transmit, to the second external electronic device, a packet for requesting to operate as a relay device for obtaining a location of the first external electronic device.

According to an embodiment, the instructions may be further configured to cause the electronic device to receive, from the second external electronic device, a packet including a distance and a direction between the second external electronic device and the first external electronic device.

According to an embodiment, the instructions may be further configured to cause the electronic device to predict a location of the first external electronic device based on a distance and a direction between the electronic device and the second external electronic device, and the distance and the direction between the second external electronic device and the first external electronic device.

According to an embodiment, the instructions may be further configured to cause the electronic device to display information indicating the predicted location of the first external electronic device.

A non-transitory computer readable storage medium storing one or more programs, the one or more programs comprising instructions configured to, when executed by at least one processor of a second external electronic device, cause the second external electronic device to establish a connection with an electronic device.

According to an embodiment, the instructions may be further configured to cause the second external electronic device to receive, from the electronic device, a packet for requesting to operate as a relay device for obtaining a location of a first external electronic device for a location-based service for the first external electronic device.

According to an embodiment, the instructions may be further configured to cause the second external electronic device to establish a connection with the first external electronic device.

According to an embodiment, the instructions may be further configured to cause the second external electronic device to transmit, to the electronic device, a packet including a distance and a direction between the second external electronic device and the first external electronic device.

According to an embodiment, a non-transitory computer readable storage medium storing one or more programs, the one or more programs comprising instructions configured to, when executed by at least one processor of an electronic device, cause the electronic device to transmit, to a third external electronic device, a packet for requesting to perform a location-based service for a first external electronic device upon identifying that the location-based service for the first external electronic device is executed.

According to an embodiment, the instructions may be further configured to cause the electronic device to receive, from the third external electronic device, a packet indicating a location of the first external electronic device is obtained by a second external electronic device which operates a relay device for obtaining the location of the first external electronic device.

According to an embodiment, the instructions may be further configured to cause the electronic device to display information indicating that the location of the first external electronic device is obtained by the second external electronic device.

A non-transitory computer readable storage medium storing one or more programs, the one or more programs comprising instructions configured to, when executed by at least one processor of a third external electronic device, cause the third external electronic device to receive, from an electronic device, a packet for requesting to perform a location-based service for a first external electronic device.

According to an embodiment, the instructions may be further configured to cause the third external electronic device to transmit, to a second external electronic device which operates as a relay device for obtaining a location of the first external electronic device, a packet for requesting to perform the location-based service for the first external electronic device.

According to an embodiment, the instructions may be further configured to cause the third external electronic device to receive, from the second external electronic device, a packet indicating that the location of the first external electronic device is obtained.

According to an embodiment, the instructions may be further configured to cause the third external electronic device to transmit, to the electronic device, a packet indicating that the location of the first external electronic device is obtained by the second external electronic device.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

Figure 1:
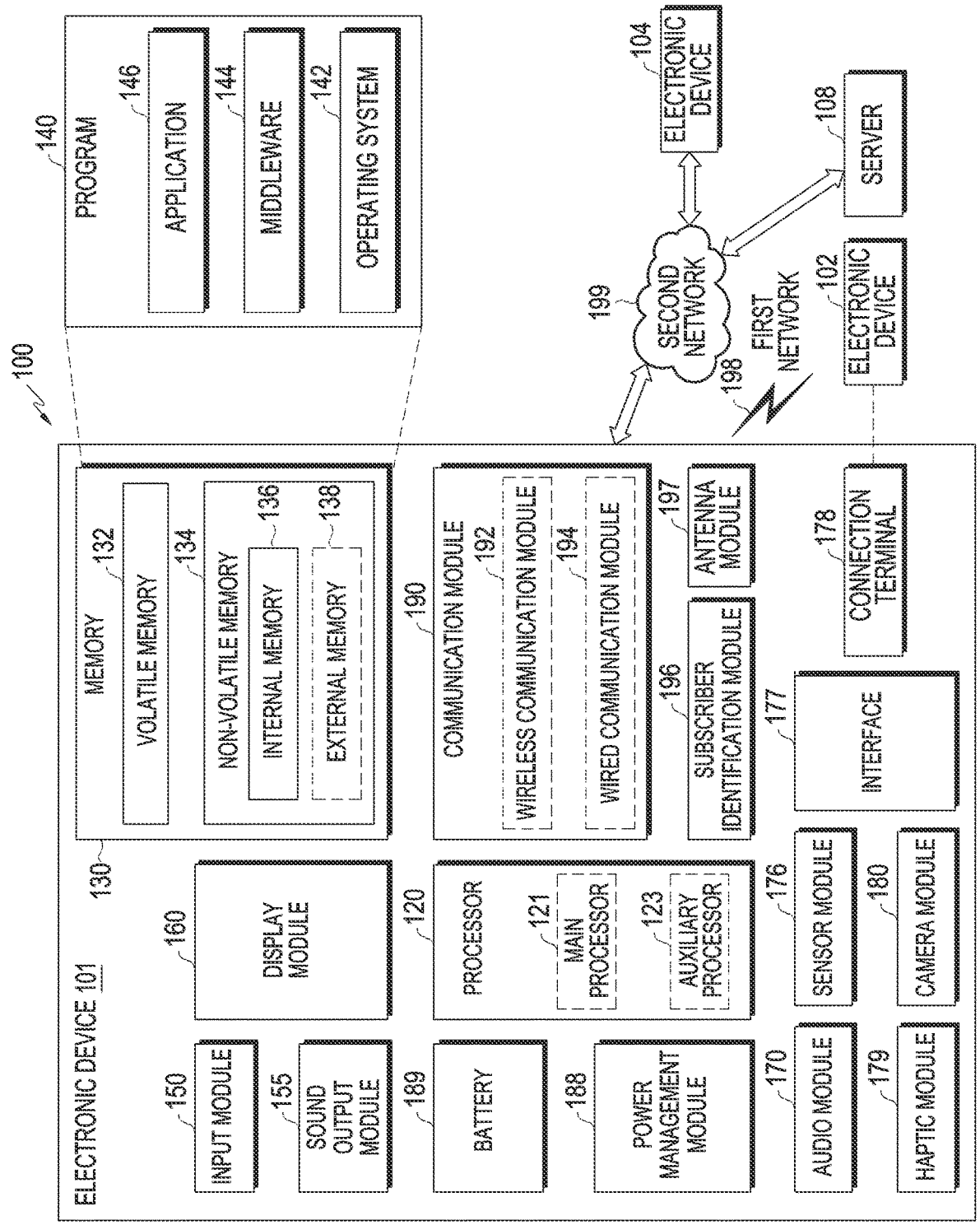
FIG. 1 is a block diagram illustrating an electronic device in a network environment according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be noted that the technical terms used herein are only used to describe specific embodiments, and are not intended to limit the disclosure. The technical terms used herein should be interpreted to have the same meaning as those commonly understood by a person skilled in the art to which the disclosure pertains, and should not be interpreted have excessively comprehensive or excessively restricted meanings unless particularly defined as other meanings. When the technical terms used herein are wrong technical terms that cannot correctly represent the idea of the disclosure, it should be appreciated that they are replaced by technical terms correctly understood by those skilled in the art. The general terms used herein should be interpreted as defined in dictionaries or interpreted in the context of the relevant part, and should not be interpreted to have excessively restricted meanings.

As used herein, such an expression as "comprises" or "include", and/or the like should not be interpreted to necessarily include all elements or all operations described in the specification, and should be interpreted to be allowed to exclude some of them or further include additional elements or operations.

Terms including an ordinal number, such as expressions "a first", "a second", and/or the like may be used to described various elements, but the corresponding elements should not be limited by such terms. These terms are used merely to distinguish between one element and any other element. For example, a first element may be termed a second element, and similarly, a second element may be termed a first element without departing from the scope of the disclosure.

It should be understood that when an element is referred to as being "connected" or "coupled" to another element, it may be connected or coupled directly to the other element, or any other element may be interposer between them. In contrast, it should be understood that when an element is referred to as being "directly connected" or "directly coupled" to another element, there are no element interposed between them.

Hereinafter, an embodiment of the disclosure will be described in detail with reference to the accompanying drawings. Regardless of drawing signs, the same or like elements are provided with the same reference numeral, and a repeated description thereof will be omitted. Alternatively, in describing an embodiment of the disclosure, a detailed description of relevant known technologies will be omitted when it is determined that the description may make the subject matter of the disclosure unclear. Alternatively, it should be noted that the accompanying drawings are presented merely to help easy understanding of the technical idea of the disclosure, and should not be construed to limit the technical idea of the disclosure. The technical idea of the disclosure should be construed to cover all changes, equivalents, and alternatives, in addition to the drawings.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to an embodiment, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to an embodiment may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that an embodiment of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with an embodiment of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities, and some of the multiple entities may be separately disposed in different components. According to an embodiment, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

Figure 2:
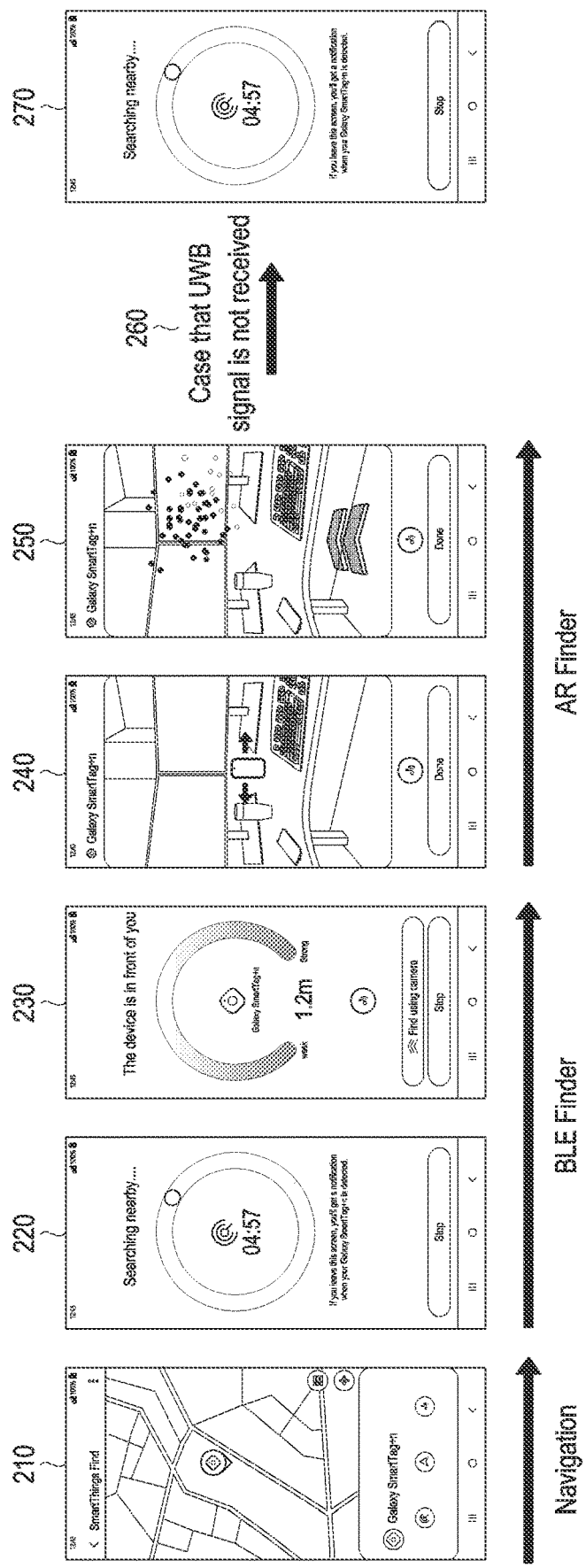
FIG. 2 is a diagram illustrating an example of a user interface (UI) provided according to a location-based service in a wireless communication network according to an embodiment of the disclosure.

FIG. 2 is a diagram illustrating an example of a user interface (UI) provided according to a location-based service in a wireless communication network according to an embodiment of the disclosure.

Referring to FIG. 2, an electronic device (e.g., a smart phone) connects with a first external electronic device and at least one second external electronic device (e.g., an IoT device) existing in various spaces within a wireless communication network to provide a location-based service (e.g., an automation service and/or a find service). For example, the first external electronic device may include a smart tag (e.g., a Samsung Galaxy smart tag), a smart button, and/or a wearable electronic device (e.g., a smart watch or earbuds).

In the finding service, a target electronic device which the electronic device intends to find may be the first external electronic device. If the finding service is executed, the electronic device may establish a connection (e.g., an ultra wide band (UWB) connection) with the first external electronic device based on a short-range wireless communication scheme (e.g., a UWB scheme). The electronic device may obtain a distance and an angle between the electronic device and the first external electronic device through the UWB connection established between the electronic device and the first external electronic device, and may obtain a location of the first external electronic device based on the obtained distance and angle between the electronic device and the first external electronic device. The electronic device may display the obtained location of the first external electronic device through a UI.

If the UWB scheme is used, the electronic device and the first external electronic device operate as an initiator and a responder, respectively, and the electronic device may obtain a distance and a direction between the electronic device and the first external electronic device through a 1:1 communication between the electronic device and the first external electronic device. However, because a UWB antenna generally has a directional radiation pattern, if a direction of the electronic device does not match a direction of the first external electronic device, if there is an obstacle between the electronic device and the first external electronic device, and/or if the distance between the electronic device and the first external electronic device is longer than a threshold distance, the electronic device may not receive a UWB signal (e.g., a UWB packet) from the first external electronic device. As the electronic device may not receive the UWB signal from the first external electronic device, a stable UWB communication between the electronic device and the first external electronic device may not be guaranteed. For example, if the first external electronic device is attached to a pet such as a dog or a cat, the location of the first external electronic device may also change very frequently due to the nature of the pet, which moves a lot. These very frequent changes in location may make it difficult to guarantee the stable UWB communication between the electronic device and the first external electronic device.

As illustrated in FIG. 2, if a finding service is executed through an IoT-based application (e.g., a Samsung Smart-Things application) in the electronic device (210), the electronic device may perform a searching operation for the first external electronic device (e.g., the smart tag) (220). If the electronic device discovers the first external electronic device, the electronic device and the first external electronic device may establish a BLE connection, and display a message including information indicating a distance between the electronic device and the first external electronic device through a UI on a BLE finder (230). If a UWB connection is established between the electronic device and the first external electronic device, an augmented reality (AR) finder may be executed to perform a scan operation (240). The electronic device may obtain a distance and a direction between the electronic device and the first external electronic device through the established UWB connection, and display the location of the first external electronic device through a UI on the AR finder based on the obtained distance and direction between the electronic device and the first external electronic device (250).

However, because the UWB antenna generally has the directional radiation pattern, if the direction of the electronic device does not match the direction of the first external electronic device, if there is the obstacle between the electronic device and the first external electronic device, and/or if the distance between the electronic device and the first external electronic device is longer than the threshold distance, the electronic device may not receive a UWB signal from the first external electronic device (260). If the stable UWB communication between the electronic device and the first external electronic device is not guaranteed, the electronic device may not obtain the distance and the direction between the electronic device and the first external electronic device. If the distance and the direction between the electronic device and the first external electronic device are not obtained, the location of the first external electronic device may not be obtained and the location of the first external electronic device may not be displayed. Because the location of the first external electronic device is not obtained, the electronic device may perform a searching operation for the first external electronic device again (270). For example, if the searching operation for the first external electronic device is performed in a state in which the BLE connection is not established between the electronic device and the first external electronic device, the electronic device may display a message (e.g., "Searching nearby . . . ") including information indicating that the electronic device searches for the first external electronic device through a UI (270). As another example, if the searching operation for the first external electronic device is performed in a state in which the BLE connection is established between the electronic device and the first external electronic device, the electronic device may display a message including information indicating the distance between the electronic device and the first external electronic device through a UI on the BLE finder (230).

Figure 3:
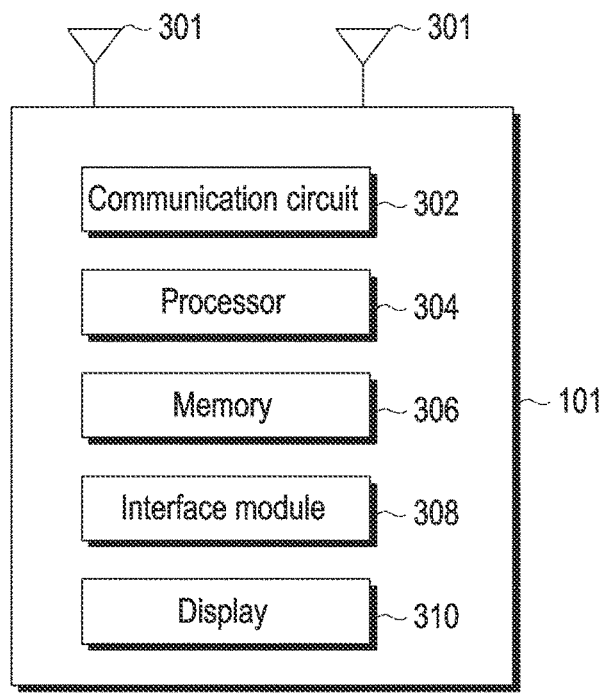
FIG. 3 is a block diagram illustrating an example of an internal structure of an electronic device according to an embodiment of the disclosure.

FIG. 3 is a block diagram illustrating an example of an internal structure of an electronic device according to an embodiment of the disclosure.

Referring to FIG. 3, an electronic device 101 (e.g., an electronic device 101 in FIG. 1) may be a device implementing a location-based service (e.g., an automation service and/or a finding service). The electronic device 101 may be a device supporting a long term evolution (LTE) scheme, a Zigbee scheme, a Z-Wave scheme, a Wi-Fi scheme, a Bluetooth low energy (BLE) scheme, a UWB scheme, and/or a global positioning system (GPS) scheme. The electronic device 101 may include a communication circuit 302 (e.g., a communication module 190 in FIG. 1) for transmitting and receiving signals to and from a first external electronic device (e.g., an electronic device 102 in FIG. 1), at least one second external electronic device, and/or a third external electronic device (e.g., a server 108 in FIG. 1) using one or more antennas 301. The one or more antennas 301 may be implemented as a part of an antenna module 198 in FIG. 1.

The communication circuit 302 may include a plurality of communication circuits, and the plurality of communication circuits may include a communication circuit which is based on the LTE scheme, the BLE scheme, the UWB scheme, the Zigbee scheme, the Z-wave scheme, and/or the Wi-Fi scheme. The electronic device 101 may omit a separate communication circuit which is based on each of the LTE scheme, the BLE scheme, the UWB scheme, the Zigbee scheme, the Z-Wave scheme, and/or the Wi-Fi scheme, and may include a communication circuit which is based on at least two of the LTE scheme, the BLE scheme, the UWB scheme, the Zigbee scheme, the Z-Wave scheme, and/or the Wi-Fi scheme, or all of the LTE scheme, the BLE scheme, the UWB scheme, the Zigbee scheme, the Z-Wave scheme, and/or the Wi-Fi scheme. The communication circuit which is based on the at least two of the LTE scheme, the BLE scheme, the UWB scheme, the Zigbee scheme, the Z-Wave scheme, and/or the Wi-Fi scheme, or all of the LTE scheme, the BLE scheme, the UWB scheme, the Zigbee scheme, the Z-Wave scheme, and/or the Wi-Fi scheme may be the communication circuit 302.

The electronic device 101 may include an interface 308 (e.g., an interface 177 in FIG. 1) which provides a wired and/or wireless interface for communicating with components outside a network. At least a portion of the one or more antennas 301, the communication circuit 302, or the interface 177 may be implemented as at least a portion of the communication module 190 and the antenna module 198 in FIG. 1.

The electronic device 101 may include a processor 304 (e.g., a processor 120 in FIG. 1) which may be implemented with one or more single-core processors or one or more multi-core processors, and a memory 306 (e.g., a memory 130 in FIG. 1) which stores instructions for an operation of the electronic device 101.

The memory 306 may include a UI related to an application (e.g., a Samsung SmartThings application) for executing a location-based service, and images, user information, documents, databases, or related data for providing the UI. If the application for executing the location-based service is executed under the control of the processor 304, a display 310 (e.g., a display module 160 in FIG. 1) may display the UI related to the executed application.

Figure 4:
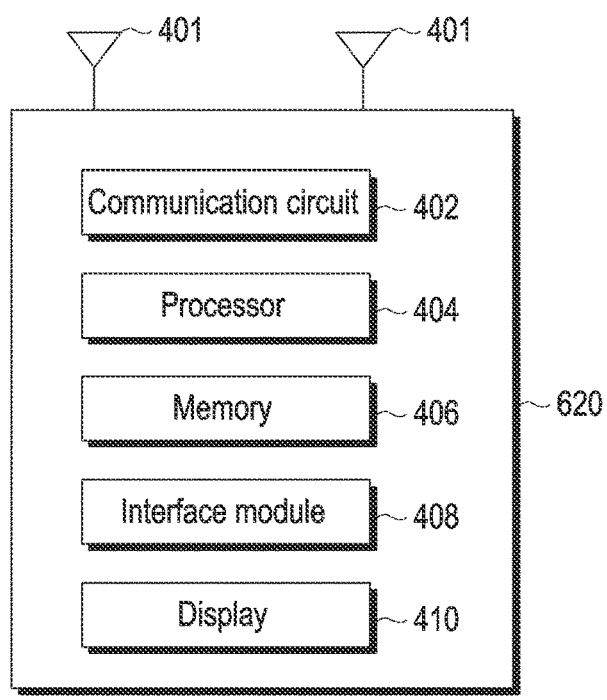
FIG. 4 is a block diagram illustrating an example of an internal structure of a second external electronic device according to an embodiment of the disclosure.

FIG. 4 is a block diagram illustrating an example of an internal structure of a second external electronic device according to an embodiment of the disclosure.

Referring to FIG. 4, a second external electronic device 620 may be a device implementing a location-based service (e.g., an automation service and/or a finding service). The second external electronic device 620 may be a device implementing the finding service for a first external electronic device by interworking an electronic device (e.g., an electronic device 101 in FIG. 1 or FIG. 3).

The second external electronic device 620 may include antennas 401, a communication circuit 402, a processor 404, a memory 406, an interface module 408, and/or a display 410. In an embodiment, the communication circuit 402, the processor 404, the memory 406, the interface module 408, and/or the display 410 may be implemented similarly to or substantially the same as a communication circuit 302, a processor 304, a memory 306, an interface module 308, and/or a display 310 as described in FIG. 3, respectively, and a detailed description thereof will be omitted.

According to an embodiment of the disclosure, a first external electronic device may also include a communication circuit, a processor, a memory, an interface module, and/or a display similarly to the second external electronic device 620, and the communication circuit, the processor, the memory, the interface module, and/or the display included in the first external electronic device may be also implemented similarly to or substantially the same as the communication circuit 302, the processor 304, the memory 306, the interface module 308, and/or the display 310 as described in FIG. 3, so a detailed description thereof will be omitted.

Figure 5:
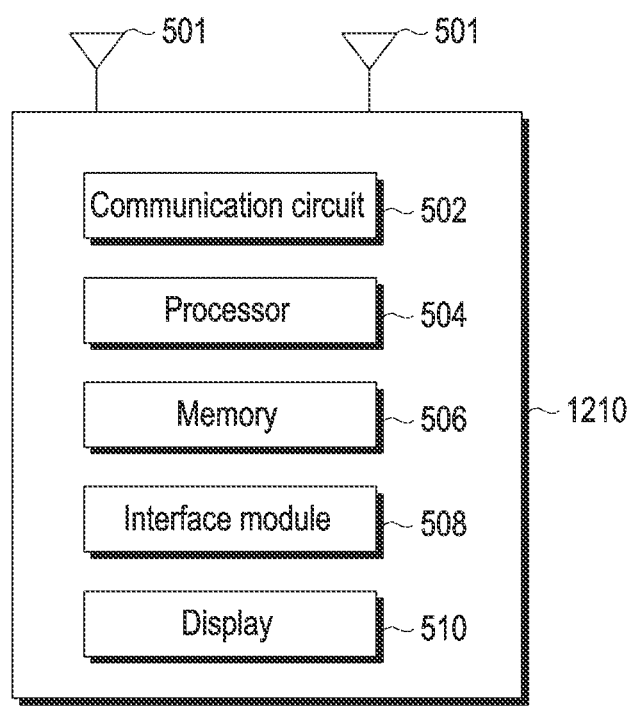
FIG. 5 is a block diagram illustrating an example of an internal structure of a third external electronic device according to an embodiment of the disclosure.

FIG. 5 is a block diagram illustrating an example of an internal structure of a third external electronic device according to an embodiment of the disclosure.

Referring to FIG. 5, a third external electronic device 1210 may be a device implementing a location-based service (e.g., an automation service and/or a finding service). The third external electronic device 1210 may include antennas 501, a communication circuit 502, a processor 504, a memory 506, an interface module 508, and/or a display 510. The communication circuit 502, the processor 504, the memory 506, the interface module 508, and/or the display 510 may be implemented similarly to or substantially the same as a communication circuit 302, a processor 304, a memory 306, an interface module 308, and/or a display 310 as described in FIG. 3, respectively, and a detailed description thereof will be omitted.

Figure 6:
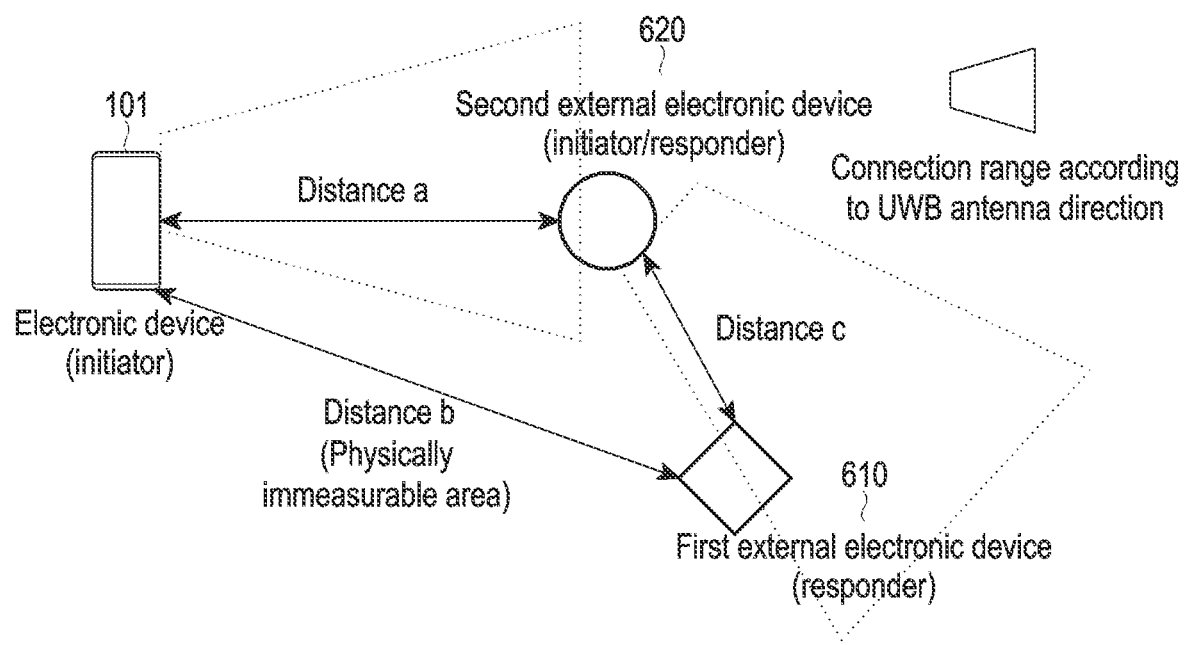
FIG. 6 is a diagram illustrating an example of a location-based service in a wireless communication network according to an embodiment of the disclosure.

FIG. 6 is a diagram illustrating an example of a location-based service in a wireless communication network according to an embodiment of the disclosure.

Referring to FIG. 6, a location-based service may be a finding service. A wireless communication network may include an electronic device 101, a first external electronic device 610, and/or the second external electronic device 620. According to an embodiment of the disclosure, the electronic device 101 may be the electronic device 101 in FIG. 1 or FIG. 3, the first external electronic device 610 may be the electronic device 102 in FIG. 1, and the second external electronic device 620 may be a device which provides a finding service for the first external electronic device 610 in cooperation with the electronic device 101 under the control of the electronic device 101. The second external electronic device 620 may be an IoT device (e.g., home appliances such as a TV, a light, an air conditioner, an oven, or a speaker) or a user device (e.g., a smart phone or a wearable electronic device). The first external electronic device 610 may connect with the electronic device 101 to provide the finding service. For example, the first external electronic device 610 may be a smart tag (e.g., a Samsung Galaxy smart tag), a smart button, or a wearable electronic device (e.g., a smart watch or earbuds).

The finding service is executed through an IoT-based application (e.g., a Samsung SmartThings application), the electronic device 101 may perform a searching operation for the first external electronic device 610. Upon discovering the first external electronic device 610, the electronic device 101 may establish a UWB connection with the first external electronic device 610. As the UWB connection is established between the electronic device 101 and the first external electronic device 610, the electronic device 101 may execute an AR finder to perform a scan operation. The electronic device 101 may obtain a distance and a direction between the electronic device 101 and the first external electronic device 610 through the established UWB connection, and may obtain a location of the first external electronic device 610 based on the obtained distance and direction between the electronic device 101 and the first external electronic device 610. The electronic device 101 may display the location of the first external electronic device 610 through a UI on the AR finder.

However, because a UWB antenna has a directional radiation pattern, if a direction of the electronic device 101 does not match a direction of the first external electronic device 610, if there is an obstacle between the electronic device 101 and the first external electronic device 610, or if the distance between the electronic device 101 and the first external electronic device 610 is longer than a threshold distance, the electronic device 101 may not receive a UWB signal (e.g., a UWB packet) from the first external electronic device 610.

If the UWB signal is not received from the first external electronic device 610 during a set time, the electronic device 101 may select at least one of set helper devices as the second external electronic device 620. In FIG. 6, the distance between the electronic device 101 and the first external electronic device 610 may be longer than a threshold distance which may be measured based on a UWB scheme, and the electronic device may not receive the UWB signal from the external electronic device 610 during the set time due to this. The second external electronic device 620 may be a UWB relay device. The UWB relay device may be an electronic device which may establish a UWB connection with the first external electronic device 610 according to a request of the electronic device 101 to obtain a location and a direction of the first external electronic device 610 through the established UWB connection.

Helper devices may be electronic devices with which state information and access authority for the first external electronic device 610 may be shared by the electronic device 101. The helper devices may be remaining electronic devices other for the electronic device 101 among electronic devices registered in the wireless communication network. The helper devices may be electronic devices registered in the same account (e.g., the same user account) as the electronic device 101. A helper device may be an electronic device capable of providing the finding service for the first external electronic device 610 in cooperation with the electronic device 101 according to a request from the electronic device 101. The helper device may support the UWB scheme.

The first external electronic device 610 may maintain sessions (e.g., UWB connections) whose number is less than or equal to a set number, and a UWB communication may be performed based on a two-way ranging protocol for the UWB connections whose number is less than or equal to the set number. If the number of sessions is greater than the set number, the first external electronic device 610 may perform a UWB communication based on a one-way ranging (OWR) protocol. The set number may be a maximum number of UWB connections which the first external electronic device 610 may establish. The two-way ranging protocol may be a double side two-way ranging (DS-TWR) protocol.

An electronic device (e.g., an electronic device 101 in FIG. 1, FIG. 3, or FIG. 6) may comprise a display (e.g., a display module in FIG. 1 or a display 310 in FIG. 3), a communication circuit (e.g., a communication module 190 in FIG. 1 or a communication circuit 302 in FIG. 3), and at least one processor (e.g., a processor 120 in FIG. 1 or a processor 304 in FIG. 3) operatively connected with the display (e.g., the display module in FIG. 1 or the display 310 in FIG. 3) and the communication circuit (e.g., the communication module 190 in FIG. 1 or the communication circuit 302 in FIG. 3).

The at least one processor (e.g., the processor 120 in FIG. 1 or the processor 304 in FIG. 3) may be configured to establish, via the communication circuit (e.g., the communication module 190 in FIG. 1 or the communication circuit 302 in FIG. 3), a connection with a second external electronic device (e.g., a second external electronic device 620 in FIG. 4 or FIG. 6) upon identifying that a packet is not received from a first external electronic device (e.g., an electronic device 102 in FIG. 1 or a first external electronic device 610 in FIG. 6) during set time while providing a location-based service for the first external electronic device (e.g., the electronic device 102 in FIG. 1 or the first external electronic device 610 in FIG. 6).

The at least one processor (e.g., the processor 120 in FIG. 1 or the processor 304 in FIG. 3) may be further configured to transmit, to the second external electronic device (e.g., the second external electronic device 620 in FIG. 4 or FIG. 6) via the communication circuit (e.g., the communication module 190 in FIG. 1 or the communication circuit 302 in FIG. 3), a packet for requesting to operate as a relay device for obtaining a location of the first external electronic device (e.g., the electronic device 102 in FIG. 1 or the first external electronic device 610 in FIG. 6).

The at least one processor (e.g., the processor 120 in FIG. 1 or the processor 304 in FIG. 3) may be further configured to receive, from the second external electronic device (e.g., the second external electronic device 620 in FIG. 4 or FIG. 6) via the communication circuit (e.g., the communication module 190 in FIG. 1 or the communication circuit 302 in FIG. 3), a packet including a distance and a direction between the second external electronic device (e.g., the second external electronic device 620 in FIG. 4 or FIG. 6) and the first external electronic device (e.g., the electronic device 102 in FIG. 1 or the first external electronic device 610 in FIG. 6).

The at least one processor (e.g., the processor 120 in FIG. 1 or the processor 304 in FIG. 3) may be further configured to predict a location of the first external electronic device (e.g., the electronic device 102 in FIG. 1 or the first external electronic device 610 in FIG. 6) based on a distance and a direction between the electronic device (e.g., the electronic device 101 in FIG. 1, FIG. 3, or FIG. 6) and the second external electronic device (e.g., the second external electronic device 620 in FIG. 4 or FIG. 6), and the distance and the direction between the second external electronic device (e.g., the second external electronic device 620 in FIG. 4 or FIG. 6) and the first external electronic device (e.g., the electronic device 102 in FIG. 1 or the first external electronic device 610 in FIG. 6).

The at least one processor (e.g., the processor 120 in FIG. 1 or the processor 304 in FIG. 3) may be further configured to display, through the display (e.g., the display module in FIG. 1 or the display 310 in FIG. 3), information indicating the predicted location of the first external electronic device (e.g., the electronic device 102 in FIG. 1 or the first external electronic device 610 in FIG. 6).

The packet for requesting to operate as the relay device may include at least one of device information of the first external electronic device (e.g., the electronic device 102 in FIG. 1 or the first external electronic device 610 in FIG. 6), a command for requesting to turn on a searching function to provide a finding service for the first external electronic device (e.g., the electronic device 102 in FIG. 1 or the first external electronic device 610 in FIG. 6), or information related to a protocol.

The searching function may be a searching function using a ultra wide band (UWB), and the information related to the protocol may include at least one of information related to a ranging protocol to be used for a UWB ranging operation between the second external electronic device (e.g., the second external electronic device 620 in FIG. 4 or FIG. 6) and the first external electronic device (e.g., the electronic device 102 in FIG. 1 or the first external electronic device 610 in FIG. 6), or information related to a protocol type supported in the first external electronic device (e.g., the electronic device 102 in FIG. 1 or the first external electronic device 610 in FIG. 6).

The distance and the direction between the second external electronic device (e.g., the second external electronic device 620 in FIG. 4 or FIG. 6) and the first external electronic device (e.g., the electronic device 102 in FIG. 1 or the first external electronic device 610 in FIG. 6) may be obtained through an ultra wide band (UWB) connection, and the packet including the distance and the direction between the second external electronic device (e.g., the second external electronic device 620 in FIG. 4 or FIG. 6) and the first external electronic device (e.g., the electronic device 102 in FIG. 1 or the first external electronic device 610 in FIG. 6) may further include at least one of device information of the second external electronic device (e.g., the second external electronic device 620 in FIG. 4 or FIG. 6), device information of the first external electronic device (e.g., the electronic device 102 in FIG. 1 or the first external electronic device 610 in FIG. 6), or information related to a ranging protocol used for a UWB ranging operation between the second external electronic device (e.g., the second external electronic device 620 in FIG. 4 or FIG. 6) and the first external electronic device (e.g., the electronic device 102 in FIG. 1 or the first external electronic device 610 in FIG. 6).

A second external electronic device (e.g., a second external electronic device 620 in FIG. 4 or FIG. 6) may comprise a communication circuit (e.g., a communication circuit 402 in FIG. 4) and at least one processor (e.g., a processor 404 in FIG. 4) operatively connected with the communication circuit (e.g., the communication circuit 402 in FIG. 4).

The at least one processor (e.g., the processor 404 in FIG. 4) may be configured to establish, via the communication circuit (e.g., the communication circuit 402 in FIG. 4), a connection with an electronic device (e.g., an electronic device 101 in FIG. 1, FIG. 3, or FIG. 6).

The at least one processor (e.g., the processor 404 in FIG. 4) may be further configured to receive, from the electronic device (e.g., the electronic device 101 in FIG. 1, FIG. 3, or FIG. 6) via the communication circuit (e.g., the communication circuit 402 in FIG. 4), a packet for requesting to operate as a relay device for obtaining a location of a first external electronic device (e.g., an electronic device 102 in FIG. 1 or a first external electronic device 610 in FIG. 6) for a location-based service for the first external electronic device (e.g., the electronic device 102 in FIG. 1 or the first external electronic device 610 in FIG. 6).

The at least one processor (e.g., the processor 404 in FIG. 4) may be further configured to establish, via the communication circuit (e.g., the communication circuit 402 in FIG. 4), a connection with the first external electronic device (e.g., the electronic device 102 in FIG. 1 or the first external electronic device 610 in FIG. 6).

The at least one processor (e.g., the processor 404 in FIG. 4) may be further configured to transmit, to the electronic device (e.g., the electronic device 101 in FIG. 1, FIG. 3, or FIG. 6) via the communication circuit (e.g., the communication circuit 402 in FIG. 4), a packet including a distance and a direction between the second external electronic device (e.g., the second external electronic device 620 in FIG. 4 or FIG. 6) and the first external electronic device (e.g., the electronic device 102 in FIG. 1 or the first external electronic device 610 in FIG. 6).

The connection between the second external electronic device (e.g., the second external electronic device 620 in FIG. 4 or FIG. 6) and the first external electronic device (e.g., the electronic device 102 in FIG. 1 or the first external electronic device 610 in FIG. 6) may be an ultra wide band (UWB) connection, and the packet including the distance and the direction between the second external electronic device (e.g., the second external electronic device 620 in FIG. 4 or FIG. 6) and the first external electronic device (e.g., the electronic device 102 in FIG. 1 or the first external electronic device 610 in FIG. 6) may further include at least one of device information of the second external electronic device (e.g., the second external electronic device 620 in FIG. 4 or FIG. 6), device information of the first external electronic device (e.g., the electronic device 102 in FIG. 1 or the first external electronic device 610 in FIG. 6), or information related to a ranging protocol used for a UWB ranging operation between the second external electronic device (e.g., the second external electronic device 620 in FIG. 4 or FIG. 6) and the first external electronic device (e.g., the electronic device 102 in FIG. 1 or the first external electronic device 610 in FIG. 6).

An electronic device (e.g., an electronic device 101 in FIG. 1, FIG. 3, FIGS. 12A and 12B, or FIGS. 13A and 13B) may comprise a display (e.g., a display module 160 in FIG. 1 or a display 310 in FIG. 3), a communication circuit (e.g., a communication module 190 in FIG. 1 or a communication circuit 302 in FIG. 3), and at least one processor (e.g., a processor 120 in FIG. 1 or a processor 304 in FIG. 3) operatively connected with the display (e.g., the display module 160 in FIG. 1 or the display 310 in FIG. 3) and the communication circuit (e.g., the communication module 190 in FIG. 1 or the communication circuit 302 in FIG. 3).

The at least one processor (e.g., the processor 120 in FIG. 1 or the processor 304 in FIG. 3) may be configured to transmit, to a third external electronic device (e.g., a server 108 in FIG. 1 or a third external electronic device 1210 in FIG. 5, FIGS. 12A and 12B, or FIGS. 13A and 13B) via the communication circuit (e.g., the communication module 190 in FIG. 1 or the communication circuit 302 in FIG. 3), a packet for requesting to perform a location-based service for a first external electronic device (e.g., an electronic device 102 in FIG. 1 or a first external electronic device 610 in FIGS. 12A and 12B, or FIGS. 13A and 13B) upon identifying that the location-based service for the first external electronic device (e.g., the electronic device 102 in FIG. 1 or the first external electronic device 610 in FIGS. 12A and 12B, or FIGS. 13A and 13B) is executed.

The at least one processor (e.g., the processor 120 in FIG. 1 or the processor 304 in FIG. 3) may be further configured to receive, from the third external electronic device (e.g., the server 108 in FIG. 1 or the third external electronic device 1210 in FIG. 5, FIGS. 12A and 12B, or FIGS. 13A and 13B) via the communication circuit (e.g., the communication module 190 in FIG. 1 or the communication circuit 302 in FIG. 3), a packet indicating a location of the first external electronic device (e.g., the electronic device 102 in FIG. 1 or the first external electronic device 610 in FIGS. 12A and 12B, or FIGS. 13A and 13B) is obtained by a second external electronic device (e.g., a second external electronic device 620 in FIG. 4, FIGS. 12A and 12B, or FIGS. 13A and 13B) which operates a relay device for obtaining the location of the first external electronic device (e.g., the electronic device 102 in FIG. 1 or the first external electronic device 610 in FIGS. 12A and 12B, or FIGS. 13A and 13B).

At least one processor (e.g., the processor 120 in FIG. 1 or the processor 304 in FIG. 3) may be further configured to display, via the display (e.g., the display module 160 in FIG. 1 or the display 310 in FIG. 3), information indicating that the location of the first external electronic device (e.g., the electronic device 102 in FIG. 1 or the first external electronic device 610 in FIGS. 12A and 12B, or FIGS. 13A and 13B) is obtained by the second external electronic device (e.g., the second external electronic device 620 in FIG. 4, FIGS. 12A and 12B, or FIGS. 13A and 13B).

The packet for requesting to perform the location-based service for the first external electronic device (e.g., the electronic device 102 in FIG. 1 or the first external electronic device 610 in FIGS. 12A and 12B, or FIGS. 13A and 13B) may include device information of the first external electronic device (e.g., the electronic device 102 in FIG. 1 or the first external electronic device 610 in FIGS. 12A and 12B, or FIGS. 13A and 13B).

The connection between the second external electronic device (e.g., the second external electronic device 620 in FIG. 4, FIGS. 12A and 12B, or FIGS. 13A and 13B) and the first external electronic device (e.g., the electronic device 102 in FIG. 1 or the first external electronic device 610 in FIGS. 12A and 12B, or FIGS. 13A and 13B) may be an ultra wide band (UWB) connection, and the packet indicating that the location of the first external electronic device (e.g., the electronic device 102 in FIG. 1 or the first external electronic device 610 in FIGS. 12A and 12B, or FIGS. 13A and 13B) is obtained may include at least one of device information of the second external electronic device (e.g., the second external electronic device 620 in FIG. 4, FIGS. 12A and 12B, or FIGS. 13A and 13B), device information of the first external electronic device (e.g., the electronic device 102 in FIG. 1 or the first external electronic device 610 in FIGS. 12A and 12B, or FIGS. 13A and 13B), a distance and a direction between the second external electronic device (e.g., the second external electronic device 620 in FIG. 4, FIGS. 12A and 12B, or FIGS. 13A and 13B) and the first external electronic device (e.g., the electronic device 102 in FIG. 1 or the first external electronic device 610 in FIGS. 12A and 12B, or FIGS. 13A and 13B), or information related to a ranging protocol used for a UWB ranging operation between the second external electronic device (e.g., the second external electronic device 620 in FIG. 4, FIGS. 12A and 12B, or FIGS. 13A and 13B) and the first external electronic device (e.g., the electronic device 102 in FIG. 1 or the first external electronic device 610 in FIGS. 12A and 12B, or FIGS. 13A and 13B).

The at least one processor (e.g., the processor 120 in FIG. 1 or the processor 304 in FIG. 3) may be further configured to establish, via the communication circuit (e.g., the communication module 190 in FIG. 1 or the communication circuit 302 in FIG. 3), a connection with the second external electronic device (e.g., the second external electronic device 620 in FIG. 4, FIGS. 12A and 12B, or FIGS. 13A and 13B), receive, from the second external electronic device (e.g., the second external electronic device 620 in FIG. 4, FIGS. 12A and 12B, or FIGS. 13A and 13B) via the communication circuit (e.g., the communication module 190 in FIG. 1 or the communication circuit 302 in FIG. 3), a packet including a distance and a direction between the second external electronic device (e.g., the second external electronic device 620 in FIG. 4, FIGS. 12A and 12B, or FIGS. 13A and 13B) and the first external electronic device (e.g., the electronic device 102 in FIG. 1 or the first external electronic device 610 in FIGS. 12A and 12B, or FIGS. 13A and 13B), predict a location of the first external electronic device (e.g., the electronic device 102 in FIG. 1 or the first external electronic device 610 in FIGS. 12A and 12B, or FIGS. 13A and 13B)

based on a distance and a direction between the electronic device and the second external electronic device (e.g., the second external electronic device 620 in FIG. 4, FIGS. 12A and 12B, or FIGS. 13A and 13B), and a distance and a direction between the second external electronic device (e.g., the second external electronic device 620 in FIG. 4, FIGS. 12A and 12B, or FIGS. 13A and 13B) and the first external electronic device (e.g., the electronic device 102 in FIG. 1 or the first external electronic device 610 in FIGS. 12A and 12B, or FIGS. 13A and 13B), and display, via the display (e.g., the display module 160 in FIG. 1 or the display 310 in FIG. 3), information indicating the predicted location of the first external electronic device (e.g., the electronic device 102 in FIG. 1 or the first external electronic device 610 in FIGS. 12A and 12B, or FIGS. 13A and 13B).

The at least one processor (e.g., the processor 120 in FIG. 1 or the processor 304 in FIG. 3) may be further configured to receive, from the third external electronic device (e.g., the server 108 in FIG. 1 or the third external electronic device 1210 in FIG. 5, FIGS. 12A and 12B, or FIGS. 13A and 13B) via the communication circuit (e.g., the communication module 190 in FIG. 1 or the communication circuit 302 in FIG. 3), a packet including a distance and a direction between the second external electronic device (e.g., the second external electronic device 620 in FIG. 4, FIGS. 12A and 12B, or FIGS. 13A and 13B) and the first external electronic device (e.g., the electronic device 102 in FIG. 1 or the first external electronic device 610 in FIGS. 12A and 12B, or FIGS. 13A and 13B), and output, via the display (e.g., the display module 160 in FIG. 1 or the display 310 in FIG. 3), information including the distance and the direction between the second external electronic device (e.g., the second external electronic device 620 in FIG. 4, FIGS. 12A and 12B, or FIGS. 13A and 13B) and the first external electronic device (e.g., the electronic device 102 in FIG. 1 or the first external electronic device 610 in FIGS. 12A and 12B, or FIGS. 13A and 13B).

A third external electronic device (e.g., a server 108 in FIG. 1 or a third external electronic device 1210 in FIG. 5, FIGS. 12A and 12B, or FIGS. 13A and 13B) may comprise a communication circuit (e.g., a communication circuit 502 in FIG. 5) and at least one processor (e.g., a processor 504 in FIG. 5) operatively connected with the communication circuit (e.g., the communication circuit 502 in FIG. 5).

The at least one processor (e.g., the processor 504 in FIG. 5) may be configured to receive, from an electronic device (e.g., an electronic device 101 in FIG. 1, FIG. 3, FIGS. 12A and 12B, or FIGS. 13A and 13B) via the communication circuit (e.g., the communication circuit 502 in FIG. 5), a packet for requesting to perform a location-based service for a first external electronic device (e.g., an electronic device 102 in FIG. 1 or a first external electronic device 610 in FIGS. 12A and 12B, or FIGS. 13A and 13B).

The at least one processor (e.g., the processor 504 in FIG. 5) may be further configured to transmit, to a second external electronic device (e.g., a second external electronic device 620 in FIG. 4, FIGS. 12A and 12B, or FIGS. 13A and 13B) which operates as a relay device for obtaining a location of the first external electronic device (e.g., the electronic device 102 in FIG. 1 or the first external electronic device 610 in FIGS. 12A and 12B, or FIGS. 13A and 13B) via the communication circuit (e.g., the communication circuit 502 in FIG. 5), a packet for requesting to perform the location-based service for the first external electronic device (e.g., the electronic device 102 in FIG. 1 or the first external electronic device 610 in FIGS. 12A and 12B, or FIGS. 13A and 13B).

The at least one processor (e.g., the processor 504 in FIG. 5) may be further configured to receive, from the second external electronic device (e.g., the second external electronic device 620 in FIG. 4, FIGS. 12A and 12B, or FIGS. 13A and 13B) via the communication circuit (e.g., the communication circuit 502 in FIG. 5), a packet indicating that the location of the first external electronic device (e.g., the electronic device 102 in FIG. 1 or the first external electronic device 610 in FIGS. 12A and 12B, or FIGS. 13A and 13B) is obtained.

The at least one processor (e.g., the processor 504 in FIG. 5) may be further configured to transmit, to the electronic device (e.g., the electronic device 101 in FIG. 1, FIG. 3, FIGS. 12A and 12B, or FIGS. 13A and 13B) via the communication circuit (e.g., the communication circuit 502 in FIG. 5), a packet indicating that the location of the first external electronic device (e.g., the electronic device 102 in FIG. 1 or the first external electronic device 610 in FIGS. 12A and 12B, or FIGS. 13A and 13B) is obtained by the second external electronic device (e.g., the second external electronic device 620 in FIG. 4, FIGS. 12A and 12B, or FIGS. 13A and 13B).

The at least one processor (e.g., the processor 504 in FIG. 5) may configured to receive, from the second external electronic device (e.g., the second external electronic device 620 in FIG. 4, FIGS. 12A and 12B, or FIGS. 13A and 13B) via the communication circuit (e.g., the communication circuit 502 in FIG. 5), a packet including a distance and a direction between the second external electronic device (e.g., the second external electronic device 620 in FIG. 4, FIGS. 12A and 12B, or FIGS. 13A and 13B) and the first external electronic device (e.g., the electronic device 102 in FIG. 1 or the first external electronic device 610 in FIGS. 12A and 12B, or FIGS. 13A and 13B), and transmit, to the electronic device (e.g., the electronic device 101 in FIG. 1, FIG. 3, FIGS. 12A and 12B, or FIGS. 13A and 13B) via the communication circuit (e.g., the communication circuit 502 in FIG. 5), a packet including a distance and a direction between the second external electronic device (e.g., the second external electronic device 620 in FIG. 4, FIGS. 12A and 12B, or FIGS. 13A and 13B) and the first external electronic device (e.g., the electronic device 102 in FIG. 1 or the first external electronic device 610 in FIGS. 12A and 12B, or FIGS. 13A and 13B).

A ranging protocol may include at least one of a one-way ranging protocol and a two-way ranging protocol.

A UWB ranging operation according to a DS-TWR protocol and a UWB ranging operation according to an OWR protocol in a wireless communication network will be described with reference to FIG. 7 and FIG. 8, respectively.

Figure 7:
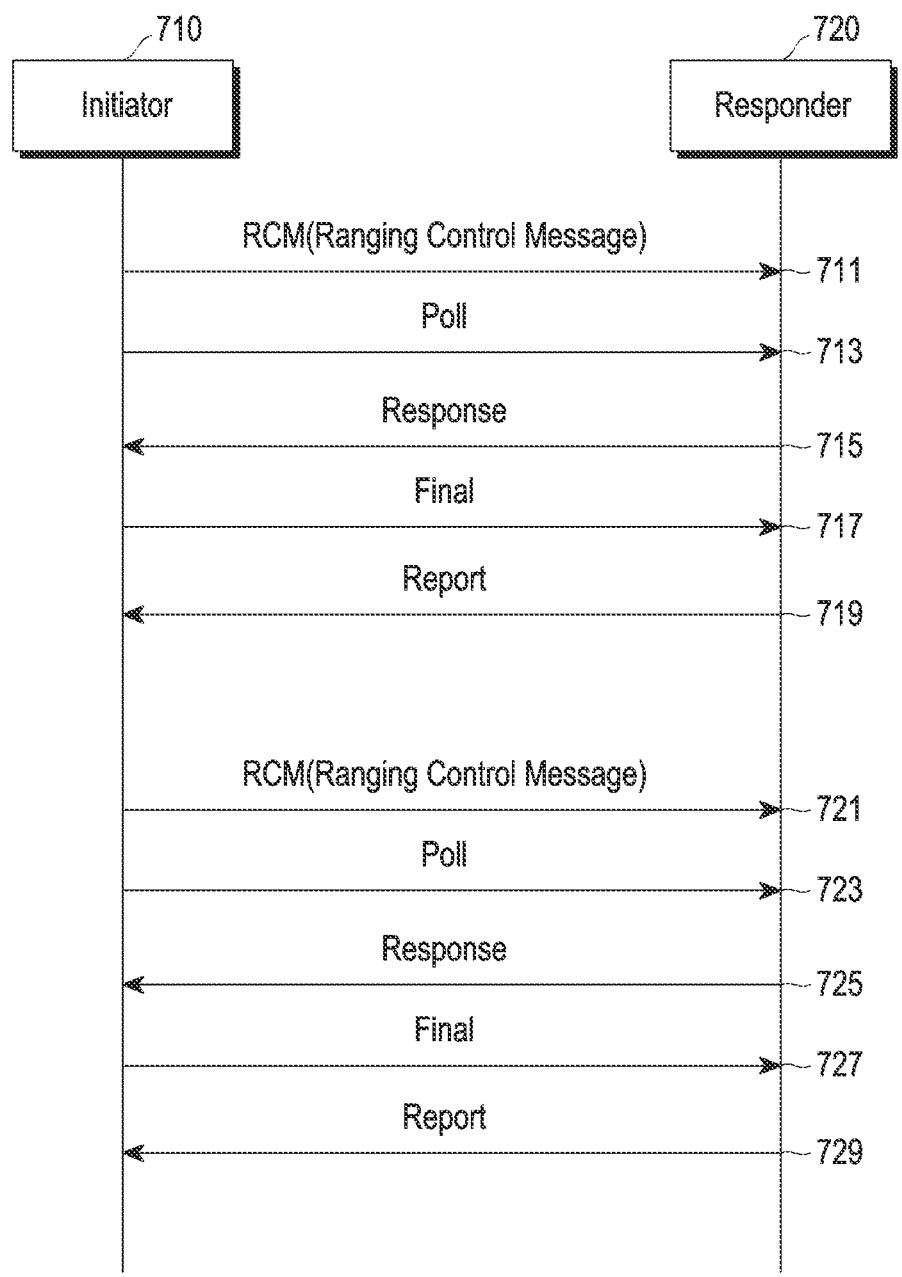
FIG. 7 is a diagram illustrating an example of a UWB ranging operation in a wireless communication network according to an embodiment of the disclosure.

FIG. 7 is a diagram illustrating an example of a UWB ranging operation in a wireless communication network according to an embodiment of the disclosure.

Referring to FIG. 7, a UWB ranging operation illustrated in FIG. 7 may be a UWB ranging operation which is based on a DS-TWR protocol. An initiator 710 may be an electronic device which initiates a UWB ranging operation, and a responder 720 may be an electronic device which responds to the initiator 710.

In the DS-TWR protocol, time of flight (TOF) (e.g., propagation time $T_{prop}$) having a reduced error may be provided even though there is significantly long response delay (e.g., response delay exceeding threshold time) and an inaccurate clock frequency offset because two round-trip time (RTT) measurements are used and combined. An electronic device A may operate as the initiator 710 in one RTT measurement (e.g., a first RTT measurement) of two RTT measurements, and an electronic device B may operate as the initiator 710 in another RTT measurement (e.g., a second RTT measurement). In FIG. 7, operations 711, 713, 715, 717, and 719 may be operations according to the first RTT measurement, and operations 721, 723, 725, 727, and 729 may be operations according to the second RTT measurement.

The initiator 710 may transmit a ranging control message (RCM) to the responder 720 to initiate the first RTT measurement in operation 711. The RCM may be a data frame which transfer an advanced ranging control (ARC) information element (IE). In an embodiment, the RCM may include at least one parameter related to a UWB ranging operation.

The initiator 710 may transmit a poll signal to the responder 720 in operation 713. Upon receiving the poll signal from the initiator 710, the responder 720 may transmit a response signal to the initiator 710 in response to the poll signal in operation 715. Upon receiving the response signal from the responder 720, the initiator 710 may transmit a final signal to the responder 720 in response to the response signal in operation 717. Upon receiving the final signal from the initiator 710, the responder 720 may transmit a report signal in response to the final signal in operation 719.

The initiator 710 may transmit an RCM to the responder 720 to initiate the second RTT measurement in operation 721. The RCM may include at least one parameter related to a UWB ranging operation. The initiator 710 may transmit a poll signal to the responder 720 in operation 723. Upon receiving the poll signal from the initiator 710, the responder 720 may transmit a response signal to the initiator 710 in response to the poll signal in operation 725. Upon receiving the response signal from the responder 720, the initiator 710 may transmit a final signal to the responder 720 in response to the response signal in operation 727. Upon receiving the final signal from the initiator 710, the responder 720 may transmit a report signal in response to the final signal in operation 729.

When all of the first RTT measurement and the second RTT measurement are completed, the UWB ranging operation according to the DS-TWR protocol is completed, and propagation time $T_{prop}$ between the electronic device A and the electronic device B may be obtained.

Figure 8:
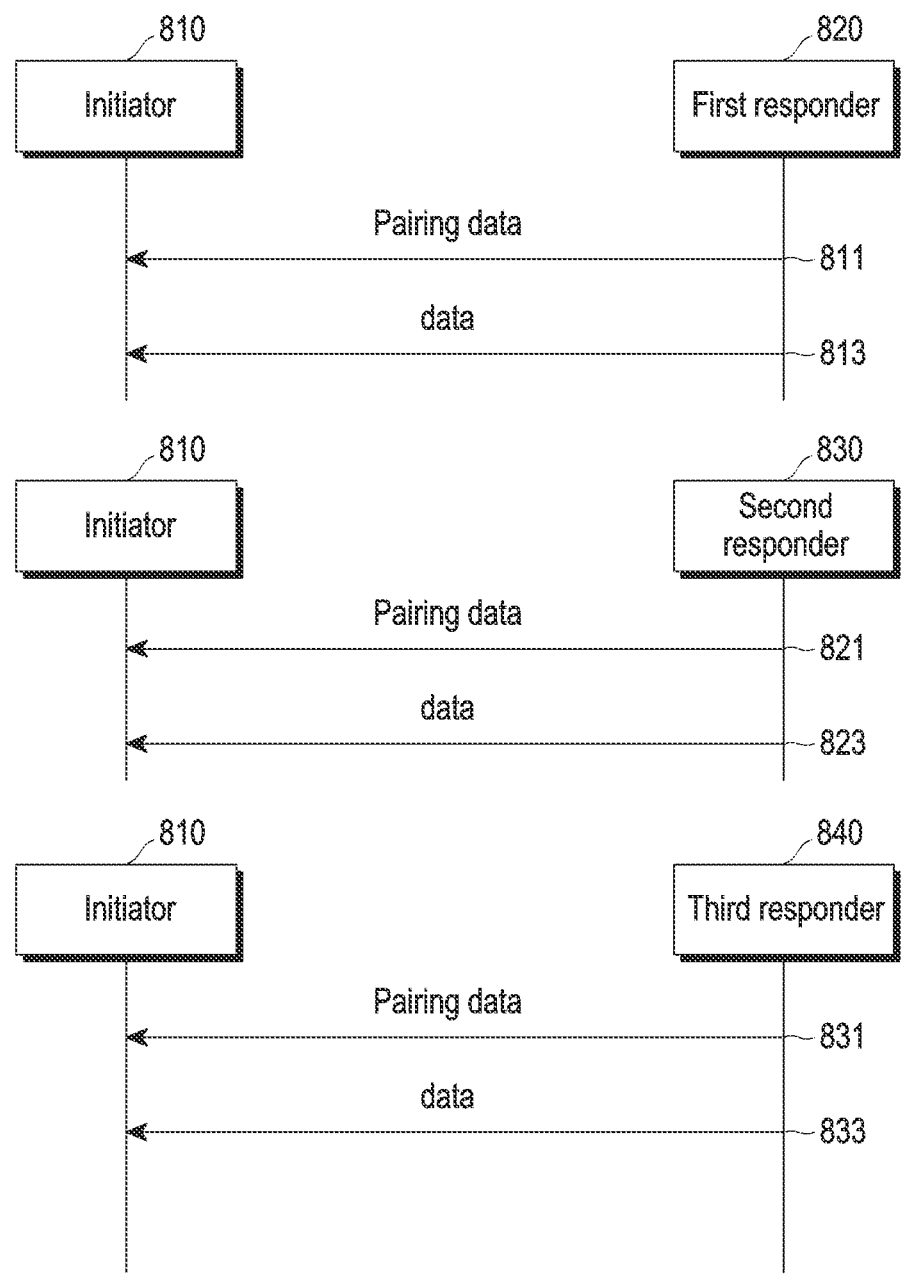
FIG. 8 is a diagram illustrating an example of a UWB ranging operation in a wireless communication network according to an embodiment of the disclosure.

FIG. 8 is a diagram illustrating another example of a UWB ranging operation in a wireless communication network according to an embodiment of the disclosure.

Referring to FIG. 8, a UWB ranging operation illustrated in FIG. 8 may be a UWB ranging operation which is based on an OWR protocol. An initiator 810 may be an electronic device which initiates the UWB ranging operation, and a first responder 820, a second responder 830, and/or a third responder 840 may be electronic devices which respond to the initiator 810.

The OWR protocol may be used for a time difference of arrival (TDOA) technology. The TDOA technology may be a technology for obtaining a location of an electronic device (e.g., a radio frequency identification (RFID) device) based on relative arrival time of a single message or a plurality of messages. In the OWR protocol, the initiator 810 may receive data from a plurality of responders (e.g., the first responder 820, the second responder 830, and/or the third responder 840), and obtain TDOA for each of the plurality of responders based on the data received from the plurality of responders.

The first responder 820 may transmit pairing data to the initiator 810 in operation 811. The first responder 820 may transmit data to the initiator 810 in operation 813. The initiator 810 may obtain TDOA for the first responder 820 based on the data received from the first responder 820.

The second responder 830 may transmit pairing data to the initiator 810 in operation 821. The second responder 830 may transmit data to the initiator 810 in operation 823. The initiator 810 may obtain TDOA for the second responder 830 based on the data received from the second responder 830.

The third responder 840 may transmit pairing data to the initiator 810 in operation 831. The third responder 840 may transmit data to the initiator 810 in operation 833. The initiator 810 may obtain TDOA for the third responder 840 based on the data received from the third responder 840.

Referring back to FIG. 6, the electronic device 101 may establish a UWB connection with the second external electronic device 620 selected from among the set helper devices. A distance between the electronic device 101 and the second external electronic device 620 may be shorter than or equal to a threshold distance in which a UWB communication is possible. After establishing the UWB connection with the second external electronic device 620, the electronic device 101 may transmit, to the second external electronic device 620, a first packet for requesting to operate as a UWB relay device for the finding service for the first external electronic device 610.

The first packet may be a packet for requesting to operate as a UWB relay device for providing a finding service for a target electronic device (e.g., the first external electronic device 610). The first packet may include at least one of device information of the first external electronic device 610 which is the target electronic device for the finding service, a command for requesting to turn on a UWB searching function in order to provide the finding service for the first external electronic device 610, or information related to a protocol.

The information related to the protocol may include at least one of information related to a ranging protocol to be used for a UWB ranging operation between the second external electronic device 620 and the first external electronic device 610, or information related to a protocol type supported in the first external electronic device 610. The ranging protocol to be used for the UWB ranging operation between the second external electronic device 620 and the first external electronic device 610 may include at least one of a two-way ranging (e.g., a DS-TWR) protocol or a one-way ranging protocol. The protocol type supported in the first external electronic device 610 may include at least one of UWB, BLE, or Wi-Fi.

Upon receiving the first packet from the electronic device 101, the second external electronic device 620 may establish a UWB connection with the first external electronic device 610 based on the information included in the first packet. A distance between the first external electronic device 610 and the second external electronic device 620 may shorter than or equal to the threshold distance. After establishing the UWB connection with the first external electronic device 610, the second external electronic device 620 may perform a UWB ranging operation as an initiator based on the information included in the first packet. The second external electronic device 620 may perform the UWB ranging operation as the initiator based on at least one of the information related to the ranging protocol to be used for the UWB ranging operation between the second external electronic device 620 and the first external electronic device 610, or the information related to the protocol type supported in the first external electronic device 610 included in the information related to the protocol included in the first packet.

As the second external electronic device 620 performs the UWB ranging operation with the first external electronic device 610, the second external electronic device 620 may obtain a distance and a direction (e.g., an angle of arrival (AoA)) between the second external electronic device 620 and the first external electronic device 610. Upon obtaining the distance and the direction between the second external electronic device 620 and the first external electronic device 610, the second external electronic device 620 may transmit a relay packet to the electronic device 101. The relay packet may be a packet transmitted by the second external electronic device 620 operating as the UWB relay device. In an embodiment, the relay packet may include the distance and the direction between the second external electronic device 620 and the first external electronic device 610 which are obtained as the second external electronic device 620 operates as the UWB relay device.

A relay packet in a wireless communication network according to an embodiment will be described with reference to FIG. 9.

Figure 9:
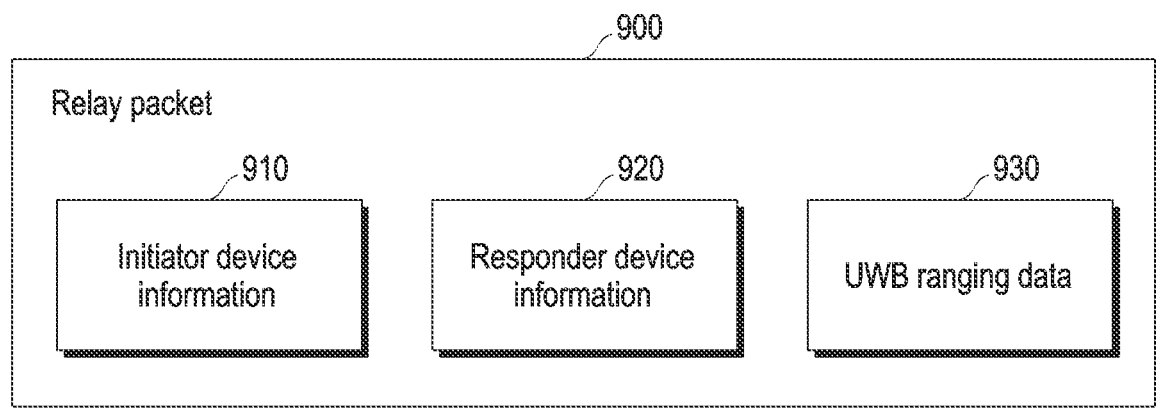
FIG. 9 is a diagram illustrating an example of a relay packet in a wireless communication network according to an embodiment of the disclosure.

FIG. 9 is a diagram illustrating an example of a relay packet in a wireless communication network according to an embodiment of the disclosure.

Referring to FIG. 9, a relay packet 900 may be a packet transmitted by a UWB relay device (e.g., a second external electronic device). The relay packet 900 may be transmitted by at least one UWB relay device participating in a finding service for a first external electronic device in a wireless communication network. The relay packet 900 may include at least one of initiator device information 910, responder device information 920, or UWB ranging data 930. The initiator device information 910, the responder device information 920, and/or the UWB ranging data 930 may be included in a payload field of the relay packet 900.

The initiator device information 910 may include at least one of a device identifier (ID), a device type, and a device name The device ID included in the initiator device information 910 may indicate a device ID of an initiator. The device type included in the initiator device information 910 may indicate a device type of the initiator. The device type may indicate whether a corresponding device is a fixed-type device or a mobile-type device. The mobile-type device may include at least one of a smart phone or a tablet, and the fixed-type device may include at least one of home appliances such as a TV, a light, an air conditioner, an oven, a speaker, or a refrigerator. The device name included in the initiator device information 910 may indicate a device name of the initiator device. The device name may be a device name assigned by a user of an electronic device.

The responder device information 920 may include at least one of a device ID, a device type, and a device name The device ID included in the responder device information 920 may indicate a device ID of a responder. The device type included in the responder device information 920 may indicate a device type of the responder. The device type may indicate whether a corresponding device is a fixed-type device or a mobile-type device. In an embodiment, the mobile-type device may include at least one of a smart phone or a tablet, and the fixed-type device may include at least one of home appliances such as a TV, a light, an air conditioner, an oven, a speaker, or a refrigerator. The device name included in the responder device information 920 may indicate a device name of the responder device. In an embodiment, the device name may be a device name assigned by the user of the electronic device.

The UWB ranging data 930 may include at least one of a distance, an AoA, and a ranging type. In an embodiment, the distance may indicate a distance between a second external electronic device which is a UWB relay device and a first external electronic device which is a target electronic device. The AoA may indicate an AoA between the second external electronic device and the first external electronic device. The ranging type may indicate a type of a ranging protocol used for a UWB ranging operation between the second external electronic device and the first external electronic device. In an embodiment, the type of the ranging protocol may include at least one of OWR, DS-TWR, or single side two-way ranging (SS-TWR).

Referring back to FIG. 6, upon receiving the relay packet from the second external electronic device 620, the electronic device 101 may obtain a location of the first external electronic device 610 based on the information included in the received relay packet. The electronic device 101 may display the obtained location of the first external electronic device 610 through a UI on the AR finder.

An operation of obtaining a location of a first external electronic device based on a relay packet in a wireless communication network according to an embodiment will be described with reference to FIG. 10.

Figure 10:
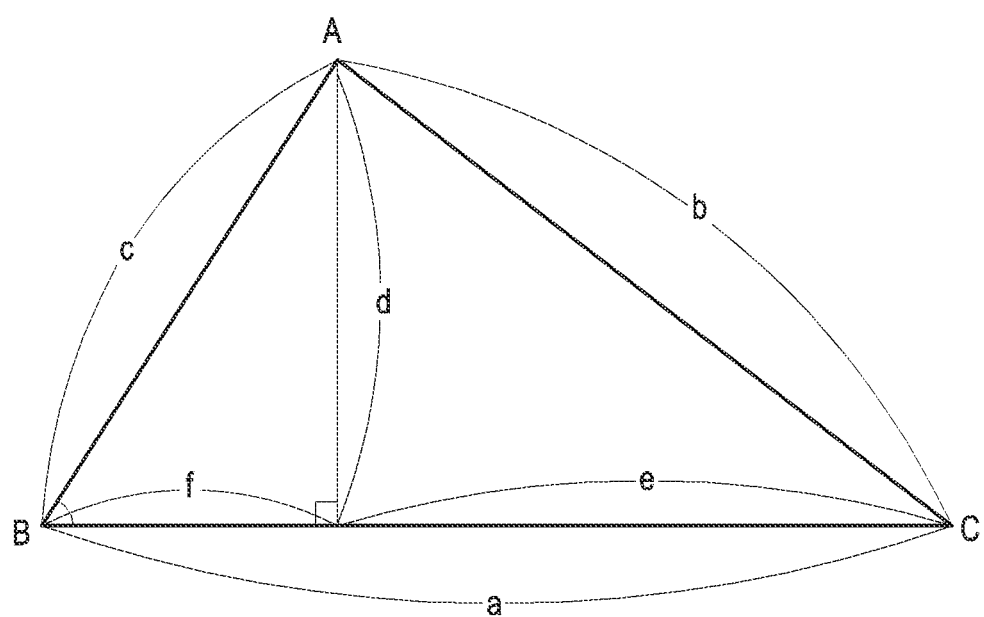
FIG. 10 is a diagram illustrating an example of an operation of obtaining a location of a first external electronic device based on a relay packet in a wireless communication network according to an embodiment of the disclosure.

FIG. 10 is a diagram illustrating an example of an operation of obtaining a location of a first external electronic device based on a relay packet in a wireless communication network according to an embodiment of the disclosure.

Referring to FIG. 10, it will be assumed that a structure of a wireless communication network is the same as a structure of a wireless communication network illustrated in FIG. 6. In FIG. 10, "a" may denote a distance between an electronic device (e.g., an electronic device 101 in FIG. 1, FIG. 3, or FIG. 6) and a second external electronic device (e.g., a second external electronic device 620 in FIG. 6), "b" may denote a distance between the electronic device and a first external electronic device (e.g., an electronic device 102 in FIG. 1 or a first external electronic device 610 in FIG. 6), "c" may denote a distance between the second external electronic device and the first external electronic device, "A" may denote a location of the second external electronic device, "B" may denote a location of the first external electronic device, and "C" may denote a location of the electronic device. The electronic device may receive a relay packet from the second external electronic device, and may obtain a distance and a direction between the second external electronic device and the first external electronic device based on the received relay packet. In an embodiment, the direction between the second external electronic device and the first external electronic device may be an AoA between the second external electronic device and the first external electronic device.

The electronic device may obtain the distance b between the electronic device and the first external electronic device based on the distance a between the electronic device and the second external electronic device, the distance c between the second external electronic device and the first external electronic device, and the AoA between the second external electronic device and the first external electronic device. This may be expressed as Equation 1 below.

$$d = c \sin B, f = c \cos B, e = a - f = a - c \cos B$$

$$\therefore b = \sqrt{d^2 + e^2} = \sqrt{(c \sin B)^2 + (a - c \cos B)^2} \quad \text{Equation 1}$$

Figure 11A:
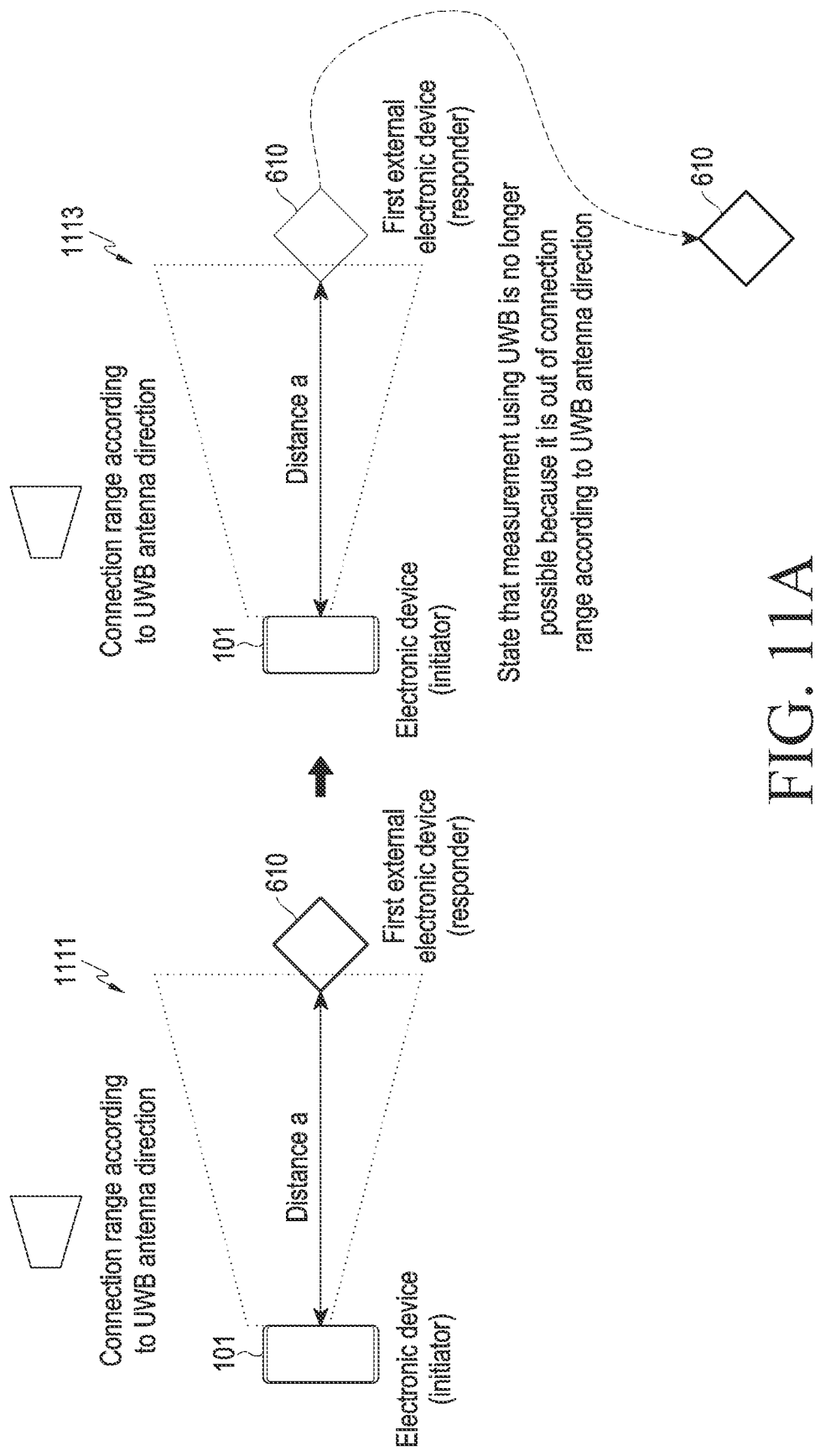
FIGS. 11A and 11B are diagrams illustrating an example of a location-based service in a wireless communication network according to an embodiment of the disclosure.
Figure 11B:
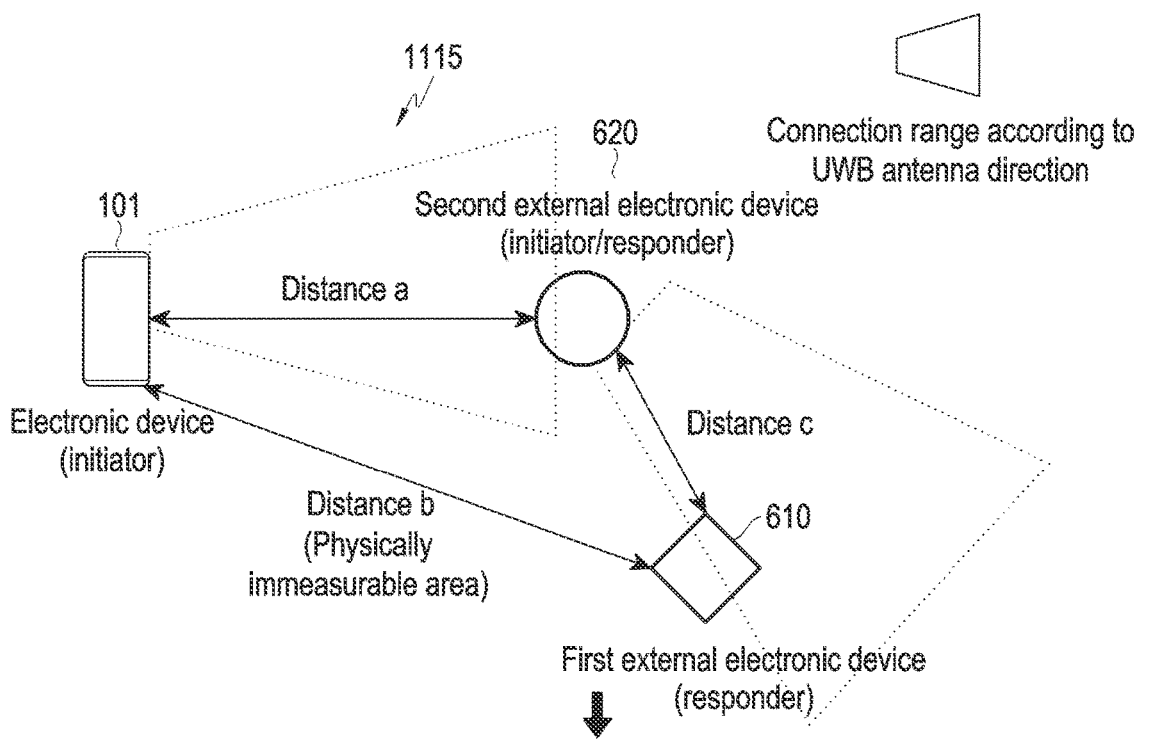
Figure 11B:
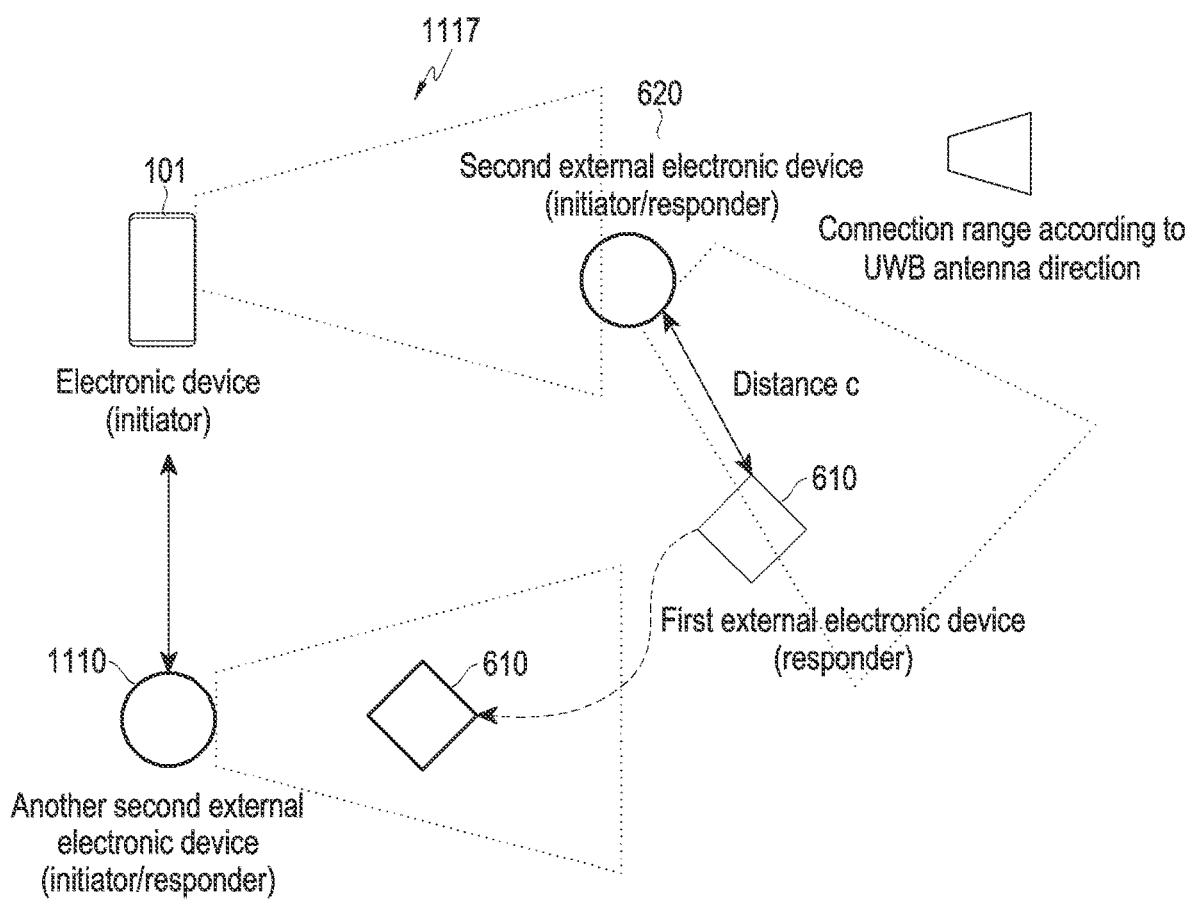

FIGS. 11A and 11B are diagrams illustrating an example of a location-based service in a wireless communication network according to an embodiment of the disclosure.

Referring to FIGS. 11A and 11B, a location-based service may be a finding service. A wireless communication network may include an electronic device 101, a first external electronic device 610, a second external electronic device 620, and/or another second external electronic device 1110. The electronic device 101 may be an electronic device 101 of FIG. 1 or FIG. 3, the first external electronic device 610 may be an electronic device 102 of FIG. 1, and the second external electronic device 620 and the other second external electronic device 1110 may be devices providing a finding service for the first external electronic device 610 in cooperation with the electronic device 101 under the control of the electronic device 101. Each of the second external electronic device 620 and the other second external electronic device 1110 may be an IoT device (e.g., home appliances such as a TV, a light, an air conditioner, an oven, or a speaker) or a user device (e.g., a smart phone or a wearable electronic device). The first external electronic device 610 may connect with the electronic device 101 to provide a finding service. For example, the first external electronic device 610 may be a smart tag (e.g., a Samsung Galaxy smart tag), a smart button, or a wearable electronic device (e.g., a smart watch or earbuds). If a finding service is executed through an IoT-based application (e.g., a Samsung SmartThings application), the electronic device 101 may perform a searching operation for the first external electronic device 610. Upon discovering the first external electronic device 610, the electronic device 101 may establish a UWB connection with the first external electronic device 610. A distance between the electronic device 101 and the first external electronic device 610 may be "a", and it will be assumed that the distance a is shorter than a threshold distance in which a UWB connection may be established. As the UWB connection is established between the electronic device 101 and the first external electronic device 610, an AR finder may be executed to perform a scan operation. The electronic device 101 may obtain a distance and a direction between the electronic device 101 and the first external electronic device 610 through the established UWB connection. The electronic device 101 may obtain a location of the first external electronic device 610 based on the obtained distance and direction between the electronic device 101 and the first external electronic device 610, and display the obtained location of the first external electronic device 610 through a UI on the AR finder (1111).

However, because a UWB antenna has a directional radiation pattern, if a direction of the electronic device 101 does not match a direction of the first external electronic device 610, if there is an obstacle between the electronic device 101 and the first external electronic device 610, and/or if the distance between the electronic device 101 and the first external electronic device 610 is longer than the threshold distance in which the UWB connection may be established, the electronic device 101 may not receive a UWB signal from the first external electronic device 610 (1113). In FIGS. 11A and 11B, it will be assumed that the first external electronic device 610 moves, and accordingly, the distance between the electronic device 101 and the first external electronic device 610 becomes longer than the threshold distance, so the electronic device 101 may not receive the UWB signal from the first external electronic device 610.

If a UWB signal is not received from the first external electronic device 610 during set time, the electronic device 101 may select at least one of set helper devices as the second external electronic device 620. In FIGS. 11A and 11B, it will be assumed that the distance between the electronic device 101 and the first external electronic device 610 may be longer than the threshold distance which may be measured based on a UWB scheme. Because the distance between the electronic device 101 and the first external electronic device 610 is longer than the threshold distance which may be measured based on the UWB scheme, the electronic device may not receive the UWB signal from the external electronic device 610 during the set time. The second external electronic device 620 may be a UWB relay device. The UWB relay device may be an electronic device which may establish a UWB connection with the first external electronic device 610 according to a request of the electronic device 101, and obtain a location and a direction of the first external electronic device 610 through the established UWB connection.

The electronic device 101 may establish a UWB connection with the second external electronic device 620 selected from among the set helper devices. In an embodiment, a distance between the electronic device 101 and the second external electronic device 620 may be shorter than or equal to the threshold distance. In an embodiment, the distance between the electronic device 101 and the second external electronic device 620 may be "a". After establishing the UWB connection with the second external electronic device 620, the electronic device 101 may transmit, to the second external electronic device 620, a first packet for requesting to operate as a UWB relay device for a finding service for the first external electronic device 610. The first packet may be a packet for requesting to operate as a UWB relay device for a finding service for a target electronic device (e.g., the first external electronic device 610). The first packet may be implemented similarly to a first packet described in FIG. 6, so a detailed description thereof will be omitted.

Upon receiving the first packet from the electronic device 101, the second external electronic device 620 may establish a UWB connection with the first external electronic device 610 based on the first packet (1115). A distance between the first external electronic device 610 and the second external electronic device 620 may be "c", and the distance c between the first external electronic device 610 and the second external electronic device 620 may be shorter than or equal to the threshold distance. After establishing the UWB connection with the first external electronic device 610, the second external electronic device 620 may perform a UWB ranging operation as an initiator based on the first packet. The second external electronic device 620 may perform the UWB ranging operation as the initiator based on at least one of the information related to the ranging protocol to be used for the UWB ranging operation between the second external electronic device 620 and the first external electronic device 610, and/or the information related to the protocol type supported in the first external electronic device 610 included in the information related to the protocol included in the first packet.

As the second external electronic device 620 performs the UWB ranging operation with the first external electronic device 610, the second external electronic device 620 may obtain a distance and a direction (e.g., an AoA) between the second external electronic device 620 and the first external electronic device 610. Upon obtaining the distance and the direction between the second external electronic device 620 and the first external electronic device 610, the second external electronic device 620 may transmit a relay packet to the electronic device 101. Upon receiving the relay packet from the second external electronic device 620, the electronic device 101 may obtain a location of the first external electronic device 610 based on the received relay packet, and may display the obtained location of the first external electronic device through a UI on the AR finder.

Thereafter, as the distance between the second external electronic device 620 and the first external electronic device 610 becomes longer than the threshold distance again according to movement of the first external electronic device 610, the second external electronic device 620 may not receive a UWB signal from the first external electronic device 610. According to the movement of the first external electronic device 610, the electronic device 101 may not receive the UWB signal from the second external electronic device 620 as well as the first external electronic device 610 during a set time. In this case, the electronic device 101 may select at least one of the set helper devices as the other second external electronic device 1110. In FIGS. 11A and 11B, the distance between the electronic device 101 and the second external electronic device 620 may be a distance longer than the threshold distance which may be measured based on the UWB scheme, and the electronic device 101 may not receive a UWB signal from the second external electronic device 620 during the set time due to this. The other second external electronic device 1110 may be a UWB relay device.

After establishing the UWB connection with the other second external electronic device 1110, the electronic device 101 may transmit, to the other second external electronic device 1110, the first packet for requesting to operate as the UWB relay device for the finding service for the first external electronic device 610. Upon receiving the first packet from the electronic device 101, the other second external electronic device 1110 may establish a UWB connection with the first external electronic device 610 (1117). A distance between the first external electronic device 610 and the other second external electronic device 1110 may be shorter than or equal to the threshold distance. After establishing the UWB connection with the first external electronic device 610, the other second external electronic device 1110 may perform a UWB ranging operation as an initiator based on the first packet. The other second external electronic device 1110 may perform the UWB ranging operation as the initiator based on at least one of information related to a ranging protocol to be used for the UWB ranging operation between the other second external electronic device 1110 and the first external electronic device 610, or information related to a protocol type supported in the first external electronic device 610 included in the information related to the protocol included in the first packet.

As the other second external electronic device 1110 performs the UWB ranging operation with the first external electronic device 610, the other second external electronic device 1110 may obtain a distance and a direction (e.g., an AoA) between the other second external electronic device 1110 and the first external electronic device 610. Upon obtaining the distance and the direction between the other second external electronic device 1110 and the first external electronic device 610, the other second external electronic device 1110 may transmit a relay packet to the electronic device 101. Upon receiving the relay packet from the other second external electronic device 1110, the electronic device 101 may obtain a location of the first external electronic device 610 based on the received relay packet, and may display the obtained location of the first external electronic device through a UI on the AR finder.

While obtaining the location of the first external electronic device 610 through at least one of the second external electronic device 620 and the other second external electronic device 1110, the electronic device 101 may release the UWB connection established between the at least one of the second external electronic device 620 or the other second external electronic device 1110 and the electronic device 101 if at least one of set conditions is satisfied, and may communicate directly with the external electronic device 610. In an embodiment, the set conditions may be as follows.

(1) First Condition

A first condition may be a condition that a UWB connection is established between the electronic device 101 and the first external electronic device 610, and a communication between the electronic device 101 and the first external electronic device 610 becomes possible again through the established UWB connection. The condition that the communication between the electronic device 101 and the first external electronic device 610 becomes possible may be a condition that a drop percentage of UWB data transmitted and received between the electronic device 101 and the first external electronic device 610 is less than or equal to a first threshold percentage (e.g., 50%). According to an embodiment of the disclosure, a drop percentage of UWB data may include an effective packet error rate (PER).

(2) Second Condition

A second condition may be a condition that a UWB connection is established between the electronic device 101 and the first external electronic device 610 by the second external electronic device 620 if the electronic device 101 or the first external electronic device 610 establishes a BLE generic attribute profile (GATT) connection with the second external electronic device 620 in a state in which the UWB connection is not established between the electronic device 101 and the first external electronic device 610. If the BLE GATT connection is established between the electronic device 101 or the first external electronic device 610 and the second external electronic device 620, the second external electronic device 620 may transmit, to the electronic device 101 and the first external electronic device 610, a packet for requesting to establish the UWB connection. The packet for requesting to establish the UWB connection may be transmitted through the BLE GATT connection. Upon receiving a corresponding packet from the second external electronic device 620, the electronic device 101 and the first external electronic device 610 may establish the UWB connection. If the BLE GATT connection is established between the electronic device 101 or the first external electronic device 610 and the other second external electronic device 1110, the other second external electronic device 1110 may transmit the packet for requesting to establish the UWB connection to the electronic device 101 and the first external electronic device 610. The packet for requesting to establish the UWB connection may be transmitted through the BLE GATT connection. Upon receiving the packet for requesting to establish the UWB connection from the other second external electronic device 1110, the electronic device 101 and the first external electronic device 610 may establish the UWB connection.

(3) Third Condition

Although a UWB connection is established between the electronic device 101 and the first external electronic device 610 and a communication between the electronic device 101 and the first external electronic device 610 is possible through the established UWB connection, a communication between the electronic device 101 and the first external electronic device 610 may be unstable. The electronic device 101 establishes a UWB connection not only with the first external electronic device 610, but also with the second external electronic device 620 or the other second external electronic device 1110 to obtain a location of the first external electronic device 610 through the UWB connection established between the electronic device 101 and the second external electronic device 620 or the other second external electronic device 1110. The second external electronic device 620 or the other second external electronic device 1110 may be a fixed-type device or a mobile-type device, and a user of the electronic device 101 may select, through a UI, at least one of fixed-type devices or mobile-type devices existing around the electronic device 101 as the second external electronic device 620 or the other second external electronic device 1110 capable of establishing the UWB connection with the electronic device 101.

A third condition may be a condition that a communication through a UWB connection established between the electronic device 101 and the first external electronic device 610 becomes stable. A condition that the communication between the electronic device 101 and the first external electronic device 610 becomes stable may be a condition that a drop percentage of UWB data transmitted and received between the electronic device 101 and the first external electronic device 610 is less than or equal to a second threshold percentage. In an embodiment, the second threshold percentage may be less than the first threshold percentage.

Figure 12A:
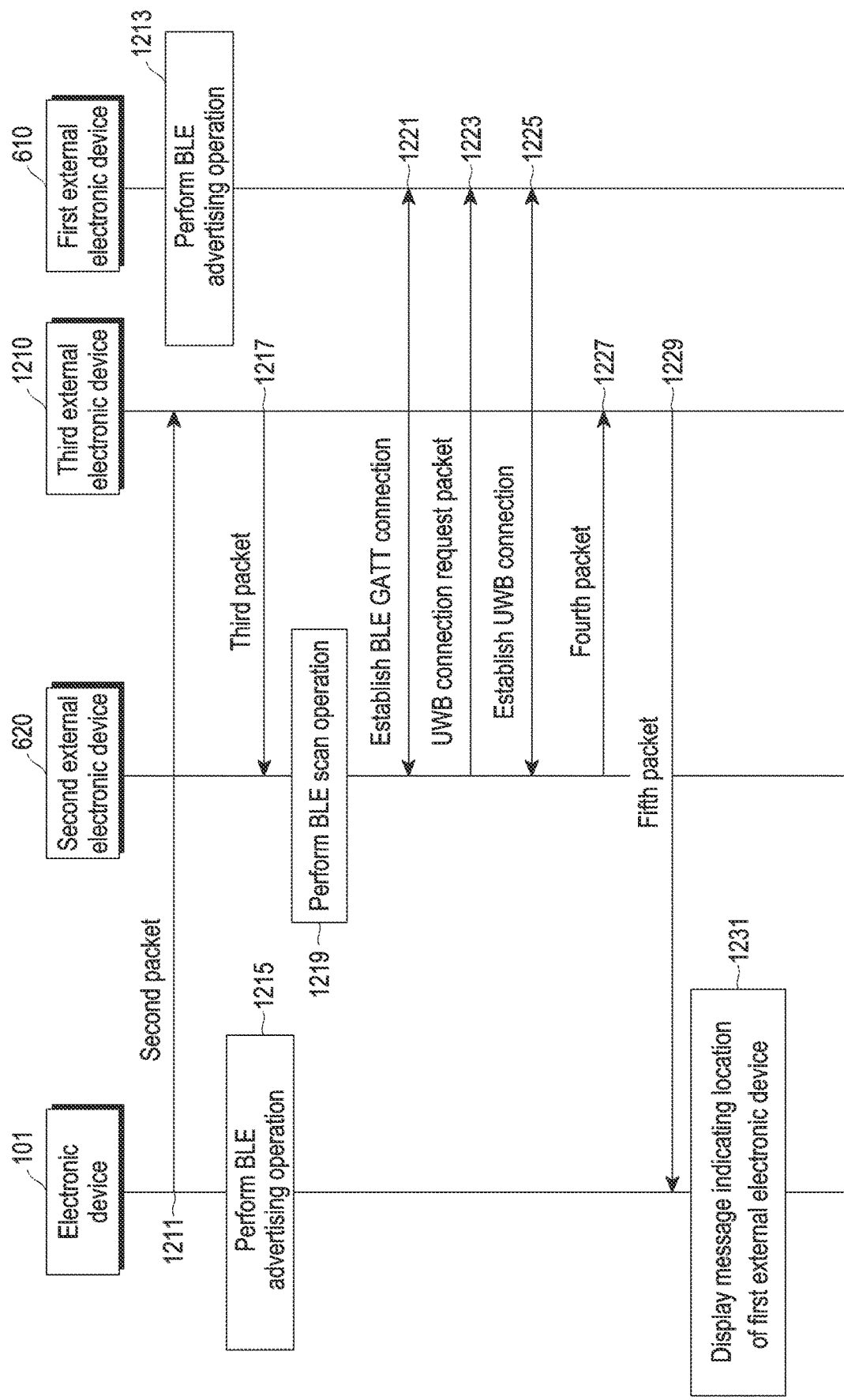
FIGS. 12A and 12B are diagrams illustrating an example of a location-based service in a wireless communication network according to an embodiment of the disclosure.
Figure 12B:
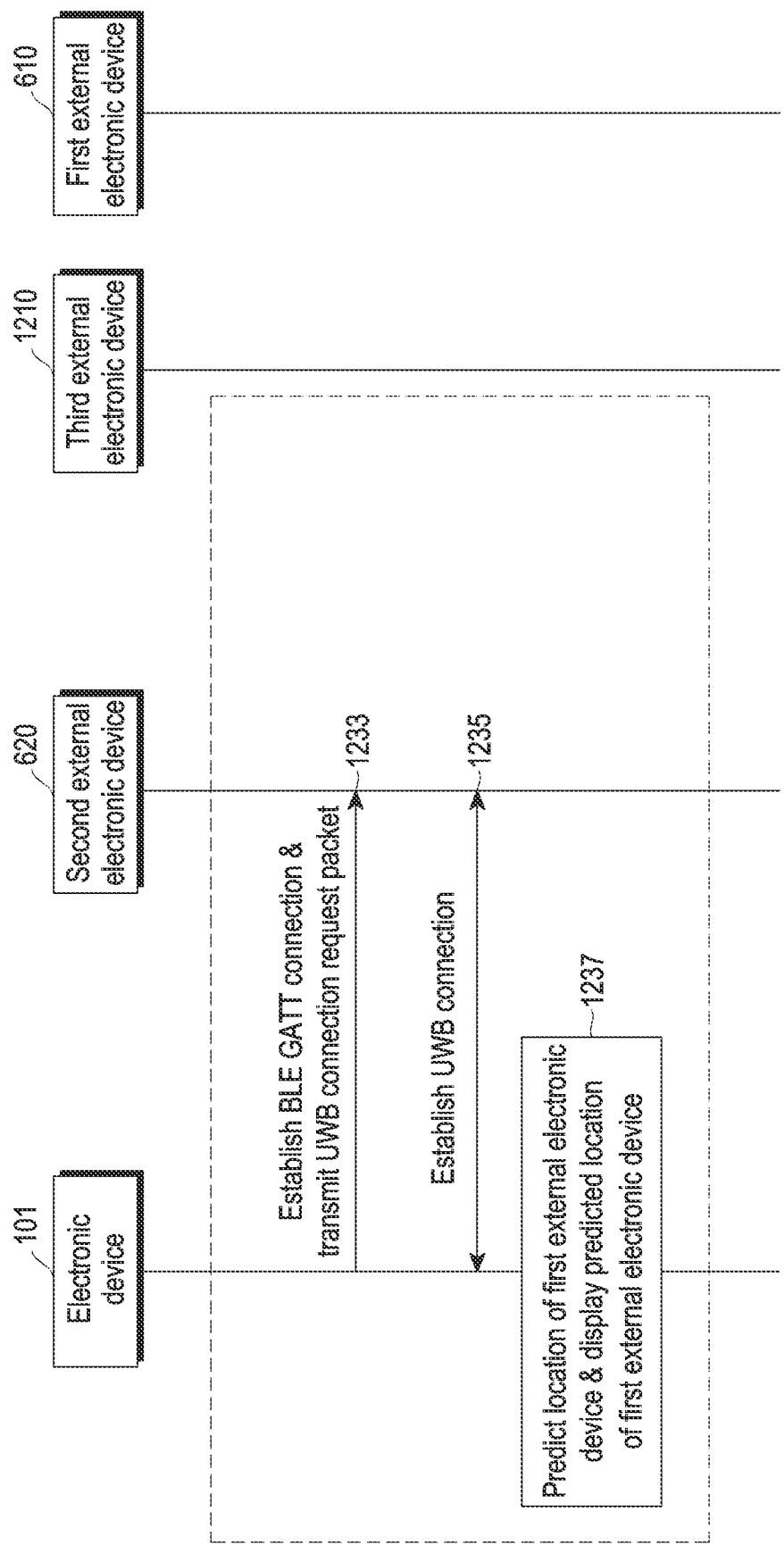

FIGS. 12A and 12B are diagrams illustrating an example of a location-based service in a wireless communication network according to an embodiment of the disclosure.

Referring to FIGS. 12A and 12B, a location-based service may be a finding service. A wireless communication network may include an electronic device 101, a first external electronic device 610, a second external electronic device 620, and/or a third external electronic device 1210. The electronic device 101 may be the electronic device 101 of FIG. 1 or FIG. 3, the first external electronic device 610 may be the electronic device 102 of FIG. 1, and the second external electronic device 620 may be the second external electronic device 620 of FIG. 4. The second external electronic device 620 may be a device which provides a finding service in cooperation with the electronic device 101 under the control of the electronic device 101. The second external electronic device 620 may be an IoT device (e.g., home appliances such as a TV, a light, an air conditioner, an oven, or a speaker) or a user device (e.g., a smart phone or a wearable electronic device). The second external electronic device 620 may be an electronic device (e.g., a helper device) with which state information and access authority for the first external electronic device 610 may be shared by the electronic device 101. The helper device has been described in FIG. 6, so a detailed description thereof will be omitted. The second external electronic device 620 may be a UWB relay device. The first external electronic device 610 may provide a finding service in conjunction with the electronic device 101. For example, the first external electronic device 610 may be a smart tag (e.g., a Samsung Galaxy smart tag), a smart button, or a wearable electronic device (e.g., a smart watch or earbuds).

The third external electronic device 1210 may be the server 108 of FIG. 1 or the third external electronic device 1210 of FIG. 5. The finding service described in FIGS. 12A and 12B may be a finding service in a case that the electronic device 101 and the second external electronic device 620 may communicate with the third external electronic device 1210. The finding service described in FIGS. 12A and 12B may be a finding service in a case that a UWB connection is not established between the electronic device 101 and the first external electronic device 610.

If a finding service for the first external electronic device 610 is executed through an IoT-based application (e.g., a Samsung SmartThings application), in operation 1211, the electronic device 101 may transmit, to the third external electronic device 1210, a second packet for requesting to perform a finding service for a target electronic device (e.g., the first external electronic device 610) in order to perform the finding service for the first external electronic device 610 together with at least one helper device of the electronic device 101. The second packet may include device information of the target electronic device (e.g., the first external electronic device 610) for the finding service.

The first external electronic device 610 may not establish a UWB connection with the electronic device 101, so the first external electronic device 610 may perform an advertising operation which is based on a BLE scheme in operation 1213. The first external electronic device 610 may perform the advertising operation by transmitting (e.g., by broadcasting) a BLE advertisement (ADV) packet.

The electronic device 101 may not establish a UWB connection with the first external electronic device 610, so the electronic device 101 may perform an advertising operation which is based on the BLE scheme in operation 1215. The electronic device 101 may perform an advertising operation by transmitting (e.g., by broadcasting) a BLE ADV packet.

Upon receiving the second packet from the electronic device 101, the third external electronic device 1210 may transmit, to at least one helper device (e.g., the second external electronic device 620) of the electronic device 101, a third packet for requesting to perform a finding service for the first external electronic device 610 in operation 1217. In FIGS. 12A and 12B, it may be assumed that the at least one helper device of the electronic device 101 includes the second external electronic device 620. The third packet may include at least one of device information of the first external electronic device 610 and information related to a protocol. The information related to the protocol may include information related to a ranging protocol to be used for a UWB ranging operation between the second external electronic device 620 and the first external electronic device 610, or information related to a protocol type supported in the first external electronic device 610. The ranging protocol to be used for the UWB ranging operation between the second external electronic device 620 and the first external electronic device 610 may include at least one of a two-way ranging (e.g., DS-TWR) protocol or a one-way ranging protocol. The protocol type supported in the first external electronic device 610 may include at least one of UWB, BLE, or Wi-Fi.

Upon receiving, from the third external electronic device 1210, the third packet for requesting to perform the finding service for the first external electronic device 610, the second external electronic device 620 may start performing the finding service for the first external electronic device 610 based on the device information of the first external electronic device 610 and/or the information related to the protocol included in the third packet in operation 1219. In operation 1219, the second external electronic device 620 may perform a BLE scan operation. The second external electronic device 620 may detect the first external electronic device 610 through the BLE scan operation and establish a BLE GATT connection with the first external electronic device 610 in operation 1221.

When the BLE GATT connection is established between the second external electronic device 620 and the first external electronic device 610, the second external electronic device 620 may transmit, to the first external electronic device 610, a UWB connection request packet for requesting a UWB connection in operation 1223. Upon receiving the UWB connection request packet from the second external electronic device 620, the first external electronic device 610 may transmit, to the second external electronic device 620, a UWB connection response packet which is a response packet to the UWB connection request packet in operation 1225, so a UWB connection may be established between the first external electronic device 610 and the second external electronic device 620.

Upon establishing the UWB connection with the first external electronic device 610, the second external electronic device 620 may transmit, to the third external electronic device 1210, a fourth packet indicating that the first external electronic device 610 is found in operation 1227. The fourth packet may be a packet indicating that a location of the first external electronic device 610 may be obtained by the second external electronic device 620. The fourth packet may include at least one of initiator device information, responder device information, or UWB ranging data. The initiator device information included in the fourth packet may be device information of an initiator (e.g., the second external electronic device 620). The responder device information included in the fourth packet may be device information of a responder (e.g., the first external electronic device 610). The initiator device information, the responder device information, and/or the UWB ranging data included in the fourth packet may be implemented similarly to initiator device information 910, responder device information 920, and/or the UWB ranging data 930 in FIG. 9, so a detailed description thereof will be omitted.

Upon receiving, from the second external electronic device 620, the fourth packet indicating that the first external electronic device 610 is found, the third external electronic device 1210 may transmit, to the electronic device 101, a fifth packet which is a response packet to the second packet in operation 1229. The fifth packet may be a packet indicating that the first external electronic device 610 is found by the second external electronic device 620. The fifth packet may be a packet indicating that a location of the first external electronic device 610 is obtained by the second external electronic device 620. The fifth packet may include initiator device information, responder device information, and/or UWB ranging data. The initiator device information, the responder device information, and/or the UWB ranging data included in the fifth packet may be implemented similarly to the initiator device information 910, the responder device information 920, and/or the UWB ranging data 930 in FIG. 9, so a detailed description thereof will be omitted.

Upon receiving the fifth packet from the third external electronic device 1210, the electronic device 101 may display a message notifying that the first external electronic device 610 is found through a UI on a BLE finder based on the initiator device information, the responder device information, and/or the UWB ranging data included in the fifth packet in operation 1231. The message notifying that the first external electronic device 610 is found may be a message indicating that a location of the first external electronic device 610 is obtained by the second external electronic device 620. The message notifying that the first external electronic device 610 is found may be a message notifying that the first external electronic device 610 is found by the second external electronic device 620 which is a helper device (e.g., a UWB relay device).

Upon outputting the message notifying that the first external electronic device 610 is found, the electronic device 101 may establish a BLE GATT connection with the second external electronic device 620, and transmit, to the second external electronic device 620, a UWB connection request packet for requesting a UWB connection if the BLE GATT connection is established between the electronic device 101 and the second external electronic devices 620 in operation 1233. Upon receiving the UWB connection request packet from the electronic device 101, the second external electronic device 620 may transmit, to the electronic device 101, a UWB connection response packet which is a response packet to the UWB connection request packet, so a UWB connection may be established between the electronic device 101 and the second external electronic device 620 in operation 1235. In FIGS. 12A and 12B, the UWB connection may be established between the electronic device 101 and the second external electronic device 620.

If the UWB connection is established between the electronic device 101 and the second external electronic device 620, the second external electronic device 620 may transmit a relay packet to the electronic device 101. The relay packet transmitted from the second external electronic device 620 to the electronic device 101 may include initiator device information, responder device information, and/or UWB ranging data. The initiator device information included in the relay packet transmitted from the second external electronic device 620 to the electronic device 101 may be device information of an initiator (e.g., the second external electronic device 620). The responder device information included in the relay packet may be device information of a responder (e.g., the first external electronic device 610). The initiator device information, the responder device information, and/or the UWB ranging data included in the relay packet may be implemented similarly to the initiator device information 910, the responder device information 920, and/or the UWB ranging data 930 in FIG. 9, so a detailed description thereof will be omitted.

If the UWB connection is established between the electronic device 101 and the second external electronic device 620, the second external electronic device 620 may transmit a relay packet to the electronic device 101, so the second external electronic device 620 no longer need to transmit the fourth packet to the third external electronic device 1210. If the UWB connection is established between the electronic device 101 and the second external electronic device 620, the second external electronic device 620 may directly inform the electronic device 101 of a distance and a direction between the second external electronic device 620 and the first external electronic device 610 by transmitting a relay packet through the UWB connection established between the second external electronic device 620 and the electronic device 101.

If the UWB connection is established between the electronic device 101 and the second external electronic device 620, the electronic device 101 may obtain a distance and a direction between the electronic device 101 and the second external electronic device 620, and a distance and a direction between the second external electronic device 620 and the first external electronic device 610. In operation 1237, the electronic device 101 may predict a distance and a direction between the electronic device 101 and the first external electronic device 610 based on the distance and the direction between the electronic device 101 and the second external electronic device 620 and the distance and the direction between the second external electronic device 620 and the first external electronic device 610. A scheme of predicting the distance and the direction between the electronic device 101 and the first external electronic device 610 based on the distance and the direction between the electronic device 101 and the second external electronic device 620 and the distance and the direction between the second external electronic device 620 and the first external electronic device 610 may be implemented similarly to an operation of obtaining a location of a first external electronic device based on a relay packet described in FIG. 10, so a detailed description thereof will be omitted. The electronic device 101 may display a message including information indicating the location of the first external electronic device 610 through a UI on the BLE finder based on the predicted distance and direction between the electronic device 101 and the first external electronic device 610.

Figure 13A:
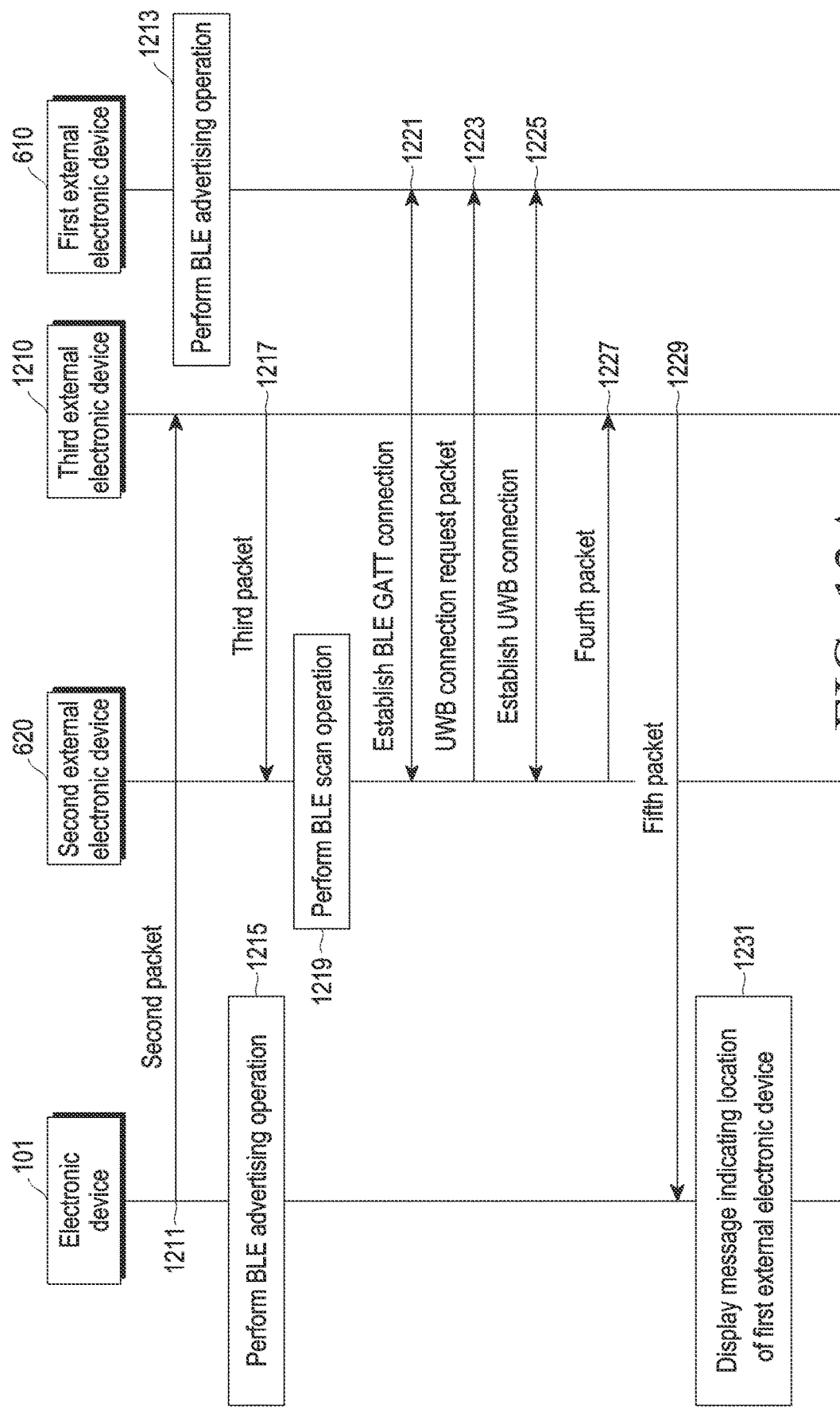
FIGS. 13A and 13B are diagrams illustrating an example of a location-based service in a wireless communication network according to an embodiment of the disclosure.
Figure 13B:
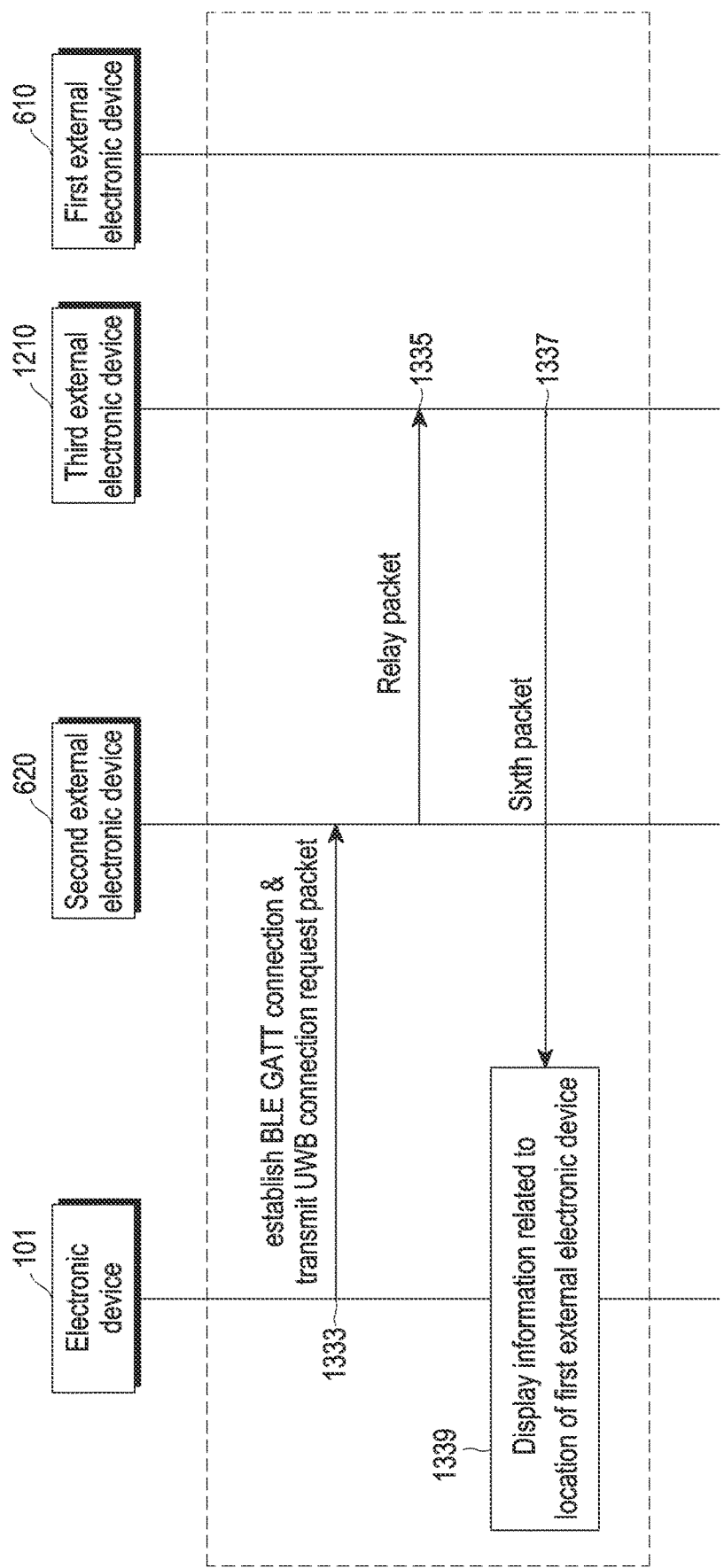

FIGS. 13A and 13B are diagrams illustrating an example of a location-based service in a wireless communication network according to an embodiment of the disclosure.

Referring to FIGS. 13A and 13B, a location-based service may be a finding service. A wireless communication network may include an electronic device 101, a first external electronic device 610, a second external electronic device 620, and/or a third external electronic device 1210. The electronic device 101 may be the electronic device 101 of FIG. 1 or FIG. 3, the first external electronic device 610 may be the electronic device 102 of FIG. 1, and the second external electronic device 620 may be the second external electronic device 620 of FIG. 4.

The second external electronic device 620 may be a device which provides a finding service in cooperation with the electronic device 101. The second external electronic device 620 may be an IoT device (e.g., home appliances such as a TV, a light, an air conditioner, an oven, or a speaker) or a user device (e.g., a smart phone or a wearable electronic device). The second external electronic device 620 may be an electronic device (e.g., a helper device) with which state information and access authority for the first external electronic device 610 may be shared by the electronic device 101. The helper device has been described in FIG. 6, so a detailed description thereof will be omitted. The second external electronic device 620 may be a UWB relay device. The first external electronic device 610 may connect with the electronic device 101 to provide a finding service. For example, the first external electronic device 610 may be a smart tag (e.g., a Samsung Galaxy smart tag), a smart button, or a wearable electronic device (e.g., a smart watch or earbuds). In an embodiment, the third external electronic device 1210 may be a server 108 in FIG. 1 or a third external electronic device 1210 in FIG. 5. The finding service described in FIGS. 13A and 13B may be a finding service in a case that the electronic device 101 and the second external electronic device 620 may communicate with the third external electronic device 1210. A UWB connection may not be established between the electronic device 101 and the first external electronic device 610, and a UWB connection may not also be established between the electronic device 101 and the second external electronic device 620.

Operations 1211 to 1231 in FIGS. 13A and 13B may be implemented similarly to or substantially the same as operations 1211 to 1231 in FIGS. 12A and 12B, so a detailed description thereof will be omitted.

Upon displaying a message notifying that the first external electronic device 610 is found through a UI on a BLE finder based on initiator device information, responder device information, and/or UWB ranging data included in a fifth packet in operation 1231, the electronic device 101 may establish a BLE GATT connection with the second external electronic device 620 in operation 1333. If the BLE GATT connection is established between the electronic device 101 and the second external electronic device 620, the electronic device 101 may transmit a UWB connection request packet for requesting a UWB connection to the second external electronic device 620. In FIGS. 13A and 13B, a UWB connection may not be established between the electronic device 101 and the second external electronic device 620. Accordingly, the second external electronic device 620 may not transmit a UWB connection response packet which is a response packet to the UWB connection request packet transmitted by the electronic device 101.

If the UWB connection is not established with the electronic device 101 within a set time after the second external electronic device 620 transmits, to the third external electronic device 1210, the fourth packet indicating that the first external electronic device 610 is found, the second external electronic device 620 may transmit a relay packet to the third external electronic device 1210 in operation 1335. The set time may be variably set to suit a situation of the wireless communication network. In an embodiment, the relay packet transmitted from the second external electronic device 620 to the third external electronic device 1210 may include initiator device information, responder device information, and/or UWB ranging data. The initiator device information included in the relay packet may be device information of an initiator (e.g., the second external electronic device 620). The responder device information included in the relay packet may be device information of a responder (e.g., the first external electronic device 610). The initiator device information, the responder device information, and/or the UWB ranging data included in the relay packet may be implemented similarly to initiator device information 910, responder device information 920, and/or UWB ranging data 930 in FIG. 9, so a detailed description thereof will be omitted.

Upon receiving the relay packet from the second external electronic device 620, the third external electronic device 1210 may transmit, to the electronic device 101, a sixth packet including information (e.g., the initiator device information, the responder device information, and/or the UWB ranging data) included in the relay packet received from the second external electronic device 620 in operation 1337.

Upon receiving the sixth packet from the third external electronic device 1210, the electronic device 101 may display, through a UI, a message including information related to a location of the first external electronic device 610 based on initiator device information, responder device information, and/or UWB ranging data included in the sixth packet in operation 1339. The information related to the location of the first external electronic device 610 may include a distance and a direction between the second external electronic device 620 and the first external electronic device 610.

In a case of a finding service described in FIGS. 12A and 12B, a UWB connection may be established between the electronic device 101 and the second external electronic device 620, so the electronic device 101 may obtain a distance and a direction between the electronic device 101 and the second external electronic device 620 as well as a distance and a direction between the second external electronic device 620 and the first external electronic device 610. Upon obtaining the distance and the direction between the second external electronic device 620 and the first external electronic device 610 and the distance and the direction between the electronic device 101 and the second external electronic device 620, the electronic device 101 may predict a distance and a direction between the electronic device 101 and the first external electronic device 610 based on the distance and the direction between the electronic device 101 and the second external electronic device 620 and the distance and the direction between the second external electronic device 620 and the first external electronic device 610 to display a predicted location of the first external electronic device 610 through a UI.

However, in a case of the finding service described in FIGS. 13A and 13B, the UWB connection may not be established between the electronic device 101 and the second external electronic device 620, so the electronic device 101 may obtain the distance and the direction between the second external electronic device 620 and the first external electronic device 610, however, the electronic device 101 may not obtain the distance and the direction between the electronic device 101 and the second external electronic device 620. Accordingly, unlike the finding service in FIGS. 12A and 12B, the electronic device 101 may display information related to the location of the first external electronic device 610 (e.g., the distance and the direction between the second external electronic device 620 and the first external electronic device 610), not the location of the first external electronic device 610 through a UI.

Figure 14A:
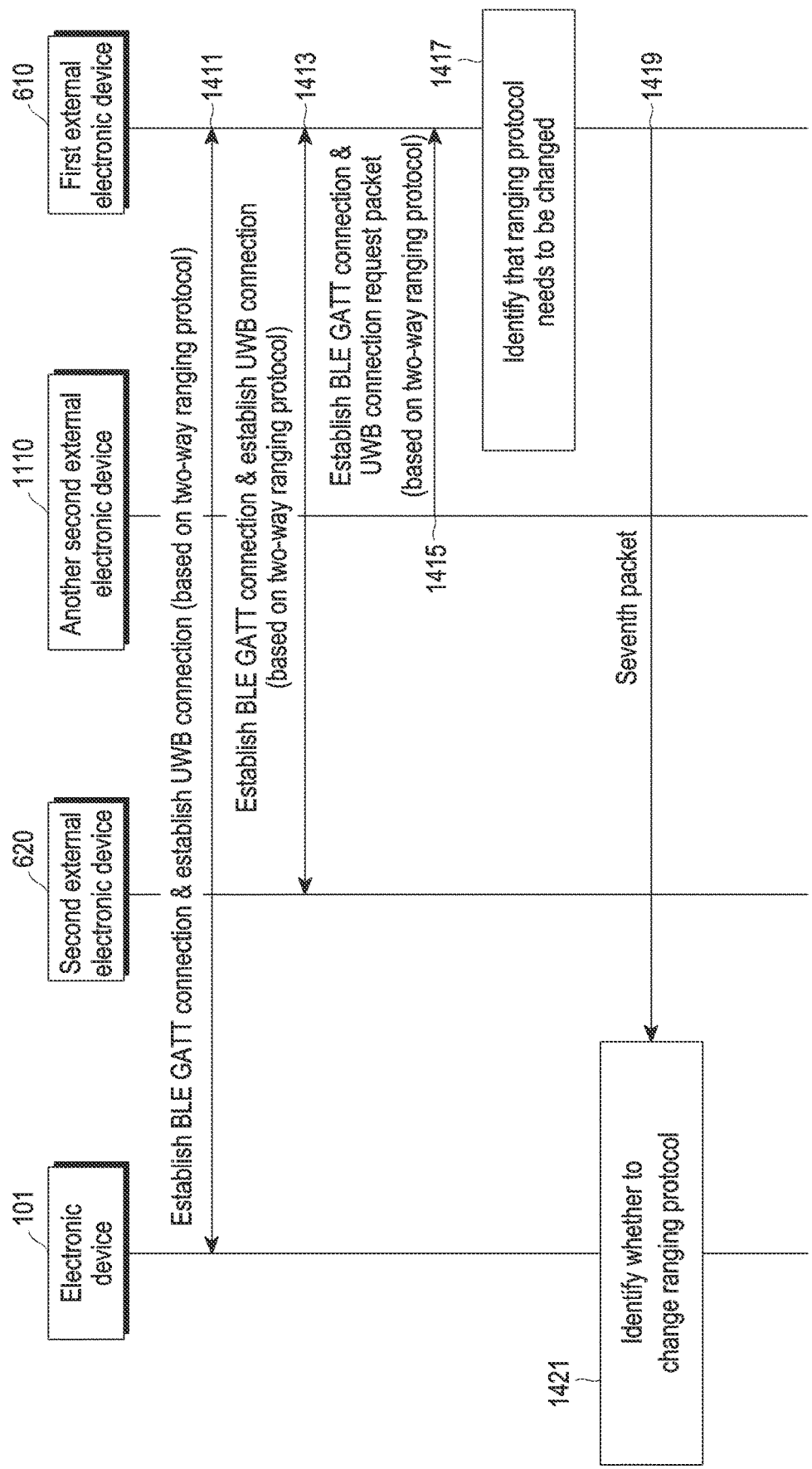
FIGS. 14A and 14B are diagrams illustrating an example of a location-based service in a wireless communication network according to an embodiment of the disclosure.
Figure 14B:
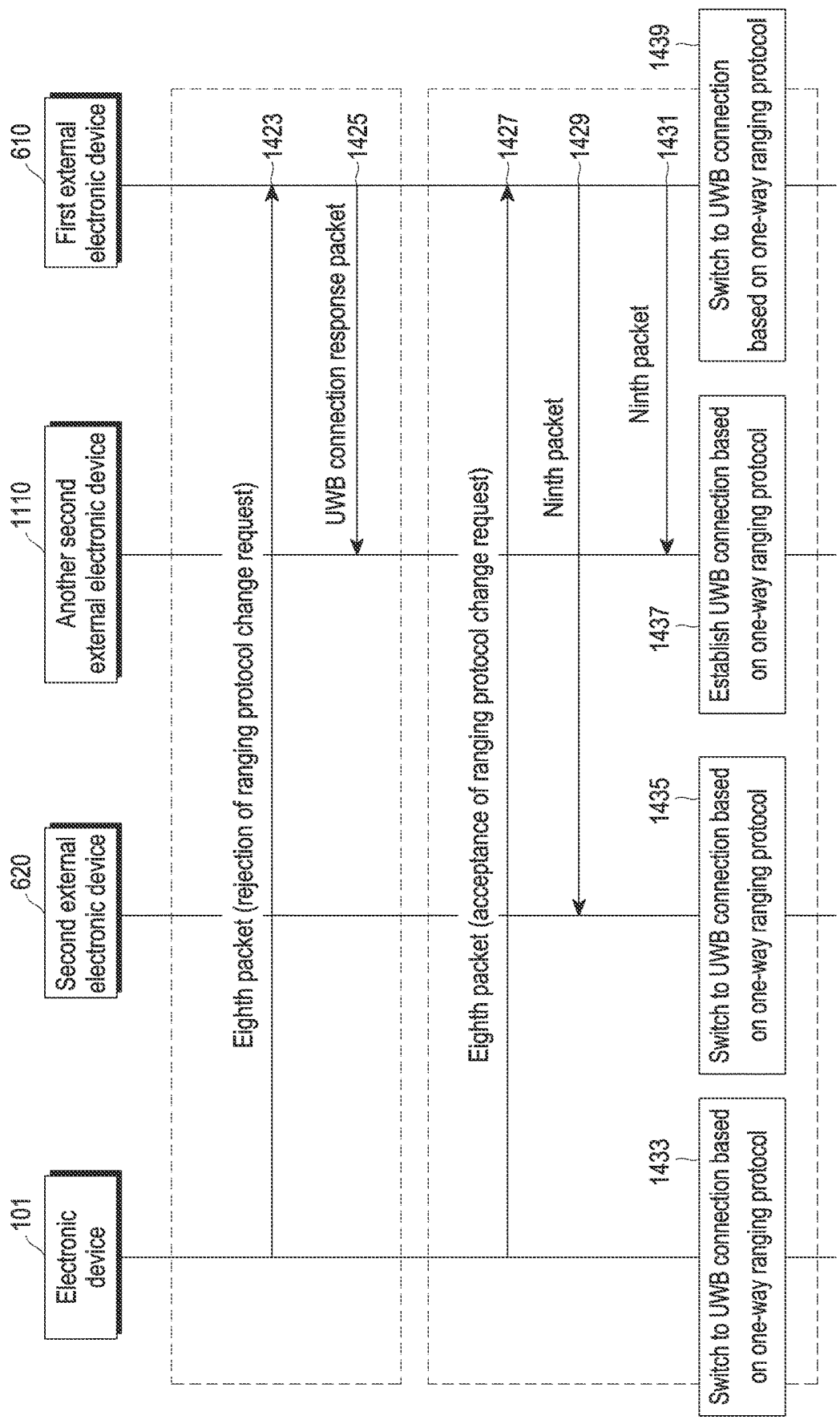

FIGS. 14A and 14B are diagrams illustrating an example of a location-based service in a wireless communication network according to an embodiment of the disclosure.

Referring to FIGS. 14A and 14B, a location-based service may be a finding service. A wireless communication network may include an electronic device 101, a first external electronic device 610, a second external electronic device 620, and/or another second external electronic device 1110. The electronic device 101 may be the electronic device 101 of FIG. 1 or FIG. 3, the first external electronic device 610 may be the electronic device 102 of FIG. 1, and the second external electronic device 620 may be the second external electronic device 620 of FIG. 4.

Each of the second external electronic device 620 and the other second external electronic device 1110 may be a device which provides a finding service under the control of the electronic device 101. Each of the second external electronic device 620 and the other second external electronic device 1110 may be an IoT device (e.g., home appliances such as a TV, a light, an air conditioner, an oven, or a speaker), or a user device (e.g., a smart phone or a wearable electronic device). Each of the second external electronic device 620 and the other second external electronic device 1110 may be an electronic device (e.g., a helper device) with which state information and access authority for the first external electronic device 610 may be shared by the electronic device 101. The helper device has been described in FIG. 6, so a detailed description thereof will be omitted. In an embodiment, each of the second external electronic device 620 and the other second external electronic device 1110 may be a UWB relay device. The first external electronic device 610 may interwork with the electronic device 101 to provide a finding service. For example, the first external electronic device 610 may be a smart tag (e.g., a Samsung Galaxy smart tag), a smart button, or a wearable electronic device (e.g., a smart watch or earbuds). The third external electronic device 1210 may be a server 108 in FIG. 1 or a third external electronic device 1210 in FIG. 5. In FIGS. 13A and 13B, a UWB connection may be established between the electronic device 101 and the first external electronic device 610, and a UWB connection may also be established between the electronic device 101 and each of the second external electronic device 620 and the other second external electronic device 1110.

A BLE GATT connection and a UWB connection may be established between the electronic device 101 and the first external electronic device 610, and the electronic device 101 may perform a UWB communication with the first external electronic device 610 based on a two-way ranging protocol in operation 1411.

A BLE GATT connection and a UWB connection may be established between the second external electronic device 620 and the first external electronic device 610, and the second external electronic device 620 may perform a UWB communication with the external electronic device 610 based on the two-way ranging protocol in operation 1413.

In a state in which the UWB connection is established between the electronic device 101 and the first external electronic device 610 and the UWB connection is established between the second external electronic device 620 and the first external electronic device 610, the other second external electronic device 1110 may establish a BLE GATT connection with the first external electronic device 610 and then transmit a UWB connection request packet to the first external electronic device 610 in operation 1415. In an embodiment, the UWB connection request packet may be a packet for requesting a UWB connection based on the two-way ranging protocol.

In the example illustrated in FIGS. 14A and 14B, it will be assumed that the first external electronic device 610 may maintain up to two UWB connections (e.g., UWB sessions). Upon receiving, from the other second external electronic device 1110, the UWB connection request packet for requesting the UWB connection based on the two-way ranging protocol, the first external electronic device 610 may identify that it is no longer possible to establish a UWB connection based on the two-way ranging protocol because the number of currently established UWB connections is two (e.g., the UWB connection between the electronic device 101 and the first external electronic device 610 and the UWB connection between the second external electronic device 620 and the first external electronic device 610) in operation 1417. Accordingly, the first external electronic device 610 may identify that the ranging protocol needs to be changed from the two-way ranging protocol to a one-way ranging protocol.

Upon identifying that the ranging protocol needs to be changed from the two-way ranging protocol to the one-way ranging protocol, the first external electronic device 610 may transmit, the electronic device 101, a seventh packet which is a packet for requesting a ranging protocol change in operation 1419. The packet for requesting the ranging protocol change may include information for requesting to change the ranging protocol from the two-way ranging protocol to the one-way ranging protocol. In an embodiment, the packet for requesting the ranging protocol change may be transmitted through a BLE GATT connection.

Upon receiving the packet for requesting the ranging protocol change from the first external electronic device 610 through the BLE GATT connection, the electronic device 101 may identify that it needs to change the ranging protocol of the first external electronic device 610 from the two-way ranging protocol to the one-way ranging protocol. Upon identifying that it needs to change the ranging protocol of the first external electronic device 610 from the two-way ranging protocol to the one-way ranging protocol, the electronic device 101 may perform an operation of identifying whether to change the ranging protocol in operation 1421. The operation of identifying whether to change the ranging protocol may include an operation of displaying a message indicating that the ranging protocol needs to be changed through a UI. After displaying the message identifying whether to change the ranging protocol, the electronic device 101 may check whether information indicating that the ranging protocol will be switched is inputted or information indicating that the ranging protocol will not be switched (e.g., will be maintained) is inputted.

If the information indicating that the ranging protocol will not be switched is inputted, the electronic device 101 may transmit, to the first external electronic device 610, an eighth packet which is a response packet to the packet for requesting the ranging protocol change through the BLE GATT connection in operation 1423. The response packet transmitted from the electronic device 101 to the first external electronic device 610 in operation 1423 may include information indicating rejection of the ranging protocol change request.

Upon receiving the response packet including the information indicating the rejection of the ranging protocol change request, the first external electronic device 610 may identify that it is rejected that the ranging protocol of the first external electronic device 610 is changed to the one-way protocol, and transmit, to the other second external electronic device 1110, a UWB connection response packet which is a response packet to the UWB connection request packet in operation 1425. The UWB connection response packet transmitted from the first external electronic device 610 to the other second external electronic device 1110 may include information indicating that the UWB connection request of the other second external electronic device 1110 is rejected.

As such, as the information indicating that the ranging protocol will not be switched is inputted, the ranging protocol of the first external electronic device 610 is not changed from the two-way ranging protocol to the one-way ranging protocol, so only the UWB connection between the electronic device 101 and the first external electronic device 610 which is based on the two-way ranging protocol and the UWB connection between the second external electronic device 620 and the first external electronic device 610 which is based on the two-way ranging protocol may be maintained, and the other second external electronic device 1110 may not establish a UWB connection with the first external electronic device 610.

If the information indicating that the ranging protocol will be switched is inputted after the electronic device 101 displays the message indicating that the ranging protocol needs to be changed through the UI in operation 1421, the electronic device 101 may transmit, to the first external electronic device 610, an eighth packet which is a response packet to the packet for requesting the ranging protocol change through the BLE GATT connection in operation 1427. The response packet transmitted from the electronic device 101 to the first external electronic device 610 in operation 1427 may include information indicating acceptance of the ranging protocol change request.

Upon receiving the response packet including the information indicating the acceptance of the ranging protocol change request, the first external electronic device 610 may identify that it is accepted that the ranging protocol of the first external electronic device 610 is changed to the one-way protocol, and transmit, to the second external electronic device 620, a ninth packet which is a packet notifying the ranging protocol change in operation 1429. The packet notifying the ranging protocol change may include information notifying that the ranging protocol is changed from the two-way ranging protocol to the one-way ranging protocol. In an embodiment, the packet notifying the ranging protocol change may be transmitted through the BLE GATT connection.

Upon identifying that it is accepted that the ranging protocol of the first external electronic device 610 is changed to the one-way protocol, the electronic device 101 may transmit, to the other second external electronic device 1110, a ninth packet which is a packet notifying a ranging protocol change in operation 1431. The packet notifying the ranging protocol change may include information notifying that the ranging protocol is changed from the two-way ranging protocol to the one-way ranging protocol. The packet notifying the ranging protocol change may be transmitted through the BLE GATT connection.

As such, as the ranging protocol is changed, the ranging protocol of the first external electronic device 610 is changed from the two-way ranging protocol to the one-way ranging protocol, so the UWB connection which is based on the two-way ranging protocol between the electronic device 101 and the external electronic devices 610 may be switched to a UWB connection which is based on the one-way ranging protocol in operation 1433. The UWB connection which is based on the two-way ranging protocol between the second external electronic device 620 and the first external electronic device 610 may be also switched to a UWB connection which is based on the one-way ranging protocol in operation 1435. The other second external electronic device 1110 may establish a UWB connection which is based on the one-way ranging protocol with the first external electronic device 610 in operation 1437. In operation 1439, the first external electronic device 610 may switch the UWB connection between the first external electronic device 610 and the electronic device 101 and the UWB connection between the first external electronic device 610 and the second external electronic device 620 from a UWB connection which is based on the two-way ranging protocol to a UWB connection which is based on the one-way ranging protocol, and may establish a UWB connection which is based on the one-way ranging protocol with the other second external electronic device 1110.

Figure 15:
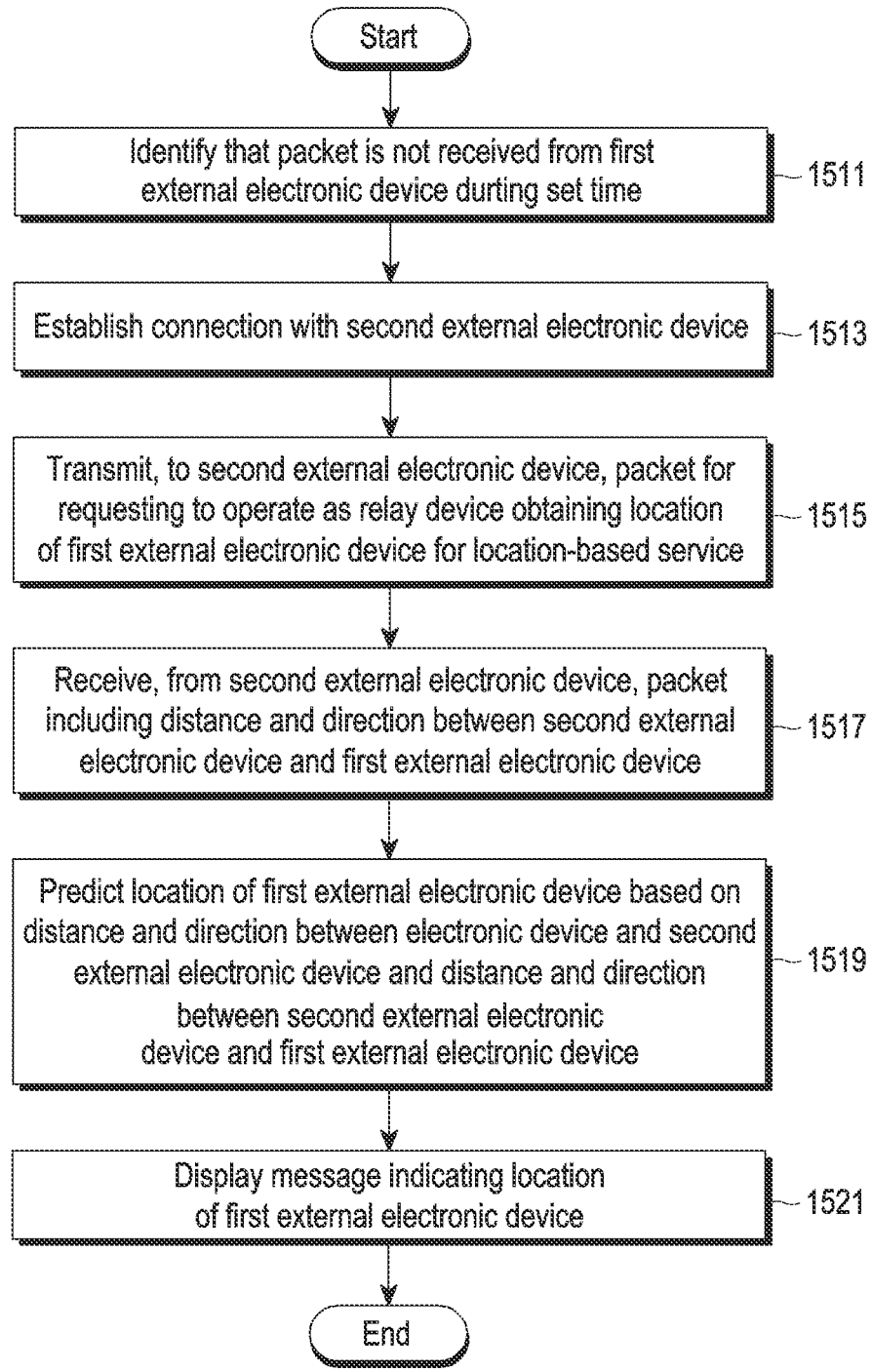
FIG. 15 is a diagram illustrating an example of an operating process of an electronic device in a wireless communication network according to an embodiment of the disclosure.

FIG. 15 is a diagram illustrating an example of an operating process of an electronic device in a wireless communication network according to an embodiment of the disclosure.

Referring to FIG. 15, an operating process of an electronic device (e.g., an electronic device 101 in FIG. 1, FIG. 3, or FIG. 6) illustrated in FIG. 15 may be an operating process according to a process for providing a location-based service (e.g., a finding service) described in FIG. 6.

In operation 1511, a processor (e.g., a processor 120 in FIG. 1 or a processor 304 in FIG. 3) of the electronic device may identify that a packet is not received from a first external electronic device (e.g., a first external electronic device 610 in FIG. 6) during set time while providing a location-based service (e.g., a finding service) for the first external electronic device. In an embodiment, the first external electronic device may be a target electronic device for the search service, and a connection between the electronic device and the first external electronic device may be a UWB connection. As described in FIG. 6, because a UWB antenna has a directional radiation pattern, if a direction of the electronic device does not match a direction of the first external electronic device, or if there is an obstacle between the electronic device and the first external electronic device, or if a distance between the electronic device and the first external electronic device is greater than a threshold distance, the electronic device may not receive a packet (e.g., a UWB packet) from the first external electronic device.

Upon identifying that the packet is not received from the first external electronic device during the set time, the processor may establish, via a communication circuit (e.g., a communication module 190 in FIG. 1 or a communication circuit 302 in FIG. 3), a connection (e.g., a UWB connection) with a second external electronic device (e.g., a second external electronic device 620 in FIG. 4 or FIG. 6) which is one of at least one set helper electronic device in operation 1513.

As the connection is established between the electronic device and the second external electronic device, the processor may transmit, to the second external electronic device via the communication circuit, a packet (e.g., a first packet) for requesting to operate as a relay device (e.g., a UWB relay device) which obtains a location of the first external electronic device for the location-based service in operation 1515. The packet for requesting to operate as the relay device which obtains the location of the first external electronic device may be implemented similarly to that described in FIG. 6, so a detailed description thereof will be omitted.

Upon transmitting, to the second external electronic device, the packet for requesting to operate as the relay device which obtains the location of the first external electronic device, the processor may receive, from the second external electronic device via the communication circuit, a packet (e.g., a relay packet) including a distance and a direction between the second external electronic device and the first external electronic device in operation 1517. The packet, including the distance and the direction between the second external electronic device and the first external electronic device, which is received from the second external electronic device may be implemented similarly to a relay packet described in FIG. 6, so a detailed description thereof will be omitted.

Upon receiving, from the second external electronic device, the packet including the distance and the direction between the second external electronic device and the first external electronic device, the processor may predict a location of the first external electronic device based on a distance and a direction between the electronic device and the second external electronic device and the distance and the direction between the second external electronic device and the first external electronic device in operation 1519. An operation of predicting the location of the first external electronic device based on the distance and the direction between the electronic device and the second external electronic device and the distance and the direction between the second external electronic device and the first external electronic device may be implemented similarly to that described in FIG. 10, so a detailed description thereof will be omitted.

Upon predicting the location of the first external electronic device, the processor may display, via a display (e.g., a display module 160 in FIG. 1 or a display 310 in FIG. 3), a message indicating the predicted location of the first external electronic device in operation 1521.

Figure 16:
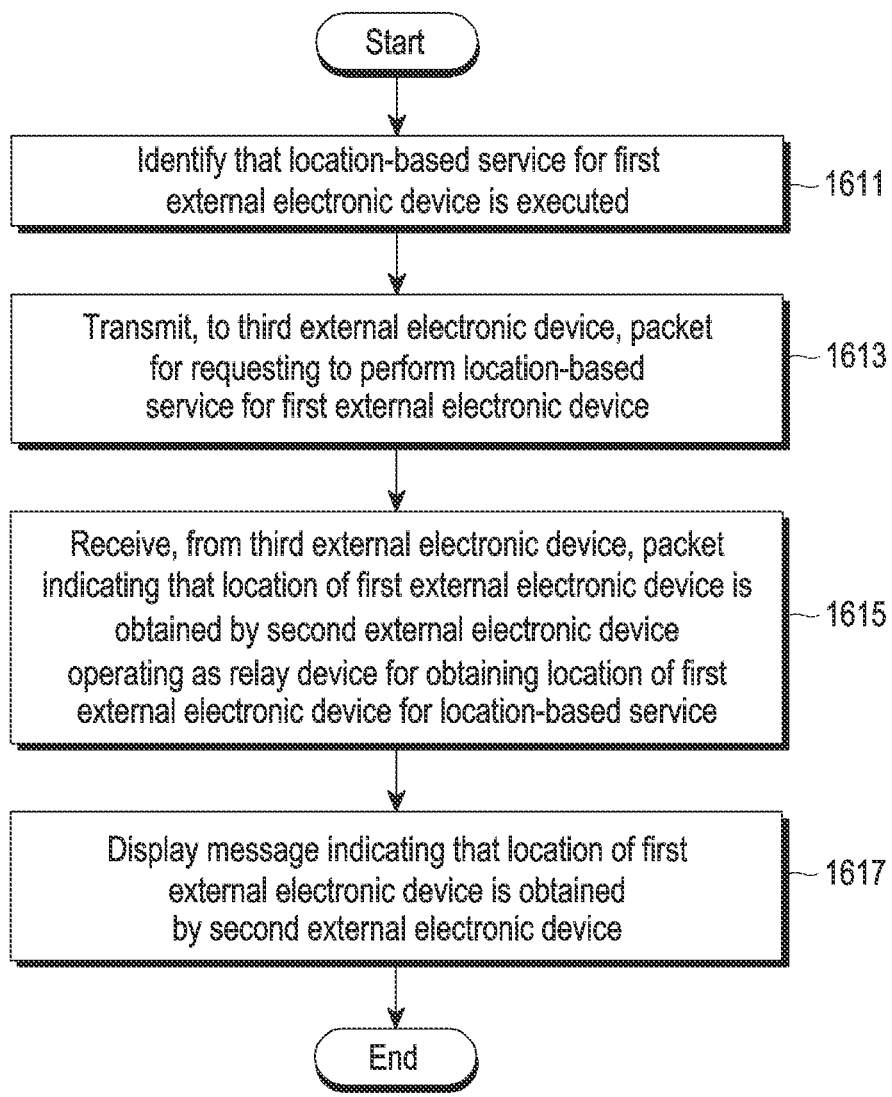
FIG. 16 is a diagram illustrating an example of an operating process of an electronic device in a wireless communication network according to an embodiment of the disclosure.

FIG. 16 is a diagram illustrating an example of an operating process of an electronic device in a wireless communication network according to an embodiment of the disclosure.

Referring to FIG. 16, an operating process of an electronic device (e.g., an electronic device 101 in FIG. 1, FIG. 3, FIGS. 12A and 12B, or FIGS. 13A and 13B) illustrated in FIG. 16 may be an operating process according to a process of providing a location-based service (e.g., a finding service) described in FIGS. 12A and 12B, or FIGS. 13A and 13B.

In operation 1611, a processor (e.g., a processor 120 in FIG. 1 or a processor 304 in FIG. 3) of the electronic device may identify that a location-based service (e.g., a finding) for a first external electronic device (e.g., an electronic device 102 in FIG. 1, or a first external electronic device 610 in FIGS. 12A and 12A or FIGS. 13A and 13A) is executed.

Upon identifying that the location-based service for the first external electronic device is executed, the processor may transmit, to a third external electronic device (e.g., a server 108 in FIG. 1 or a third external electronic device 1210 in FIG. 5, FIGS. 12A and 12B, or FIGS. 13A and 13B) via a communication circuit (e.g., a communication module 190 in FIG. 1 or a communication circuit 302 in FIG. 3), a packet (e.g., a second packet) for requesting to perform the location-based service for the first external electronic device in operation 1613. The packet for requesting to perform the location-based service for the first external electronic device may be implemented similarly to a second packet in operation 1211 in FIGS. 12A and 12B or a second packet in operation 1211 in FIGS. 13A and 13B, so a detailed description thereof will be omitted.

Upon transmitting, to the third external electronic device, the packet for requesting to perform the location-based service for the first external electronic device, the processor may receive, from the third external electronic device via the communication circuit, a packet (e.g., a fifth packet) indicating that a location of the first external electronic device is obtained by a second external electronic device (e.g., a second external electronic device 620 in FIG. 4, FIGS. 12A and 12B, or FIGS. 13A and 13B) which operates as a relay device (e.g., a UWB relay device) for obtaining the location of the first external electronic device for the location-based service in operation 1615. The packet indicating that the location of the first external electronic device is obtained by the second external electronic device may be implemented similarly to a fifth packet in operation 1229 in FIGS. 12A and 12B or a fifth packet in operation 1229 of FIGS. 13A and 13B, so a detailed description thereof will be omitted.

Upon receiving the packet indicating that the location of the first external electronic device is obtained by the second external electronic device, the processor may display, via a display (e.g., a display module 160 in FIG. 1 or a display 310 in FIG. 3), a message indicating that the location of the first external electronic device is obtained by the second external electronic device in operation 1617. The message indicating that the location of the first external electronic device is obtained by the second external electronic device may be implemented similarly to a message indicating that a location of a first external electronic device is obtained by a second external electronic device in operation 1231 of FIGS. 12A and 12B or a message indicating that a location of a first external electronic device is obtained by a second external electronic device in operation 1231 of FIGS. 13A and 13B, so a detailed description thereof will be omitted.

Figure 17:
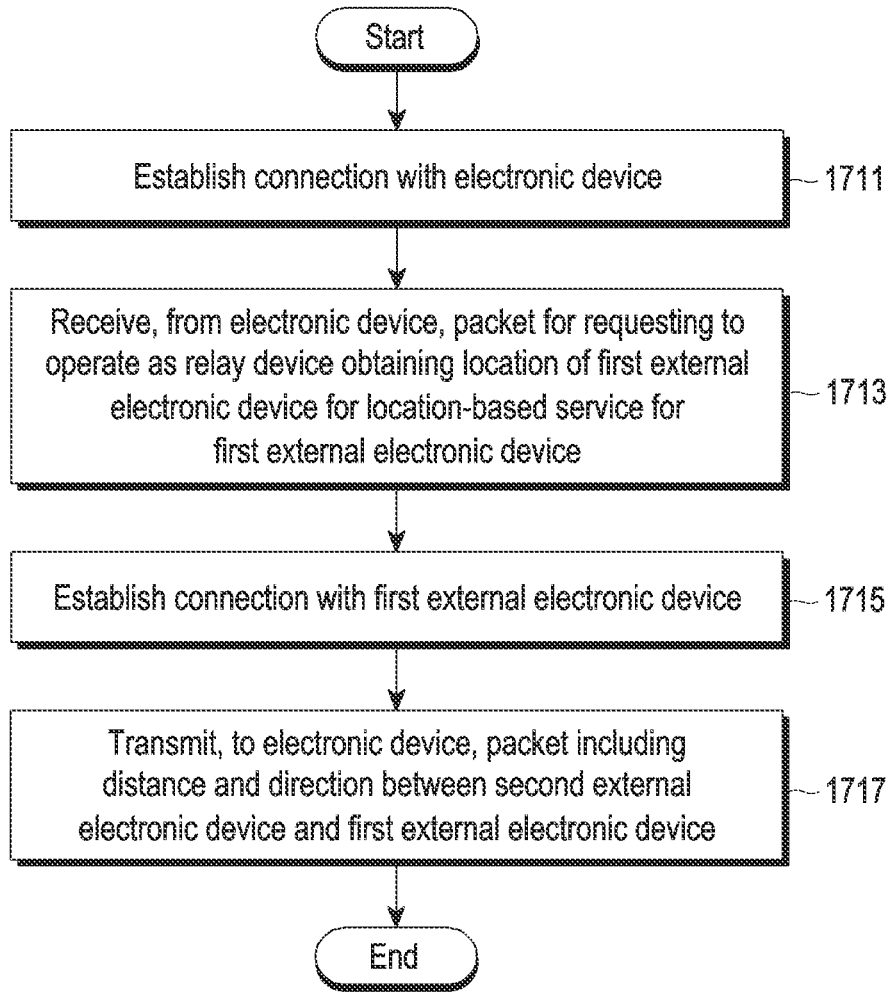
FIG. 17 is a diagram illustrating an example of an operating process of a second external electronic device in a wireless communication network according to an embodiment of the disclosure.

FIG. 17 is a diagram illustrating an example of an operating process of a second external electronic device in a wireless communication network according to an embodiment of the disclosure.

Referring to FIG. 17, an operating process of a second external electronic device (e.g., a second external electronic device 620 in FIG. 4 or FIG. 6) illustrated in FIG. 17 may be an operating process according to a location-based service (e.g., a finding service) described in FIG. 6.

In operation 1711, a processor (e.g., a processor 404 in FIG. 4) of the second external electronic device may establish, via a communication circuit (e.g., a communication circuit 402 in FIG. 4), a connection (e.g., a UWB connection) with an electronic device (e.g., an electronic device 101 in FIG. 1, FIG. 3, or FIG. 6) in operation 1711.

Upon establishing the connection with the electronic device, the processor may receive, via the communication circuit from the electronic device, a packet (e.g., a first packet) for requesting to operate as a relay device (e.g., a UWB relay device) which obtains a location of a first external electronic device (e.g., an electronic device 102 in FIG. 1 or a first external electronic device 610 in FIG. 6) for the location-based service for the first external electronic device in operation 1713. The packet for requesting to operate as the relay device which obtains the location of the first external electronic device may be implemented similarly to that described in FIG. 6, so a detailed description thereof will be omitted.

Upon receiving the packet for requesting to operate as the relay device which obtains the location of the first external electronic device, the processor may establish, via the communication circuit, a connection (e.g., a UWB connection) with the first external electronic device in operation 1715.

As the connection is established between the second external electronic device and the first external electronic device, the processor may obtain a distance and a direction between the second external electronic device and the first external electronic device. In operation 1717, the processor may transmit, to the electronic device via the communication circuit, a packet (e.g., a relay packet) including the distance and the direction between the second external electronic device and the first external electronic device. The relay packet may be implemented similarly to a relay packet in FIG. 6 and a relay packet in FIG. 9, so a detailed description thereof will be omitted.

Figure 18:
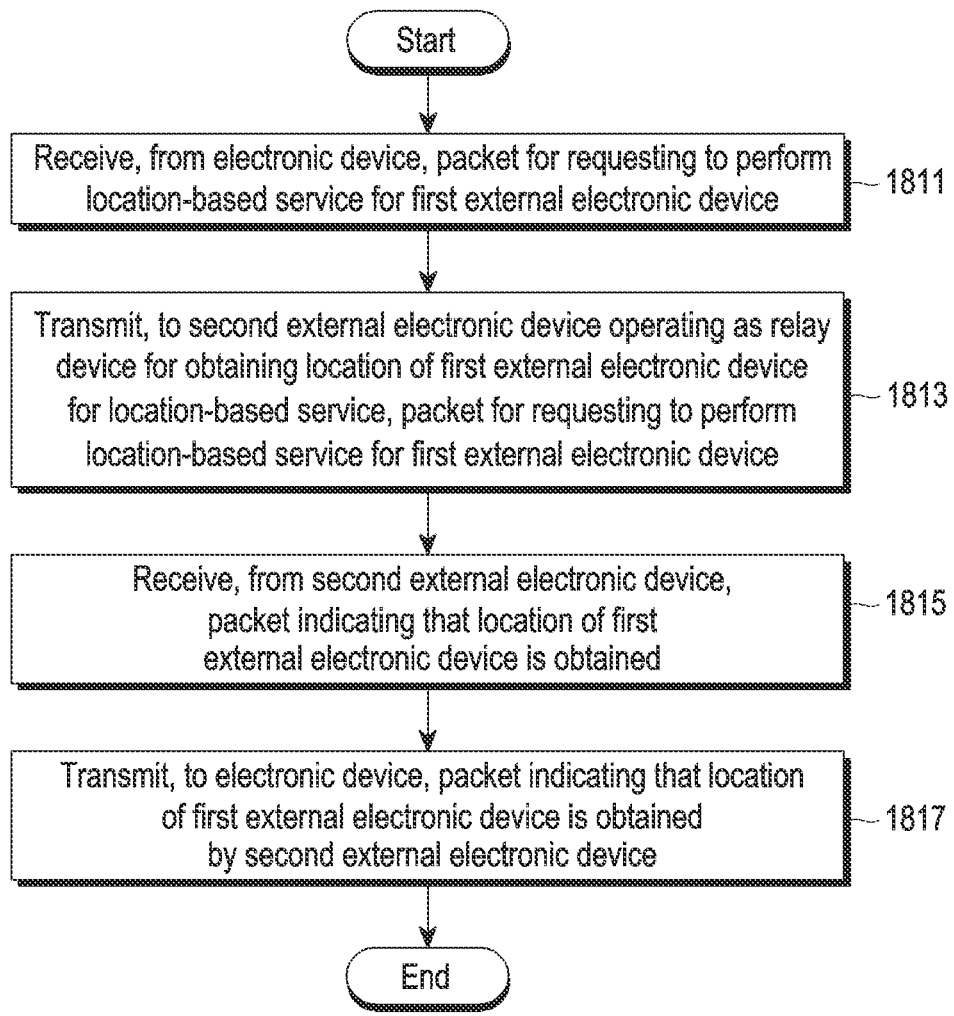
FIG. 18 is a diagram illustrating an example of an operating process of a third external electronic device in a wireless communication network according to an embodiment of the disclosure.

FIG. 18 is a diagram illustrating an example of an operating process of a third external electronic device in a wireless communication network according to an embodiment of the disclosure.

Referring to FIG. 18, an operating process of a third external electronic device (e.g., a server 108 in FIG. 1, or a third external electronic device 1210 in FIG. 5, FIGS. 12A and 12B, or FIGS. 13A and 13B) illustrated in FIG. 18 may be an operating process according to a process of providing a location-based service (e.g., a finding service) described in FIGS. 12A and 12B, or FIGS. 13A and 13B.

In operation 1811, a processor of the third external electronic device may receive, from an electronic device (e.g., an electronic device 101 FIG. 1, FIG. 3, FIGS. 12A and 12B, or FIGS. 13A and 13A) via a communication circuit (e.g., a communication circuit 502 in FIG. 5), a packet (e.g., a second packet) for requesting to perform a location-based service for a first external electronic device (e.g., an electronic device 102 in FIG. 1, or a first external electronic device 610 in FIGS. 12A and 12B, or FIGS. 13A and 13B). The packet for requesting to perform the location-based service for the first external electronic device may be implemented similarly to a second packet in operation 1211 of FIGS. 12A and 12B or a second packet in operation 1211 in FIGS. 13A and 13B, so a detailed description thereof will be omitted.

Upon receiving the packet for requesting to perform the location-based service for the first external electronic device, the processor may transmit, to a second external electronic device (e.g., a second external electronic device 620 in FIG. 4, FIGS. 12A and 12B, or FIGS. 13A and 13B) operating as a relay device (e.g., a UWB relay device) which obtains a location of the first external electronic device for the location-based service via the communication circuit, a packet (e.g., a third packet) for requesting to perform the location-based service for the first external electronic device in operation 1813. The packet for requesting to perform the location-based service for the first external electronic device may be implemented similarly to a third packet in operation 1217 in FIGS. 12A and 12B or a third packet in operation 1217 in FIGS. 13A and 13B, so a detailed description thereof will be omitted.

Upon transmitting, to the second external electronic device, the packet for requesting to perform the location-based service for the first external electronic device, the processor may receive, from the second external electronic device via the communication circuit, a packet (e.g., a fourth packet) indicating that a location of the first external electronic device is obtained in operation 1815. The packet indicating that the location of the first external electronic device is obtained may be implemented similarly to a fourth packet in operation 1227 in FIGS. 12A and 12B or a fourth packet in operation 1227 in FIGS. 13A and 13B, so a detailed description thereof will be omitted.

Upon receiving the packet indicating that the location of the first external electronic device is obtained from the second external electronic device, the processor may transmit, to the electronic device via the communication circuit, a packet (e.g., a fifth packet) indicating that the location of the first external electronic device is obtained by the second external electronic device in operation 1817. The packet indicating that the location of the first external electronic device is obtained by the second external electronic device may be implemented similarly to a fifth packet in operation 1229 in FIGS. 12A and 12B or a fifth packet in operation 1229 in FIGS. 13A and 13B, so a detailed description thereof will be omitted.

Figure 19:
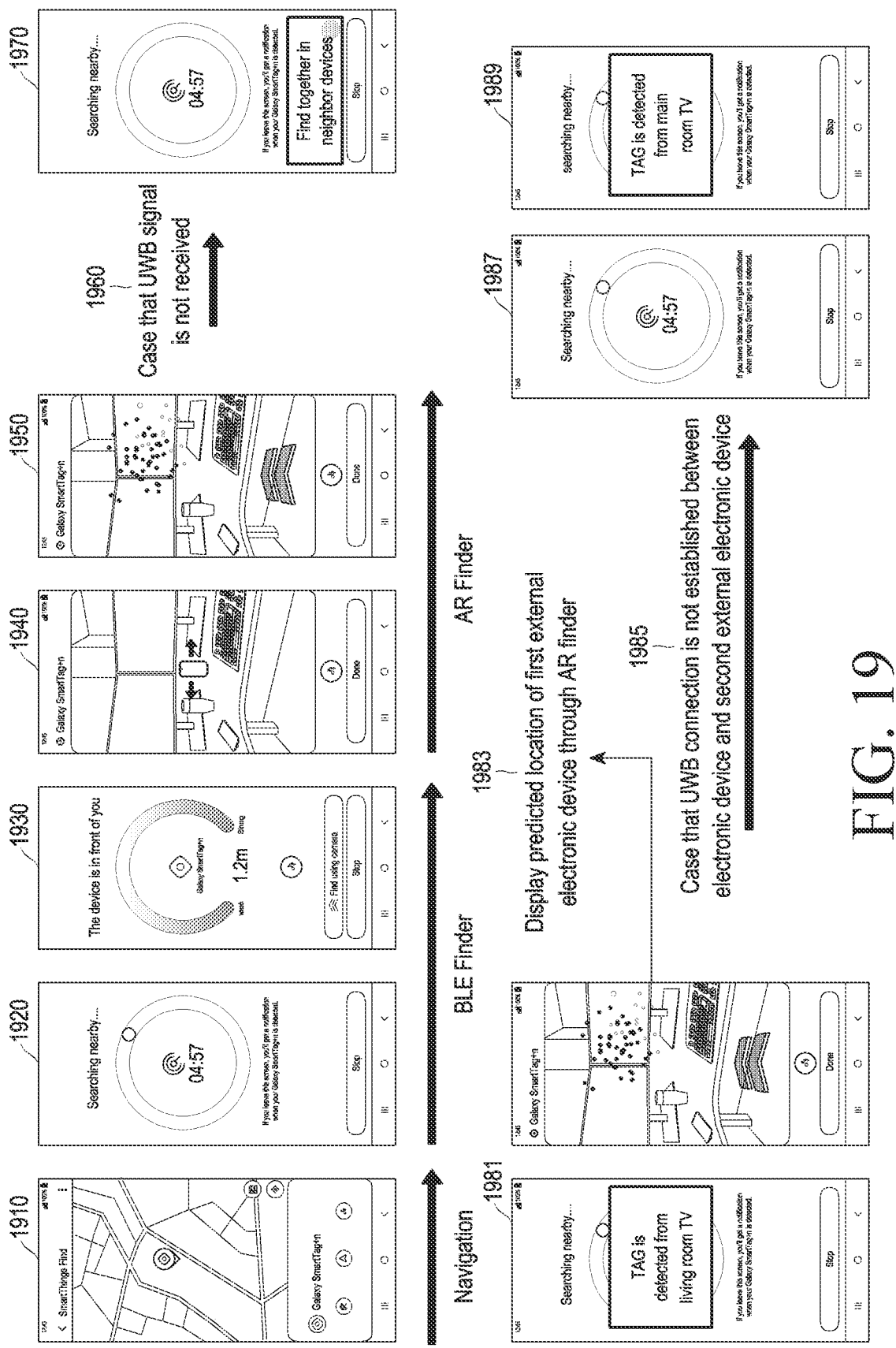
FIG. 19 is a diagram illustrating an example of a UI provided according to a location-based service in a wireless communication network according to an embodiment of the disclosure.

FIG. 19 is a diagram illustrating an example of a UI provided according to a location-based service in a wireless communication network according to an embodiment of the disclosure.

Referring to FIG. 19, an electronic device (e.g., a smart phone) may interwork with a first external electronic device, at least one second external electronic device (e.g., an IoT device), and/or a third external electronic device (e.g., a server) which exist in various spaces within a wireless communication network to provide a location-based service (e.g., a finding service). For example, the first external electronic device may include a smart tag (e.g., a Samsung Galaxy smart tag), a smart button, and/or a wearable electronic device (e.g., a smart watch or earbuds).

Operations corresponding to reference numerals 1910, 1920, 1930, 1940, and 1950 in FIG. 19 may be implemented similarly to operations corresponding to reference numerals 210, 220, 230, 240, and 250 described in FIG. 2, so a detailed description will be omitted.

Because a UWB antenna generally has a directional radiation pattern, if a direction of the electronic device does not match a direction of the first external electronic device, if there is an obstacle between the electronic device and the first external electronic device, and/or if the distance between the electronic device and the first external electronic device is longer than a threshold distance, the electronic device may not receive a UWB signal from the first external electronic device (1960). If the UWB signal is not received from the first external electronic device during set time, the electronic device may cooperate with the second external electronic device to provide the finding service for the first external electronic device (1970). Because the electronic device performs a searching operation for the first external electronic device in a state in which a BLE connection with the first external electronic device is not established, the electronic device may display, through a UI, a message (e.g., "Searching nearby . . . ") including information indicating that the first external electronic device is being searched (1970). An operation in which the electronic device cooperates with the second external electronic device to provide the finding service for the first external electronic device may be implemented similarly to a finding service described in FIGS. 12A and 12B or FIGS. 13A and 13B, so a detailed description thereof will be omitted.

Upon receiving, from the third external electronic device, a packet (e.g., a fifth packet) indicating that the location of the first external electronic device is obtained by the second external electronic device, the electronic device may display, through a UI on a BLE finder, a message notifying that the first external electronic device is found based on initiator device information, responder device information, and/or UWB ranging data included in the fifth packet (1981). The message notifying that the first external electronic device is found may be a message indicating that a location of the first external electronic device is obtained by the second external electronic device. In FIG. 19, the message notifying that the first external electronic device is found is illustrated as "A TAG is detected from a living room TV" as an example, and in this case, the living room TV may be the second external electronic device, and the TAG may be the first external electronic device.

Upon displaying the message notifying that the first external electronic device is found, the electronic device may predict a distance and a direction between the electronic device and the first external electronic device based on a distance and a direction between the electronic device and the second external electronic device and a distance and a direction between the second external electronic device and the first external electronic device if it is possible to obtain the distance and the direction between the electronic device and the second external electronic device (e.g., if a UWB connection is possible to be established). For example, the electronic device may predict the location of the first external electronic device based on the predicted distance and direction between the electronic device and the first external electronic device, and display the predicted location of the first external electronic device through a UI on the AR finder (1983).

If the packet (e.g., the fifth packet) indicating that the location of the first external electronic device is obtained by the second external electronic device is not received from the third external electronic device, it is impossible to obtain the distance and the direction between the electronic device and the second external electronic device (e.g., if a UWB connection is not established) (1985), so the electronic device may cooperate with another second external electronic device to search for the first external electronic device again (1987).

Thereafter, upon receiving, from the third external electronic device, a packet (e.g., a fifth packet) indicating that the location of the first external electronic device is obtained by the other second external electronic device, the electronic device may display, through a UI on the AR finder, a message notifying that the first external electronic device is found based on initiator device information, responder device information, and/or UWB ranging data included in the fifth packet (1989). In FIG. 19, the message notifying that the first external electronic device is found is illustrated as "A TAG is detected from a main room TV" as an example, and in this case, the main room TV may be the other second external electronic device, and the TAG may be the first external electronic device.

In FIG. 19, a case that the electronic device receives, from the third external electronic device, information about the distance and the direction between the second external electronic device or the other second external electronic device and the first external electronic device has been described as an example, however, the electronic device may also receive a relay packet directly from the second external electronic device or the other second external electronic device to receive the information about the distance and the direction between the second external electronic device or the other second external electronic device and the first external electronic device.

Figure 20:
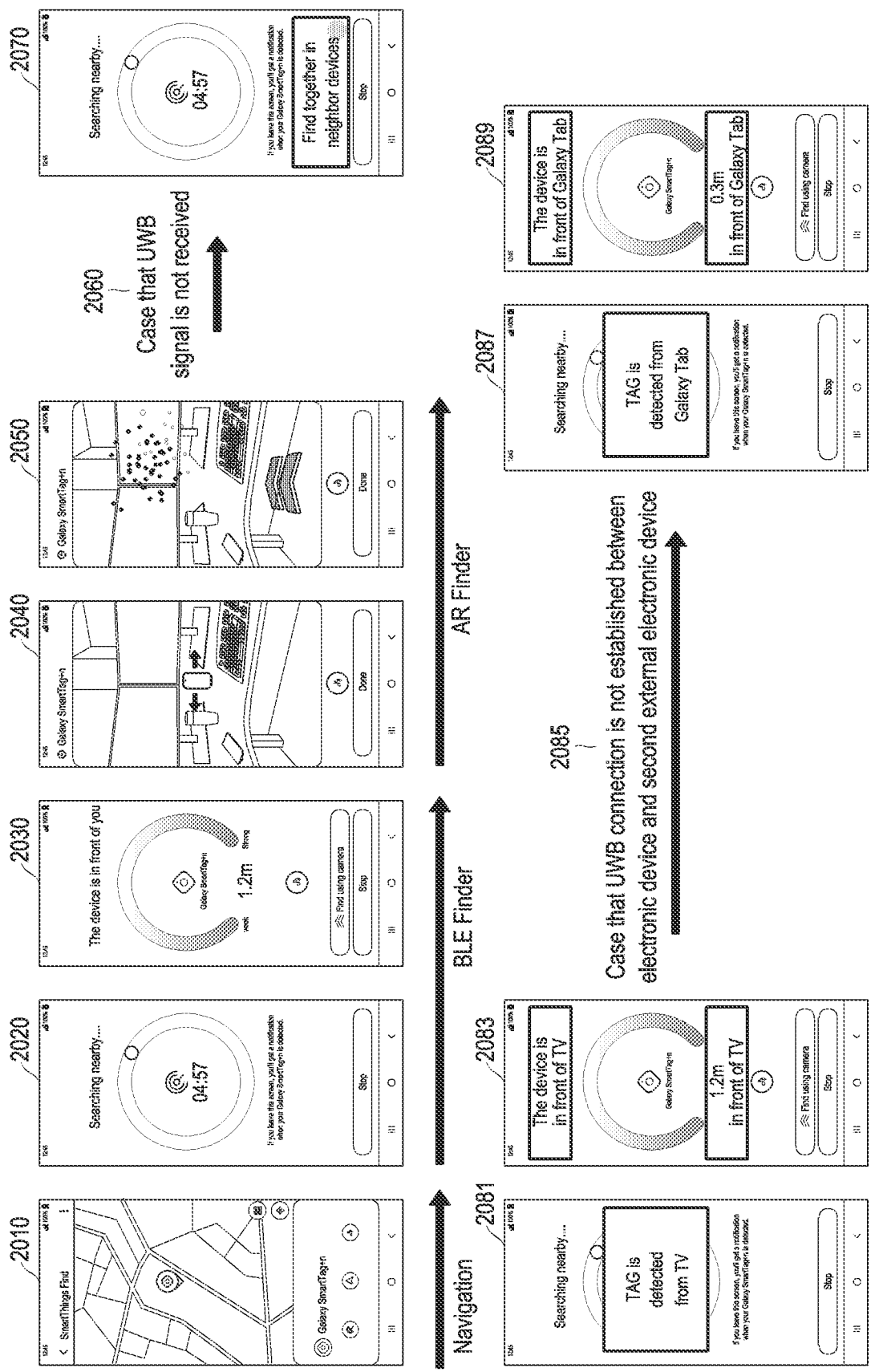
FIG. 20 is a diagram illustrating an example of a UI provided according to a location-based service in a wireless communication network according to an embodiment of the disclosure.

FIG. 20 is a diagram illustrating an example of a UI provided according to a location-based service in a wireless communication network according to an embodiment of the disclosure.

Referring to FIG. 20, an electronic device (e.g., a smart phone) may interwork with a first external electronic device, at least one second external electronic device (e.g., an IoT device), and/or a third external electronic device (e.g., a server) which exist in various spaces within a wireless communication network to provide a location-based service (e.g., a finding service). For example, the first external electronic device may include a smart tag (e.g., a Samsung Galaxy smart tag), a smart button, and/or a wearable electronic device (e.g., a smart watch or earbuds).

Operations corresponding to reference numbers 2010, 2020, 2030, 2040, 2050, 2060, and 2070 in FIG. 20 may be implemented similarly to operations corresponding to reference numbers 1910, 1920, 1930, 1940, 1950, 1960, and 1970 described in FIG. 19, so a detailed description thereof will be omitted.

Upon receiving, from the third external electronic device, a packet (e.g., a fifth packet) indicating that the location of the first external electronic device is obtained by the second external electronic device, the electronic device may display, through a UI on a BLE finder, a message notifying that the first external electronic device is found based on initiator device information, responder device information, and/or UWB ranging data included in the fifth packet (2081). The message notifying that the first external electronic device is found may be a message indicating that a location of the first external electronic device is obtained by the second external electronic device. In FIG. 20, the message notifying that the first external electronic device is found is illustrated as "A TAG is detected from a TV" as an example, and in this case, the TV may be the second external electronic device, and the TAG may be the first external electronic device. Upon displaying the message notifying that the first external electronic device is found, the electronic device may display, through a UI on a BLE finder, a message including information related to a location of the first external electronic device based on the distance and the direction between the first external electronic device and the second external electronic device (2083).

If the packet (e.g., the fifth packet) indicating that the location of the first external electronic device is obtained by the second external electronic device is not received from the third external electronic device, it is impossible to obtain the distance and the direction between the electronic device and the second external electronic device (e.g., if a UWB connection is not established) (2085), so the electronic device may cooperate with another second external electronic device to search for the first external electronic device again. Thereafter, upon receiving, from the third external electronic device, a packet (e.g., a fifth packet) indicating that the location of the first external electronic device is obtained by the other second external electronic device, the electronic device may display, through a UI on the AR finder, a message notifying that the first external electronic device is found based on initiator device information, responder device information, and/or UWB ranging data included in the fifth packet (2087). In FIG. 20, the message notifying that the first external electronic device is found is illustrated as "A Galaxy Tab is detected from a main room TV" as an example, and in this case, the Galaxy Tab may be the other second external electronic device, and the TAG may be the first external electronic device. Upon displaying the message notifying that the first external electronic device is found, the electronic device may display, through a UI on the BLE finder, a message including information related to the location of the first external electronic device based on the distance and the direction between the first external electronic device and the other second external electronic device (2089).

In FIG. 20, a case that the electronic device receives, from the third external electronic device, information about the distance and the direction between the second external electronic device or the other second external electronic device and the first external electronic device has been described as an example. However, the electronic device may also receive a relay packet directly from the second external electronic device or the other second external electronic device to receive the information about the distance and the direction between the second external electronic device or the other second external electronic device and the first external electronic device.

Figure 21:
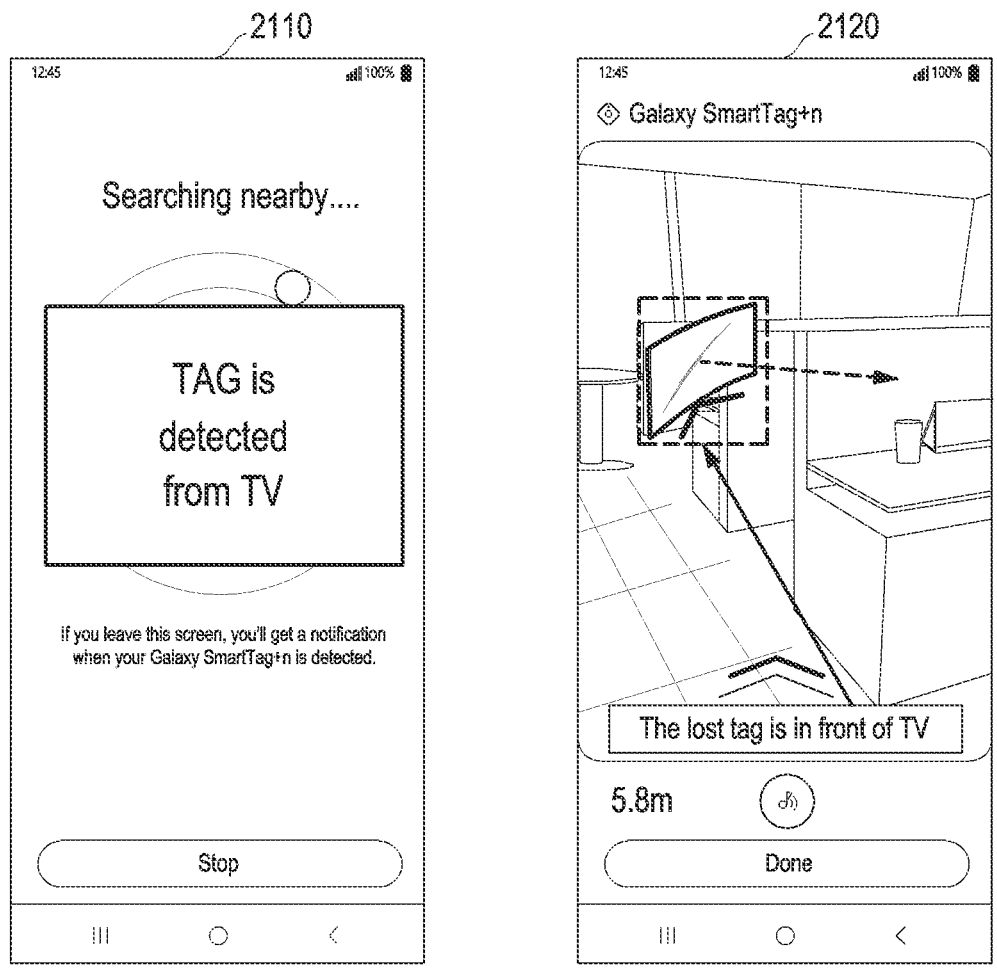
FIG. 21 is a diagram illustrating an example of a UI provided according to a location-based service in a wireless communication network according to an embodiment of the disclosure.

FIG. 21 is a diagram illustrating an example of a UI provided according to a location-based service in a wireless communication network according to an embodiment of the disclosure.

Referring to FIG. 21, an electronic device (e.g., a smart phone) may interwork with a first external electronic device, at least one second external electronic device (e.g., an IoT device), and/or a third external electronic device (e.g., a server) which exist in various spaces within a wireless communication network to provide a location-based service (e.g., a finding service). For example, the first external electronic device may include a smart tag (e.g., a Samsung Galaxy smart tag), a smart button, and/or a wearable electronic device (e.g., a smart watch or earbuds).

Operations corresponding to reference numerals 2110 and 2120 illustrated in FIG. 21 may be implemented similarly to operations corresponding to reference numerals 1981 and 1983 described in FIG. 19. However, in FIG. 19, only a predicted location of the first external electronic device is displayed through a UI on an AR finder (1983 in FIG. 19), whereas in FIG. 21, not only a predicted location of the first external electronic device but also a distance and a direction between the first external electronic device and the second external electronic device may also be displayed through a UI on an AR finder (2120).

Figure 22:
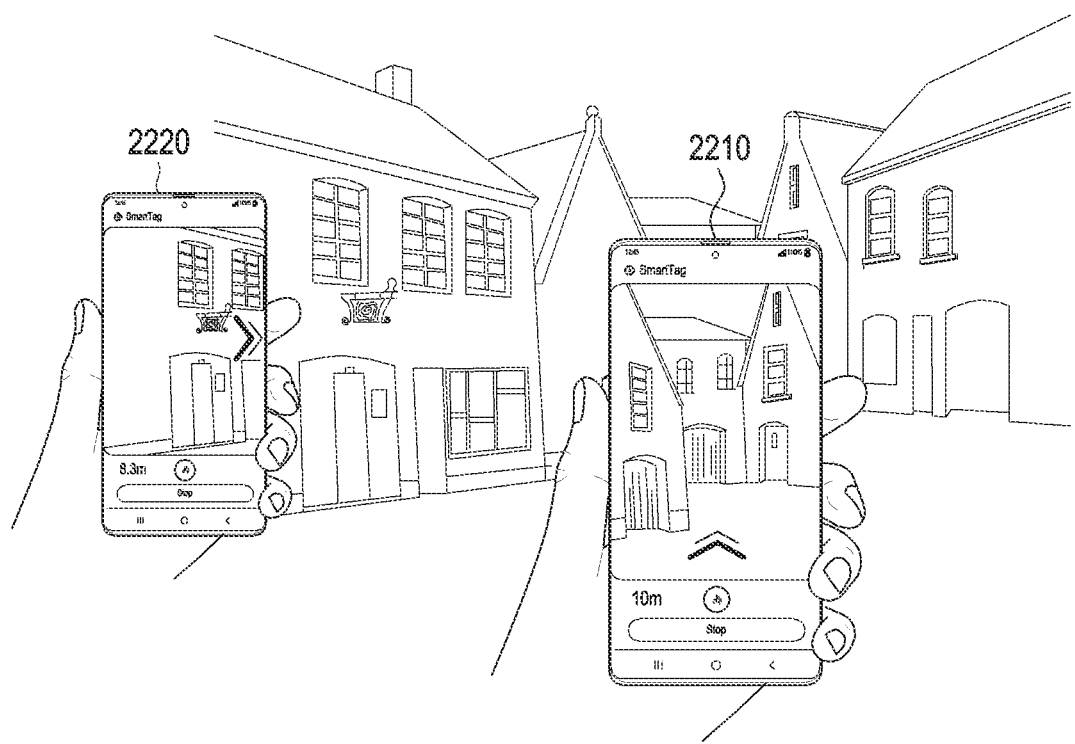
FIG. 22 is a diagram illustrating an example of a UI provided according to a location-based service in a wireless communication network according to an embodiment of the disclosure.

FIG. 22 is a diagram illustrating an example of a UI provided according to a location-based service in a wireless communication network according to an embodiment of the disclosure.

Referring to FIG. 22, an electronic device (e.g., a smart phone) may interwork with a first external electronic device, at least one second external electronic device (e.g., an IoT device), and/or a third external electronic device (e.g., a server) which exist in various spaces within a wireless communication network to provide a location-based service (e.g., a finding service). For example, the first external electronic device may include a smart tag (e.g., a Samsung Galaxy smart tag), a smart button, and/or a wearable electronic device (e.g., a smart watch or earbuds).

The electronic device may provide a finding service for the first external electronic device together with the at least one second external electronic device and/or the third external electronic device, so a screen 2210 indicating a finding service result for the first external electronic device in a case that the electronic device exists at a first location may be different from a screen 2220 indicating a finding service result for the first external electronic device in the case that the electronic device exists at the first location. Even though the electronic device may not establish a connection (e.g., a UWB connection) with the first external electronic device, the electronic device may display information related to the location of the first external electronic device based on information obtained through the second external electronic device and/or the third external electronic device (2210 and 2220).

According to an embodiment of the disclosure, an operating method of an electronic device (e.g., an electronic device 101 in FIG. 1, FIG. 3, or FIG. 6) may comprise establishing a connection with a second external electronic device (e.g., a second external electronic device 620 in FIG. 4 or FIG. 6) upon identifying that a packet is not received from a first external electronic device (e.g., an electronic device 102 in FIG. 1 or a first external electronic device 610 in FIG. 6) during set time while providing a location-based service for the first external electronic device (e.g., the electronic device 102 in FIG. 1 or the first external electronic device 610 in FIG. 6).

The operating method may further comprise transmitting, to the second external electronic device (e.g., the second external electronic device 620 in FIG. 4 or FIG. 6), a packet for requesting to operate as a relay device for obtaining a location of the first external electronic device (e.g., the electronic device 102 in FIG. 1 or the first external electronic device 610 in FIG. 6).

The operating method may further comprise receiving, from the second external electronic device (e.g., the second external electronic device 620 in FIG. 4 or FIG. 6), a packet including a distance and a direction between the second external electronic device (e.g., the second external electronic device 620 in FIG. 4 or FIG. 6) and the first external electronic device (e.g., the electronic device 102 in FIG. 1 or the first external electronic device 610 in FIG. 6).

The operating method may further comprise predicting a location of the first external electronic device (e.g., the electronic device 102 in FIG. 1 or the first external electronic device 610 in FIG. 6) based on a distance and a direction between the electronic device (e.g., the electronic device 101 in FIG. 1, FIG. 3, or FIG. 6) and the second external electronic device (e.g., the second external electronic device 620 in FIG. 4 or FIG. 6), and the distance and the direction between the second external electronic device (e.g., the second external electronic device 620 in FIG. 4 or FIG. 6) and the first external electronic device (e.g., the electronic device 102 in FIG. 1 or the first external electronic device 610 in FIG. 6).

The operating method may further comprise displaying information indicating the predicted location of the first external electronic device (e.g., the electronic device 102 in FIG. 1 or the first external electronic device 610 in FIG. 6).

According to an embodiment of the disclosure, an operating method of a second external electronic device (e.g., a second external electronic device 620 in FIG. 4 or FIG. 6) may comprise establishing a connection with an electronic device (e.g., an electronic device 101 in FIG. 1, FIG. 3, or FIG. 6).

The operating method may further comprise receiving, from the electronic device (e.g., the electronic device 101 in FIG. 1, FIG. 3, or FIG. 6), a packet for requesting to operate as a relay device for obtaining a location of a first external electronic device (e.g., an electronic device 102 in FIG. 1 or a first external electronic device 610 in FIG. 6) for a location-based service for the first external electronic device (e.g., the electronic device 102 in FIG. 1 or the first external electronic device 610 in FIG. 6).

The operating method may further comprise establishing a connection with the first external electronic device (e.g., the electronic device 102 in FIG. 1 or the first external electronic device 610 in FIG. 6).

The operating method may further comprise transmitting, to the electronic device (e.g., the electronic device 101 in FIG. 1, FIG. 3, or FIG. 6), a packet including a distance and a direction between the second external electronic device (e.g., the second external electronic device 620 in FIG. 4 or FIG. 6) and the first external electronic device (e.g., the electronic device 102 in FIG. 1 or the first external electronic device 610 in FIG. 6).

According to an embodiment of the disclosure, an operating method of an electronic device (e.g., an electronic device 101 in FIG. 1, FIG. 3, FIGS. 12A and 12B, or FIGS. 13A and 13B) may comprise transmitting, to a third external electronic device (e.g., a server 108 in FIG. 1 or a third external electronic device 1210 in FIG. 5, FIGS. 12A and 12B, or FIGS. 13A and 13B), a packet for requesting to perform a location-based service for a first external electronic device (e.g., an electronic device 102 in FIG. 1 or a first external electronic device 610 in FIGS. 12A and 12B, or FIGS. 13A and 13B) upon identifying that the location-based service for the first external electronic device (e.g., the electronic device 102 in FIG. 1 or the first external electronic device 610 in FIGS. 12A and 12B, or FIGS. 13A and 13B) is executed.

The operating method may further comprise receiving, from the third external electronic device (e.g., the server 108 in FIG. 1 or the third external electronic device 1210 in FIG. 5, FIGS. 12A and 12B, or FIGS. 13A and 13B), a packet indicating a location of the first external electronic device (e.g., the electronic device 102 in FIG. 1 or the first external electronic device 610 in FIGS. 12A and 12B, or FIGS. 13A and 13B) is obtained by a second external electronic device (e.g., a second external electronic device 620 in FIG. 4, FIGS. 12A and 12B, or FIGS. 13A and 13B) which operates a relay device for obtaining the location of the first external electronic device (e.g., the electronic device 102 in FIG. 1 or the first external electronic device 610 in FIGS. 12A and 12B, or FIGS. 13A and 13B).

The operating method may further comprise displaying information indicating that the location of the first external electronic device (e.g., the electronic device 102 in FIG. 1 or the first external electronic device 610 in FIGS. 12A and 12B, or FIGS. 13A and 13B) is obtained by the second external electronic device (e.g., the second external electronic device 620 in FIG. 4, FIGS. 12A and 12B, or FIGS. 13A and 13B).

The operating method may further comprise establishing a connection with the second external electronic device (e.g., the second external electronic device 620 in FIG. 4, FIGS. 12A and 12B, or FIGS. 13A and 13B), receiving, from the second external electronic device (e.g., the second external electronic device 620 in FIG. 4, FIGS. 12A and 12B, or FIGS. 13A and 13B), a packet including a distance and a direction between the second external electronic device (e.g., the second external electronic device 620 in FIG. 4, FIGS. 12A and 12B, or FIGS. 13A and 13B) and the first external electronic device (e.g., the electronic device 102 in FIG. 1 or the first external electronic device 610 in FIGS. 12A and 12B, or FIGS. 13A and 13B), predicting a location of the first external electronic device (e.g., the electronic device 102 in FIG. 1 or the first external electronic device 610 in FIGS. 12A and 12B, or FIGS. 13A and 13B) based on a distance and a direction between the electronic device and the second external electronic device (e.g., the second external electronic device 620 in FIG. 4, FIGS. 12A and 12B, or FIGS. 13A and 13B), and a distance and a direction between the second external electronic device (e.g., the second external electronic device 620 in FIG. 4, FIGS. 12A and 12B, or FIGS. 13A and 13B) and the first external electronic device (e.g., the electronic device 102 in FIG. 1 or the first external electronic device 610 in FIGS. 12A and 12B, or FIGS. 13A and 13B), and displaying information indicating the predicted location of the first external electronic device (e.g., the electronic device 102 in FIG. 1 or the first external electronic device 610 in FIGS. 12A and 12B, or FIGS. 13A and 13B).

The operating method may further comprise receiving, from the third external electronic device (e.g., the server 108 in FIG. 1 or the third external electronic device 1210 in FIG. 5, FIGS. 12A and 12B, or FIGS. 13A and 13B), a packet including a distance and a direction between the second external electronic device (e.g., the second external electronic device 620 in FIG. 4, FIGS. 12A and 12B, or FIGS. 13A and 13B) and the first external electronic device (e.g., the electronic device 102 in FIG. 1 or the first external electronic device 610 in FIGS. 12A and 12B, or FIGS. 13A and 13B), and outputting information including the distance and the direction between the second external electronic device (e.g., the second external electronic device 620 in FIG. 4, FIGS. 12A and 12B, or FIGS. 13A and 13B) and the first external electronic device (e.g., the electronic device 102 in FIG. 1 or the first external electronic device 610 in FIGS. 12A and 12B, or FIGS. 13A and 13B).

According to an embodiment of the disclosure, an operating method of a third external electronic device (e.g., a server 108 in FIG. 1 or a third external electronic device 1210 in FIG. 5, FIGS. 12A and 12B, or FIGS. 13A and 13B) may comprise receiving, from an electronic device (e.g., an electronic device 101 in FIG. 1, FIG. 3, FIGS. 12A and 12B, or FIGS. 13A and 13B), a packet for requesting to perform a location-based service for a first external electronic device (e.g., an electronic device 102 in FIG. 1 or a first external electronic device 610 in FIGS. 12A and 12B, or FIGS. 13A and 13B).

The operating method may further comprise transmitting, to a second external electronic device (e.g., a second external electronic device 620 in FIG. 4, FIGS. 12A and 12B, or FIGS. 13A and 13B) which operates as a relay device for obtaining a location of the first external electronic device (e.g., the electronic device 102 in FIG. 1 or the first external electronic device 610 in FIGS. 12A and 12B, or FIGS. 13A and 13B), a packet for requesting to perform the location-based service for the first external electronic device (e.g., the electronic device 102 in FIG. 1 or the first external electronic device 610 in FIGS. 12A and 12B, or FIGS. 13A and 13B).

The operating method may further comprise receiving, from the second external electronic device (e.g., the second external electronic device 620 in FIG. 4, FIGS. 12A and 12B, or FIGS. 13A and 13B), a packet indicating that the location of the first external electronic device (e.g., the electronic device 102 in FIG. 1 or the first external electronic device 610 in FIGS. 12A and 12B, or FIGS. 13A and 13B) is obtained.

The operating method may further comprise transmitting, to the electronic device (e.g., the electronic device 101 in FIG. 1, FIG. 3, FIGS. 12A and 12B, or FIGS. 13A and 13B), a packet indicating that the location of the first external electronic device (e.g., the electronic device 102 in FIG. 1 or the first external electronic device 610 in FIGS. 12A and 12B, or FIGS. 13A and 13B) is obtained by the second external electronic device (e.g., the second external electronic device 620 in FIG. 4, FIGS. 12A and 12B, or FIGS. 13A and 13B).

The operating method may further comprise receiving, from the second external electronic device (e.g., the second external electronic device 620 in FIG. 4, FIGS. 12A and 12B, or FIGS. 13A and 13B), a packet including a distance and a direction between the second external electronic device (e.g., the second external electronic device 620 in FIG. 4, FIGS. 12A and 12B, or FIGS. 13A and 13B) and the first external electronic device (e.g., the electronic device 102 in FIG. 1 or the first external electronic device 610 in FIGS. 12A and 12B, or FIGS. 13A and 13B), and transmitting, to the electronic device (e.g., the electronic device 101 in FIG. 1, FIG. 3, FIGS. 12A and 12B, or FIGS. 13A and 13B), a packet including a distance and a direction between the second external electronic device (e.g., the second external electronic device 620 in FIG. 4, FIGS. 12A and 12B, or FIGS. 13A and 13B) and the first external electronic device (e.g., the electronic device 102 in FIG. 1 or the first external electronic device 610 in FIGS. 12A and 12B, or FIGS. 13A and 13B).

According to an embodiment of the disclosure, an electronic device may provide a location-based service (e.g., a finding service) capable of providing location information of a first external electronic device without restrictions on a distance and a direction between the electronic device and the first external electronic device.

According to an embodiment of the disclosure, an electronic device may provide a location-based service capable of providing location information of a first external electronic device through cooperation with a second external electronic device.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
   a display;
   a communication circuit; and
   at least one processor operatively connected with the display and the communication circuit, wherein the at least one processor is configured to:
   establish, via the communication circuit, a connection with a second external electronic device upon identifying that a packet is not received from a first external electronic device during set time while providing a location-based service for the first external electronic device,
   transmit, to the second external electronic device via the communication circuit, a packet for requesting to operate as a relay device for obtaining a location of the first external electronic device,
   receive, from the second external electronic device via the communication circuit, a packet including a distance and a direction between the second external electronic device and the first external electronic device,
   predict a location of the first external electronic device based on a distance and a direction between the electronic device and the second external electronic device, and the distance and the direction between the second external electronic device and the first external electronic device, and
   display, through the display, information indicating the predicted location of the first external electronic device,
   wherein the distance and the direction between the second external electronic device and the first external electronic device are obtained through an ultra wide band (UWB) connection, and
   wherein the packet including the distance and the direction between the second external electronic device and the first external electronic device further includes at least one of:
   device information of the second external electronic device, device information of the first external electronic device, or
   information related to a ranging protocol used for a UWB ranging operation between the second external electronic device and the first external electronic device.

2. The electronic device of claim 1, wherein the packet for requesting to operate as the relay device includes at least one of:
   device information of the first external electronic device,
   a command for requesting to turn on a searching function to provide a finding service for the first external electronic device, or
   information related to a protocol.

3. The electronic device of claim 2,
   wherein the searching function is a searching function using an ultra wide band (UWB), and
   wherein the information related to the protocol includes at least one of:
   information related to a ranging protocol to be used for the UWB ranging operation between the second external electronic device and the first external electronic device, or
   information related to a protocol type supported in the first external electronic device.

4. A second external electronic device, comprising:
   a communication circuit; and
   at least one processor operatively connected with the communication circuit, wherein the at least one processor is configured to:
   establish, via the communication circuit, a connection with an electronic device,
   receive, from the electronic device via the communication circuit, a packet for requesting to operate as a relay device for obtaining a location of a first external electronic device for a location-based service for the first external electronic device,
   establish, via the communication circuit, a connection with the first external electronic device, and
   transmit, to the electronic device via the communication circuit, a packet including a distance and a direction between the second external electronic device and the first external electronic device, wherein the connection between the second external electronic device and the first external electronic device is an ultra wide band (UWB) connection, and wherein the packet including the distance and the direction between the second external electronic device and the first external electronic device further includes at least one of:
- device information of the second external electronic device,
- device information of the first external electronic device, or
- information related to a ranging protocol used for a UWB ranging operation between the second external electronic device and the first external electronic device.

5. The second external electronic device of claim 4, wherein the packet for requesting to operate as the relay device includes at least one of:
- device information of the first external electronic device,
- a command for requesting to turn on a searching function to provide a finding service for the first external electronic device, or
- information related to a protocol.

6. The second external electronic device of claim 5, wherein the searching function is a searching function using an ultra wide band (UWB), and
wherein the information related to the protocol includes at least one of:
- information related to a ranging protocol to be used for the UWB ranging operation between the second external electronic device and the first external electronic device, or
- information related to a protocol type supported in the first external electronic device.

7. An electronic device, comprising:
a display;
a communication circuit; and
at least one processor operatively connected with the display and the communication circuit, wherein the at least one processor is configured to:
- transmit, to a third external electronic device via the communication circuit, a packet for requesting to perform a location-based service for a first external electronic device upon identifying that the location-based service for the first external electronic device is executed,
- receive, from the third external electronic device via the communication circuit, a packet indicating a location of the first external electronic device is obtained by a second external electronic device which operates a relay device for obtaining the location of the first external electronic device, and
- display, via the display, information indicating that the location of the first external electronic device is obtained by the second external electronic device, wherein a connection between the second external electronic device and the first external electronic device is an ultra wide band (UWB) connection, and wherein the packet indicating that the location of the first external electronic device is obtained includes at least one of:
- device information of the second external electronic device,
- device information of the first external electronic device,
- a distance and a direction between the second external electronic device and the first external electronic device, or
- information related to a ranging protocol used for a UWB ranging operation between the second external electronic device and the first external electronic device.

8. The electronic device of claim 7, wherein the packet for requesting to perform the location-based service for the first external electronic device includes device information of the first external electronic device.

9. The electronic device of claim 7, wherein the at least one processor is further configured to:
- establish, via the communication circuit, the connection with the second external electronic device;
- receive, from the second external electronic device via the communication circuit, a packet including a distance and a direction between the second external electronic device and the first external electronic device;
- predict a location of the first external electronic device based on a distance and a direction between the electronic device and the second external electronic device, and the distance and the direction between the second external electronic device and the first external electronic device; and
- display, via the display, information indicating the predicted location of the first external electronic device.

10. The electronic device of claim 9,
wherein the connection between the second external electronic device and the first external electronic device is an ultra wide band (UWB) connection, and
wherein the packet including the distance and the direction between the second external electronic device and the first external electronic device further includes at least one of:
- device information of the second external electronic device,
- device information of the first external electronic device, or
- information related to a ranging protocol used for a UWB ranging operation between the second external electronic device and the first external electronic device.

11. The electronic device of claim 7, wherein the at least one processor is further configured to:
- receive, from the third external electronic device via the communication circuit, a packet including a distance and a direction between the second external electronic device and the first external electronic device, and
- display, via the display, information including the distance and the direction between the second external electronic device and the first external electronic device.

12. A third external electronic device, comprising:
a communication circuit; and
at least one processor operatively connected with the communication circuit, wherein the at least one processor is configured to:
- receive, from an electronic device via the communication circuit, a packet for requesting to perform a location-based service for a first external electronic device,
- transmit, to a second external electronic device which operates as a relay device for obtaining a location of the first external electronic device via the communication circuit, a packet for requesting to perform the location-based service for the first external electronic device, receive, from the second external electronic device via the communication circuit, a packet indicating that the location of the first external electronic device is obtained, and transmit, to the electronic device via the communication circuit, a packet indicating that the location of the first external electronic device is obtained by the second external electronic device, wherein a connection between the second external electronic device and the first external electronic device is an ultra wide band (UWB) connection, and wherein the packet indicating that the location of the first external electronic device is obtained includes at least one of:

device information of the second external electronic device, device information of the first external electronic device, a distance and a direction between the second external electronic device and the first external electronic device, or information related to a ranging protocol used for a UWB ranging operation between the second external electronic device and the first external electronic device.

13. The third external electronic device of claim 12, wherein the packet for requesting to perform the location-based service for the first external electronic device includes device information of the first external electronic device.

14. The third external electronic device of claim 12, wherein the at least one processor is further configured to:

receive, from the second external electronic device via the communication circuit, a packet including a distance and a direction between the second external electronic device and the first external electronic device; and transmit, to the electronic device via the communication circuit, the packet including the distance and the direction between the second external electronic device and the first external electronic device.

15. The third external electronic device of claim 14, wherein the packet including the distance and the direction between the second external electronic device and the first external electronic device further includes at least one of:

device information of the second external electronic device, device information of the first external electronic device, or information related to a ranging protocol used for the UWB ranging operation between the second external electronic device and the first external electronic device.

16. The third external electronic device of claim 15, wherein the ranging protocol includes at least one of a one-way ranging protocol and a two-way ranging protocol.

* * * * *